US007006672B2

(12) United States Patent
Sato et al.

(10) Patent No.: US 7,006,672 B2
(45) Date of Patent: Feb. 28, 2006

(54) ENTRANCE MANAGEMENT APPARATUS AND ENTRANCE MANAGEMENT METHOD

(75) Inventors: Toshio Sato, Yokohama (JP); Akio Okazaki, Yokohama (JP); Hiroshi Sukegawa, Yokohama (JP); Jun Ogata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 770 days.

(21) Appl. No.: 10/096,955

(22) Filed: Mar. 14, 2002

(65) Prior Publication Data

US 2002/0191817 A1   Dec. 19, 2002

(30) Foreign Application Priority Data

| Mar. 15, 2001 | (JP) | 2001-074206 |
| May 28, 2001 | (JP) | 2001-159381 |
| Sep. 28, 2001 | (JP) | 2001-301367 |

(51) Int. Cl.
*G06K 9/00* (2006.01)

(52) U.S. Cl. .................. 382/118; 382/181; 340/5.2; 340/5.53; 340/5.83

(58) Field of Classification Search ............... 382/118; 340/5.2, 5.28, 5.53, 5.83
See application file for complete search history.

(56) References Cited

U.S. PATENT DOCUMENTS

| 4,712,103 | A | * | 12/1987 | Gotanda ................. 340/5.53 |
| 4,975,969 | A | | 12/1990 | Tal |
| 5,337,043 | A | | 8/1994 | Gokcebay |
| 5,400,722 | A | * | 3/1995 | Moses et al. ................ 109/2 |
| 5,426,708 | A | * | 6/1995 | Hamada et al. ............. 382/125 |
| 5,608,387 | A | * | 3/1997 | Davies ..................... 340/5.27 |
| 5,982,912 | A | | 11/1999 | Fukui et al. |
| 5,991,429 | A | * | 11/1999 | Coffin et al. ................ 382/118 |
| 6,111,517 | A | * | 8/2000 | Atick et al. ................ 340/5.83 |
| 6,160,903 | A | | 12/2000 | Hamid et al. |
| 6,418,235 | B1 | * | 7/2002 | Morimoto et al. .......... 382/118 |
| 6,801,640 | B1 | * | 10/2004 | Okubo et al. .............. 382/118 |
| 2001/0031072 | A1 | | 10/2001 | Dobashi et al. |

FOREIGN PATENT DOCUMENTS

EP   0 758 776 A2   2/1997

(Continued)

OTHER PUBLICATIONS

Kazuhiro Fukui et al., Study Papers of Institute of Electronic Information and Communication of Engineers of Japan, "Face Feature Point Extraction by Combination of Shape Extraction and Pattern Collation", vol. J80-D-11, No. 8, 1997, pp. 2170-2177.

(Continued)

*Primary Examiner*—Samir Ahmed
*Assistant Examiner*—Anand Bhatnagar
(74) *Attorney, Agent, or Firm*—Pillsbury Winthrop Shaw Pittman, LLP

(57) ABSTRACT

Feature amounts of faces of visitors photographed at a first gate are registered in a registration section in relation to entrance permission time information items each of which defines a period of time during which entrance through a second gate provided inside the first gate is permitted. At the second gate, the face of the visitor is photographed and the feature amount of the photographed face of the visitor is collated with the face feature amounts registered in the registration section. Entrance through the second gate is controlled based on the result of collation and the entrance permission time information registered in the registration section.

10 Claims, 53 Drawing Sheets

FOREIGN PATENT DOCUMENTS

| | | |
|---|---|---|
| EP | 0 903 700 A2 | 3/1999 |
| EP | 0 924 657 A2 | 6/1999 |
| GB | 2 224 773 A | 5/1990 |
| JP | 7-175929 | 7/1995 |
| JP | 9-251534 | 9/1997 |

OTHER PUBLICATIONS

Ken-ichi Maeda et al., Study Papers of Institute of Electronic Information and Communication Engineers of Japan (D), "Pattern Matching Method Using Local Configuration", vol. J68D, No. 3, 1985, pp. 345-352.

* cited by examiner

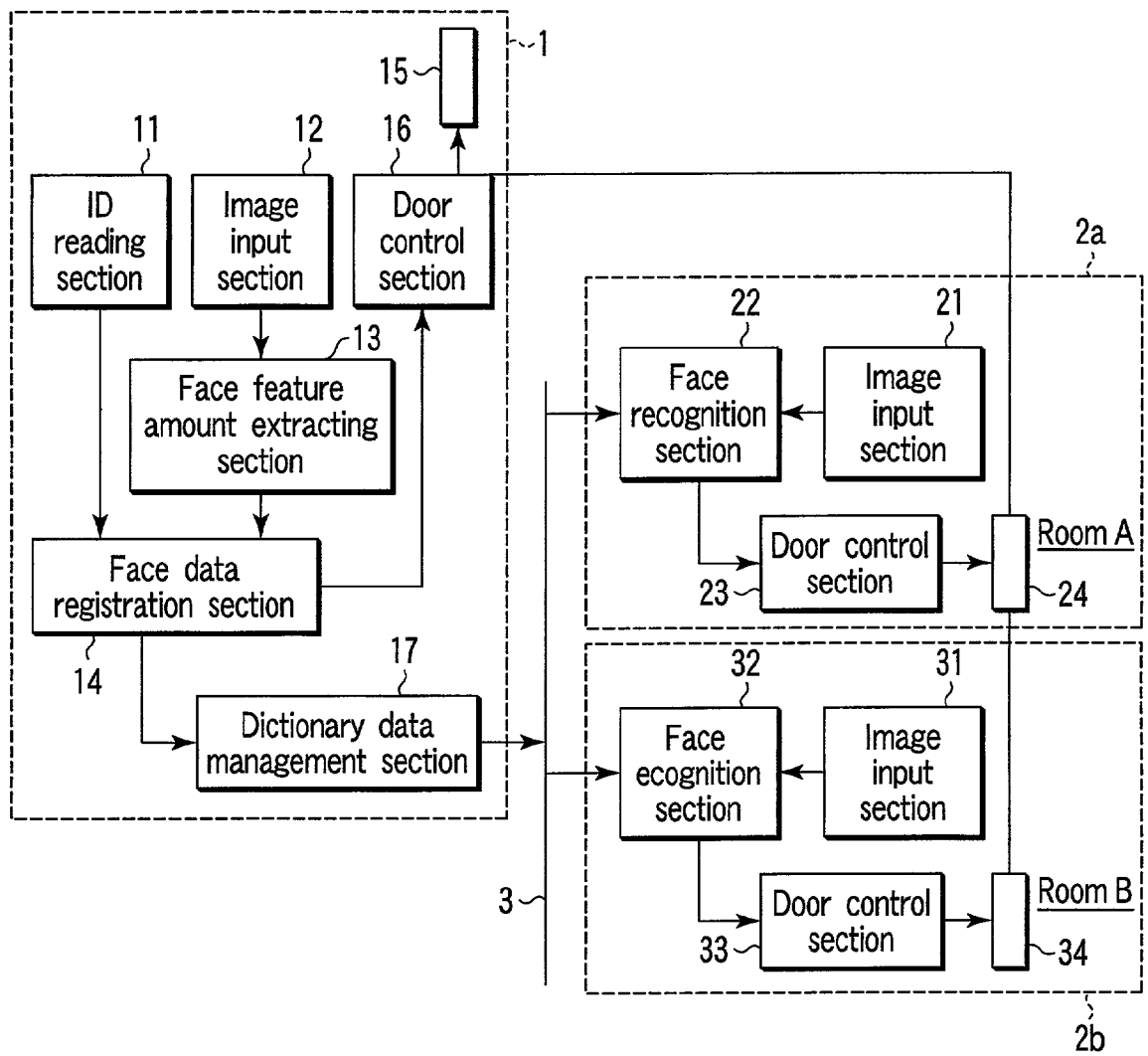
F I G. 1

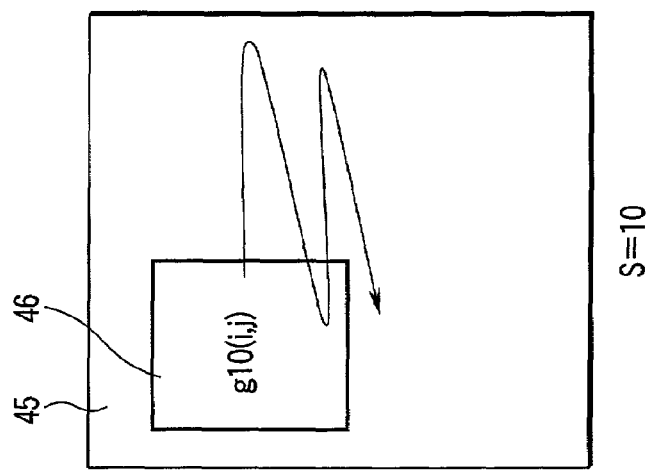
FIG. 6 S=10
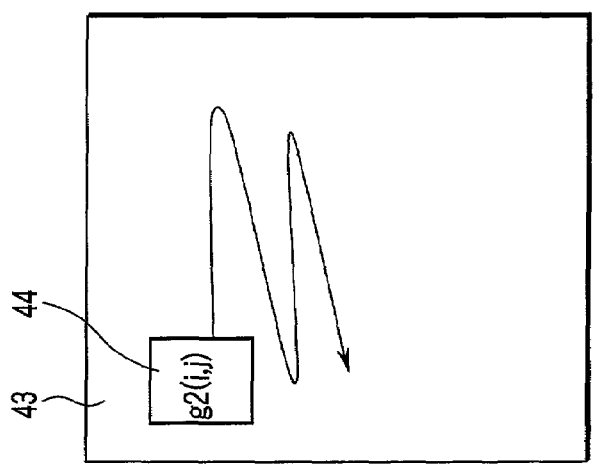
FIG. 5 S=2
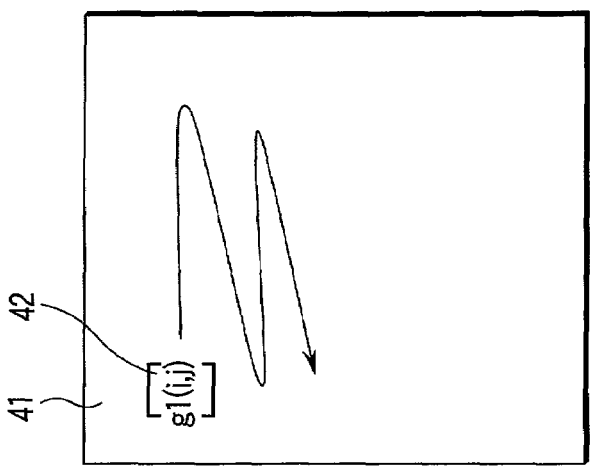
FIG. 4 S=1

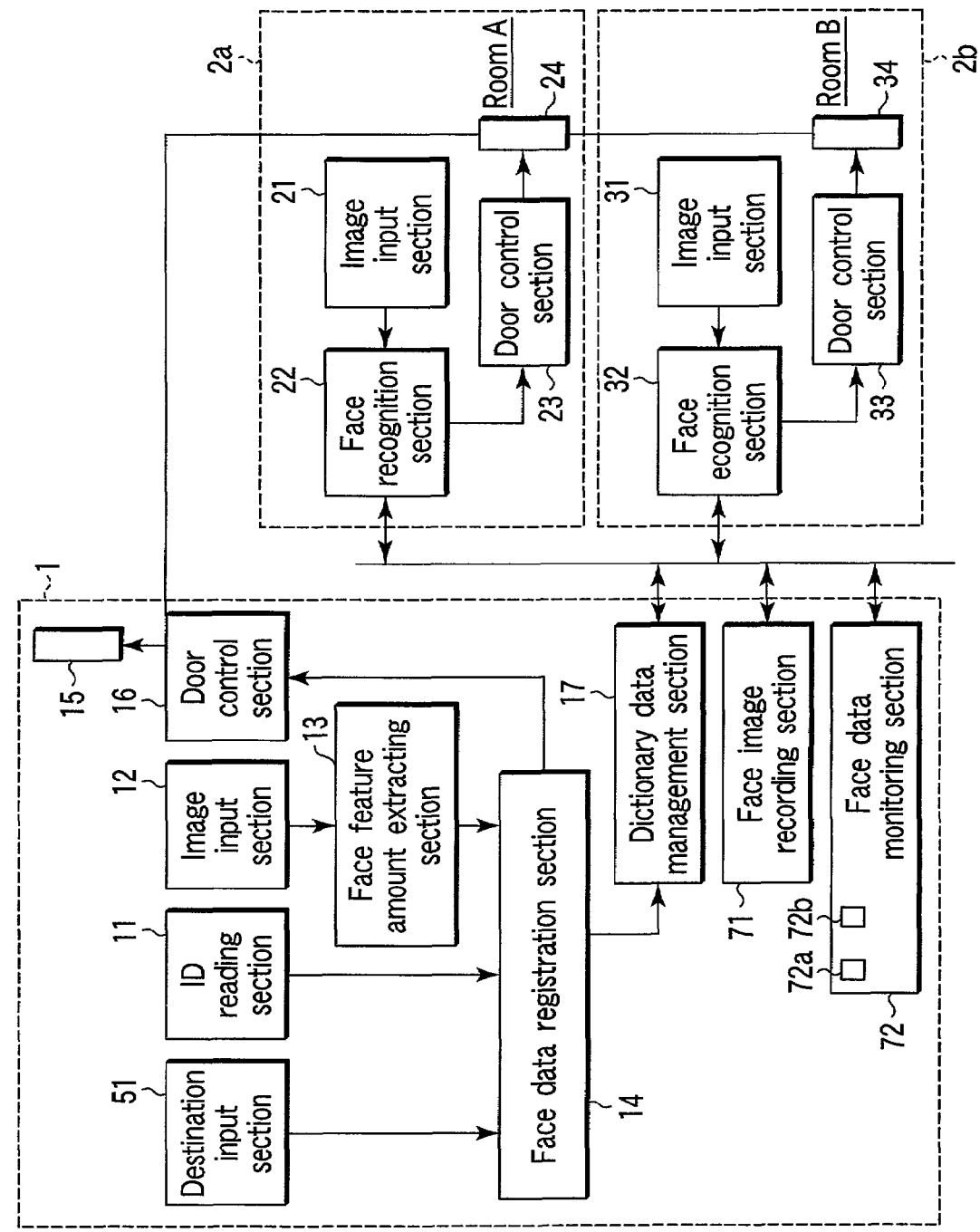
F I G. 12

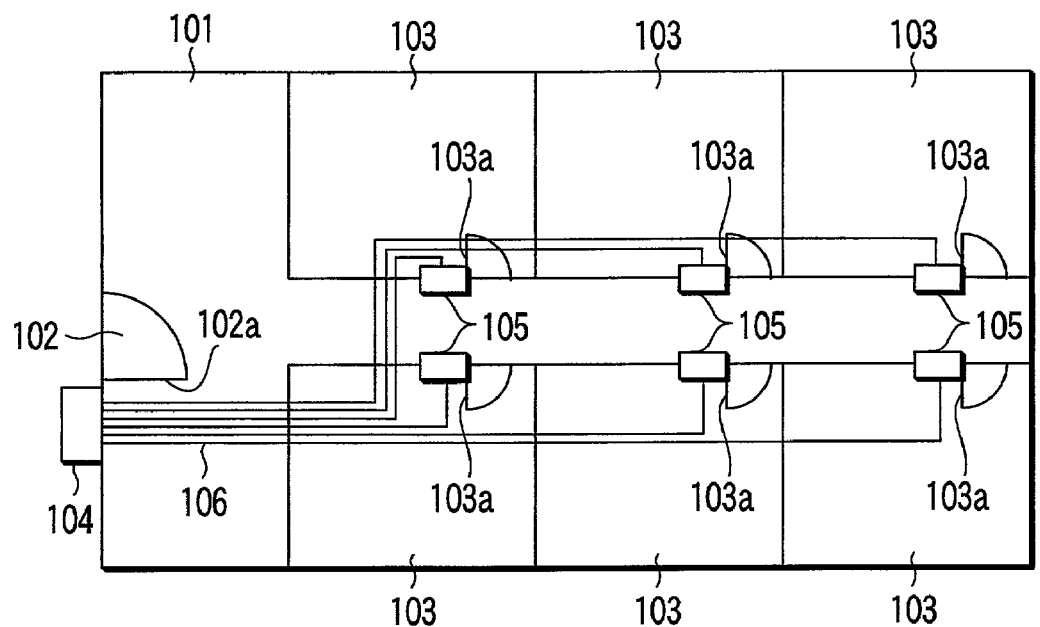
F I G. 15
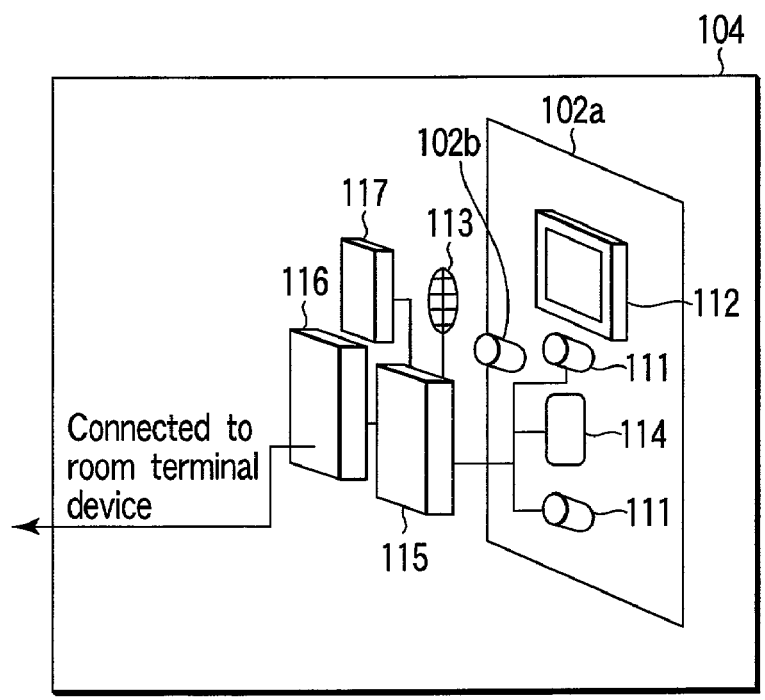
F I G. 16

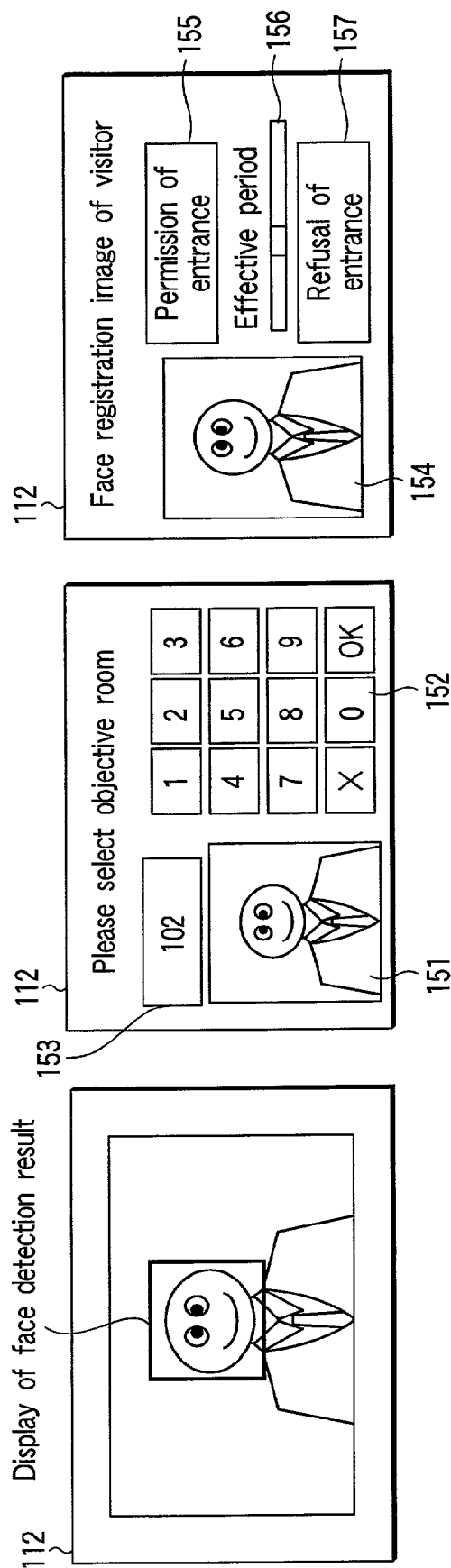

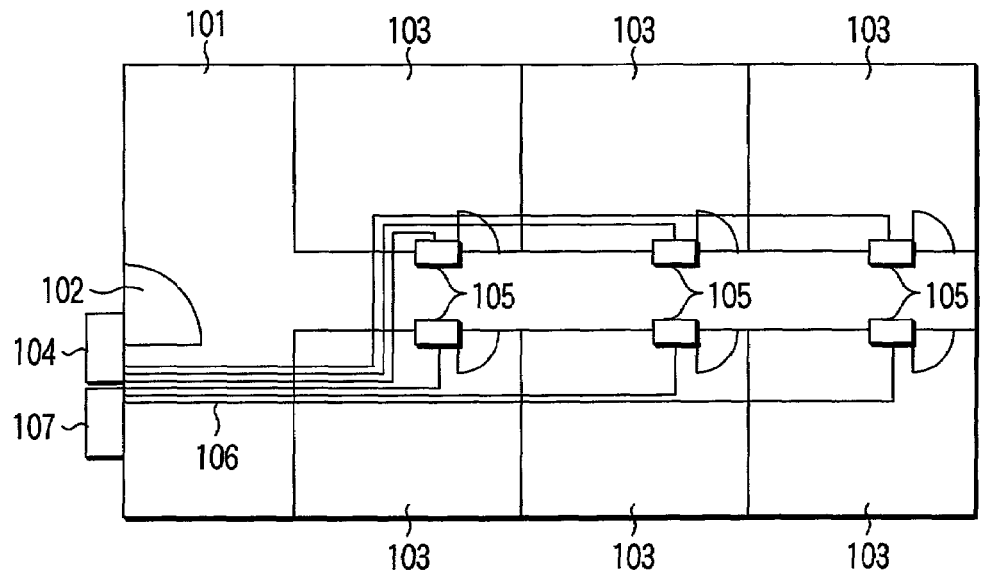
FIG. 29
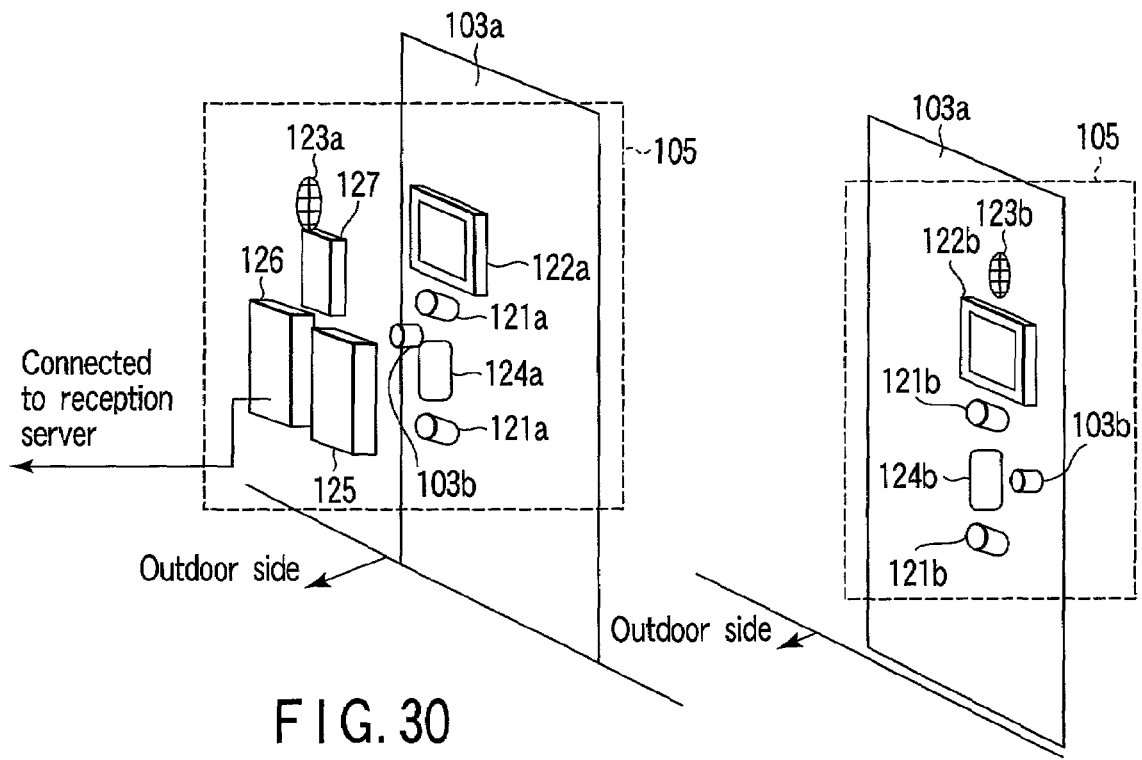
FIG. 30
FIG. 31

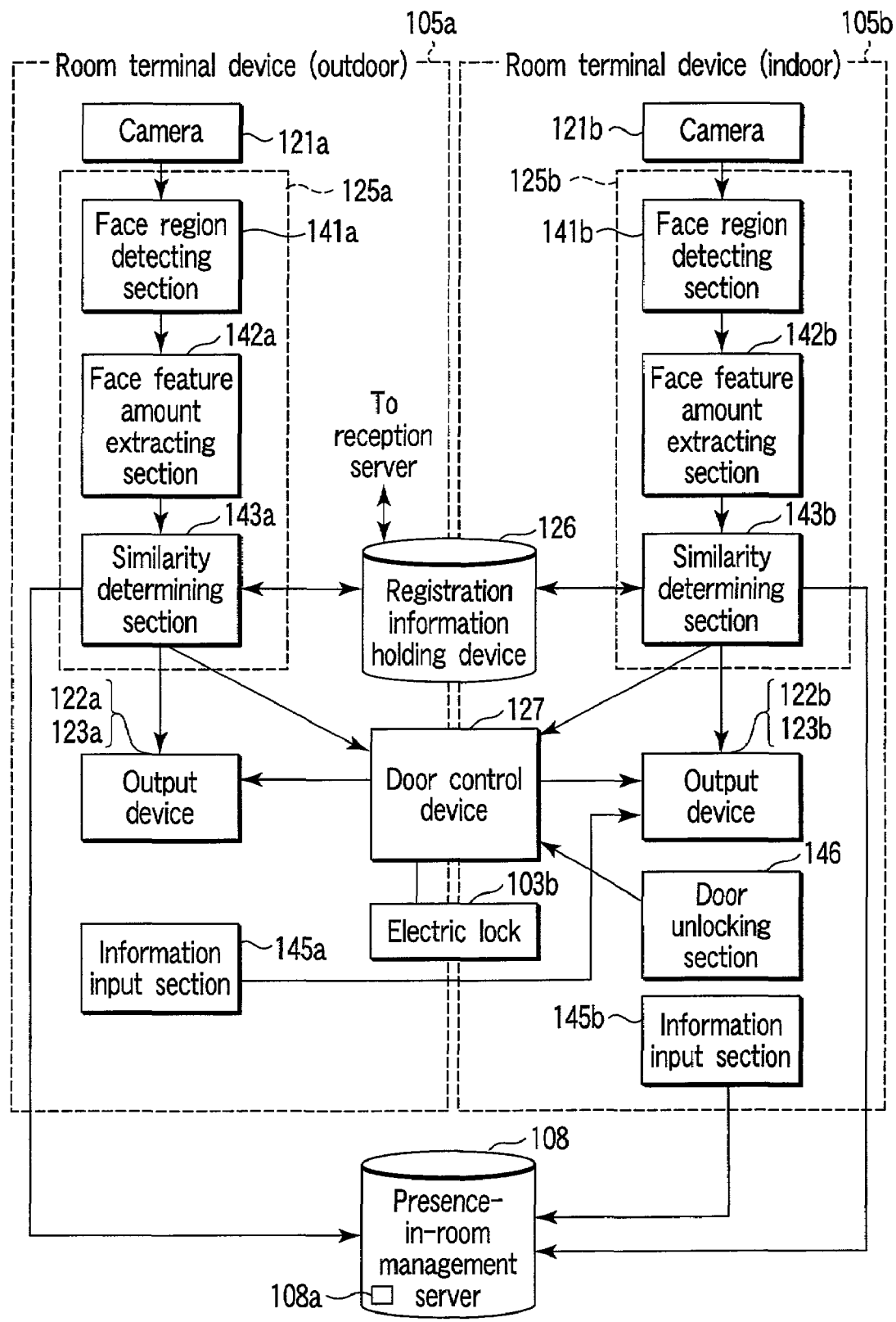
F I G. 32

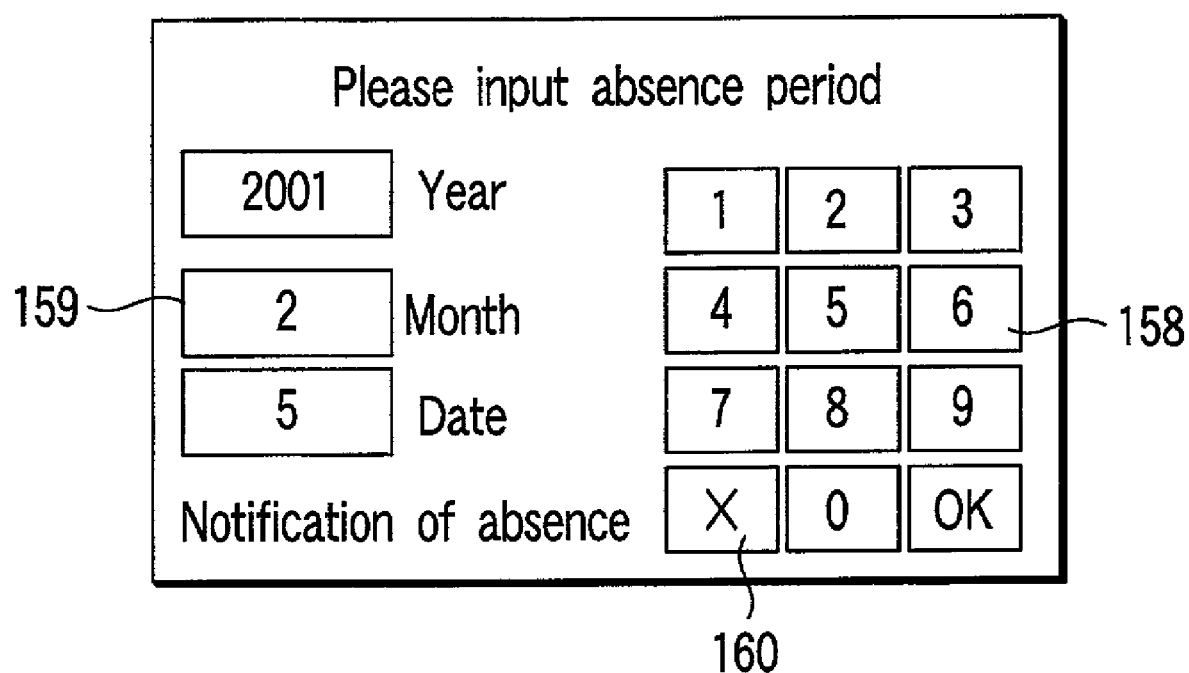
F I G. 33

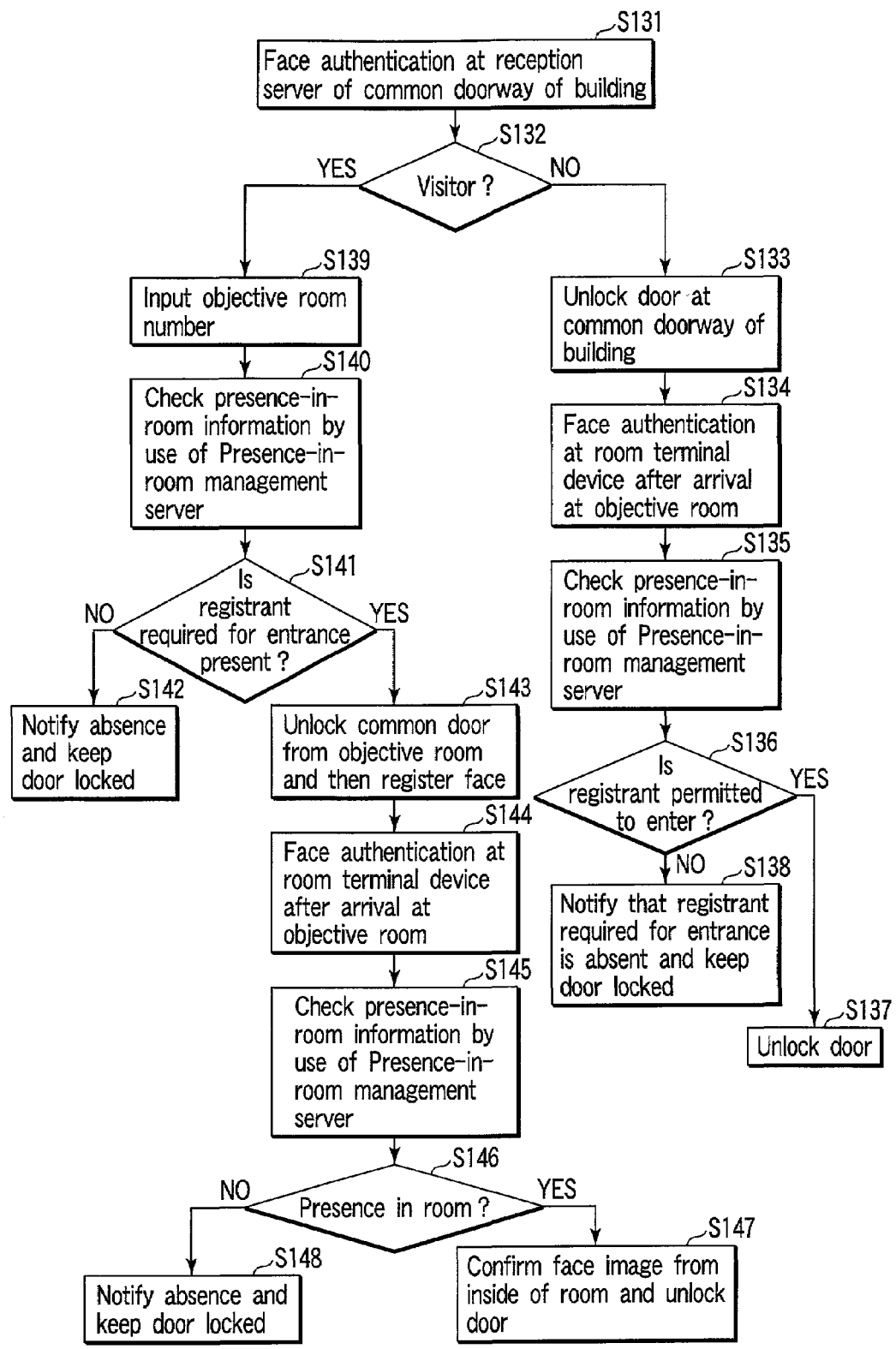
F I G. 34

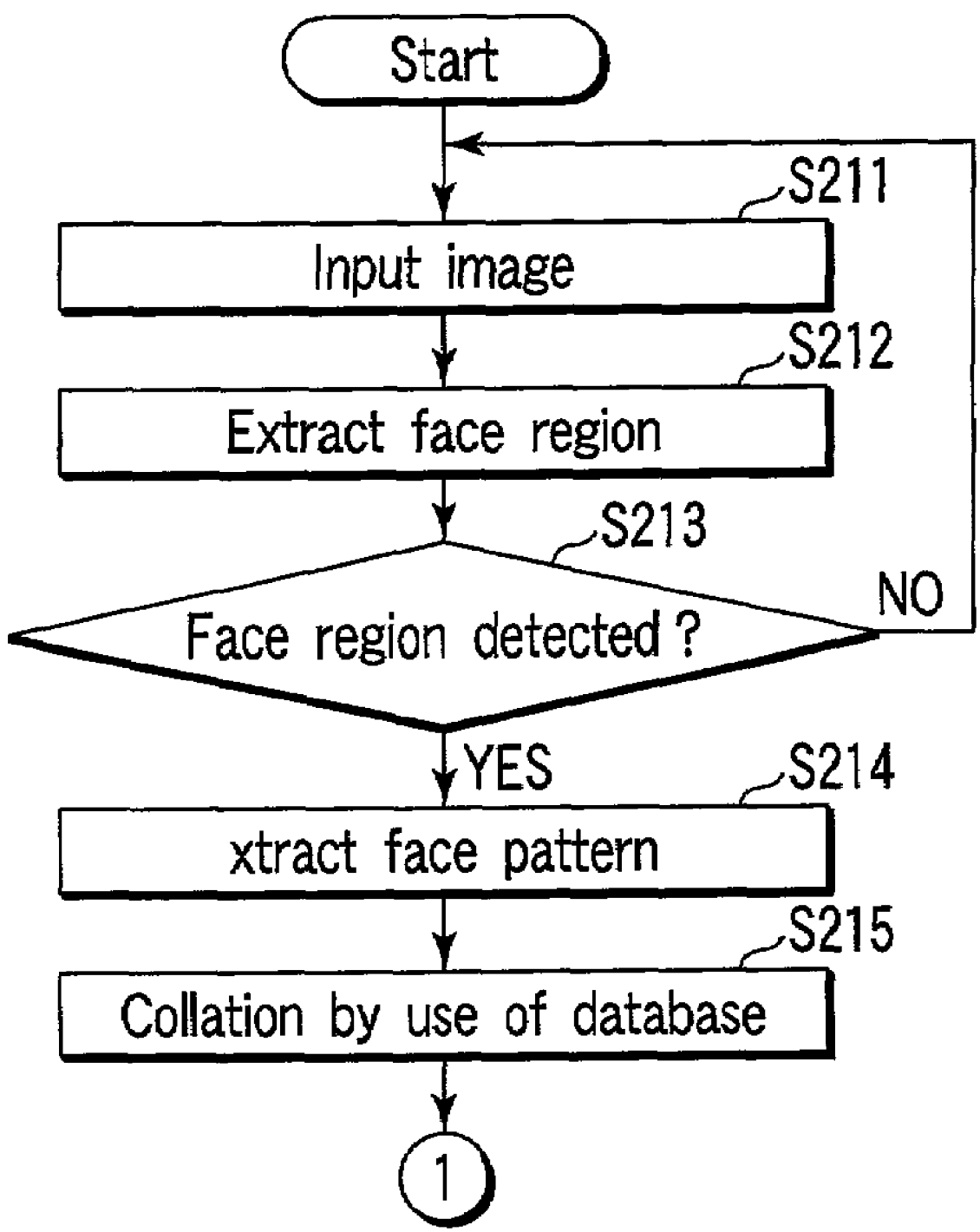
F I G. 42

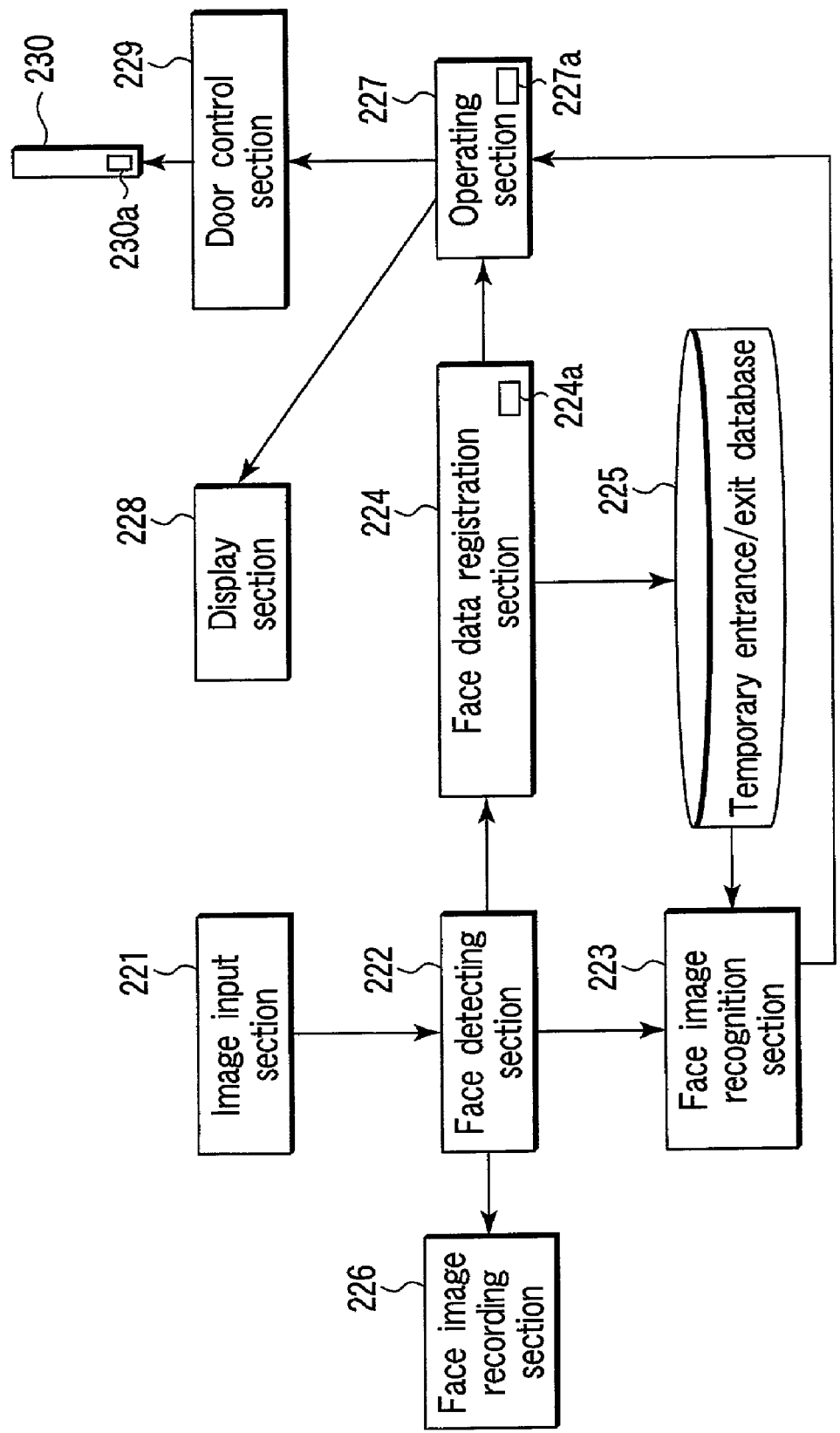
F I G. 52

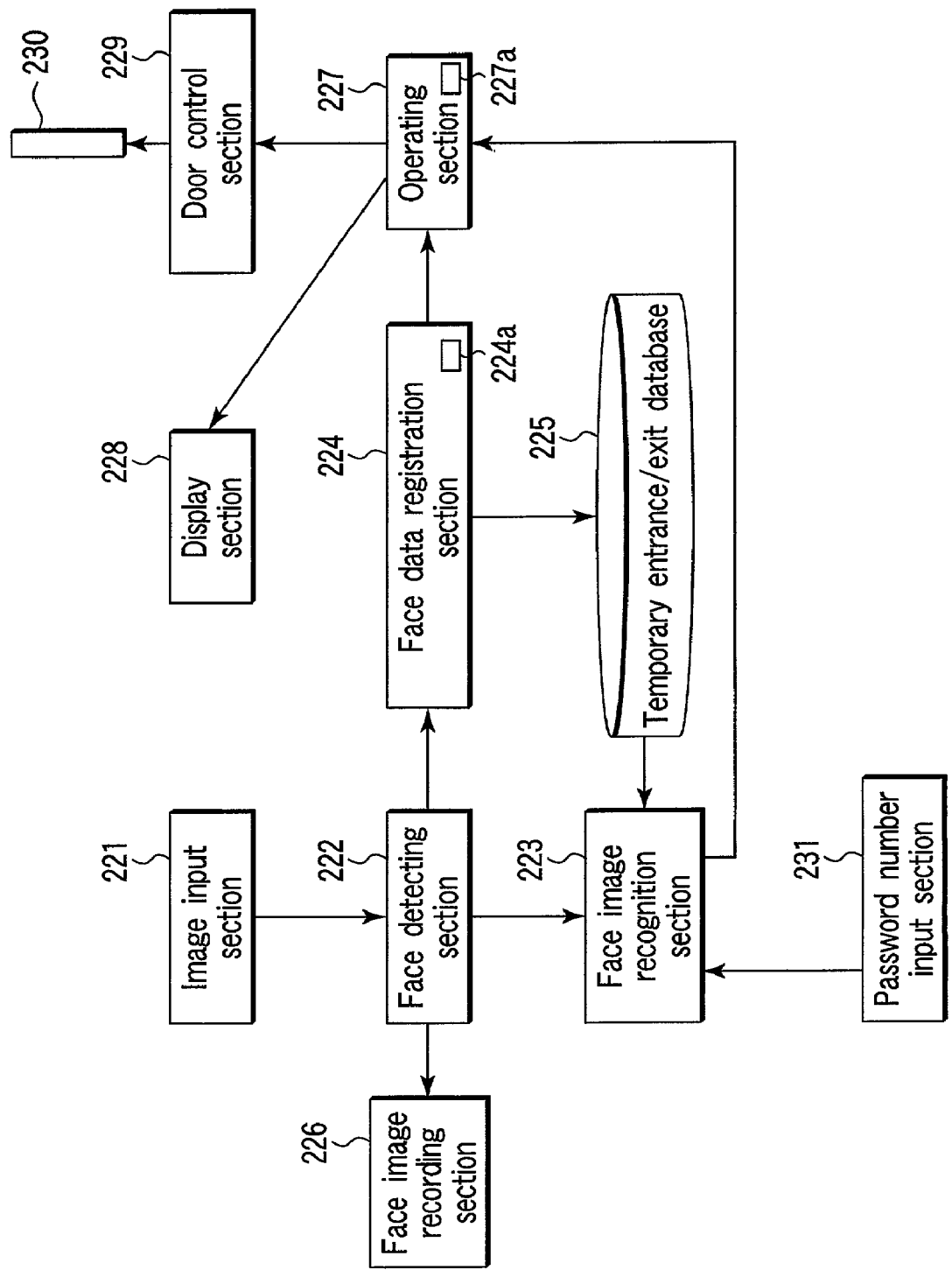
F I G. 55

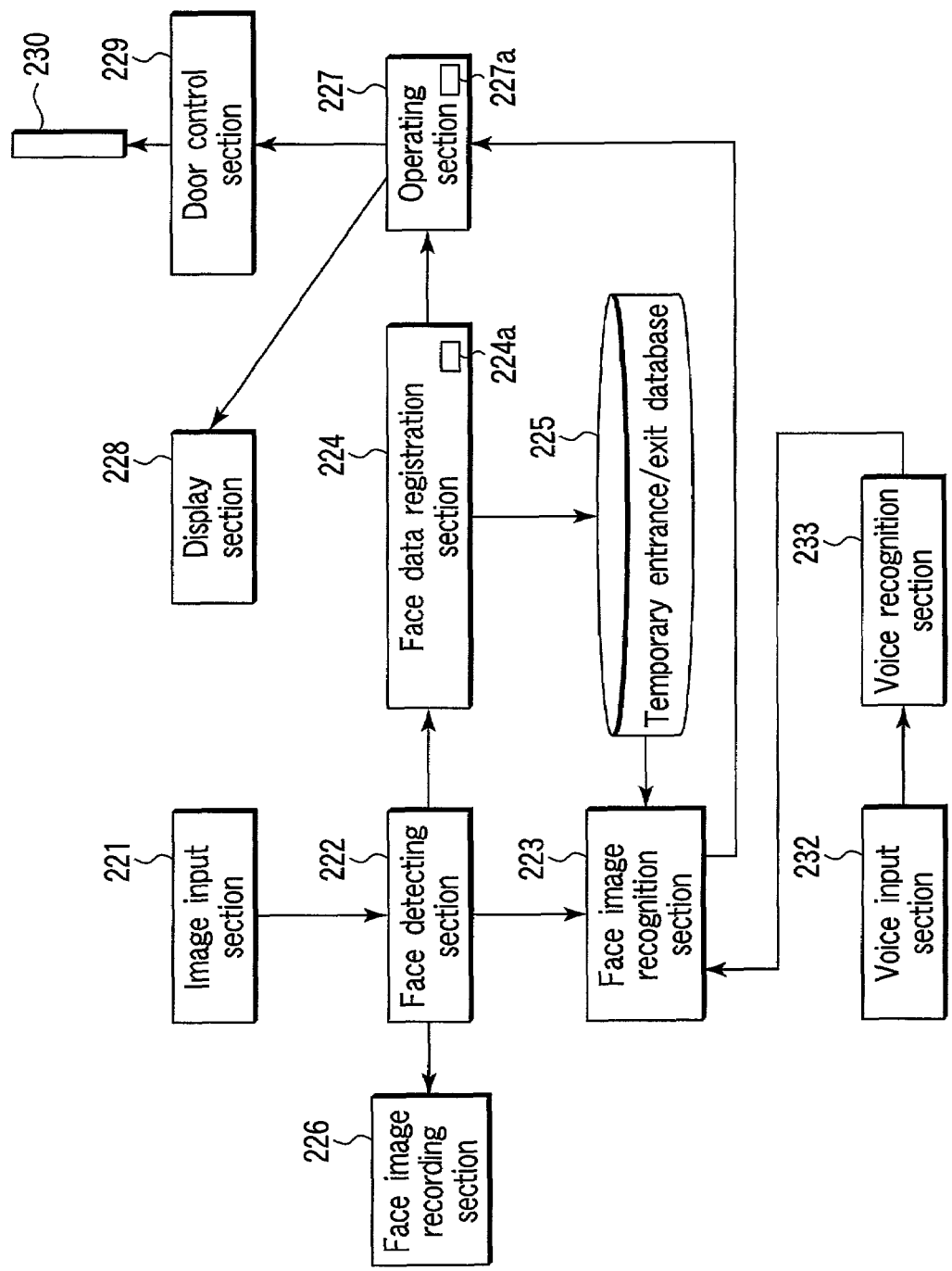
F I G. 58

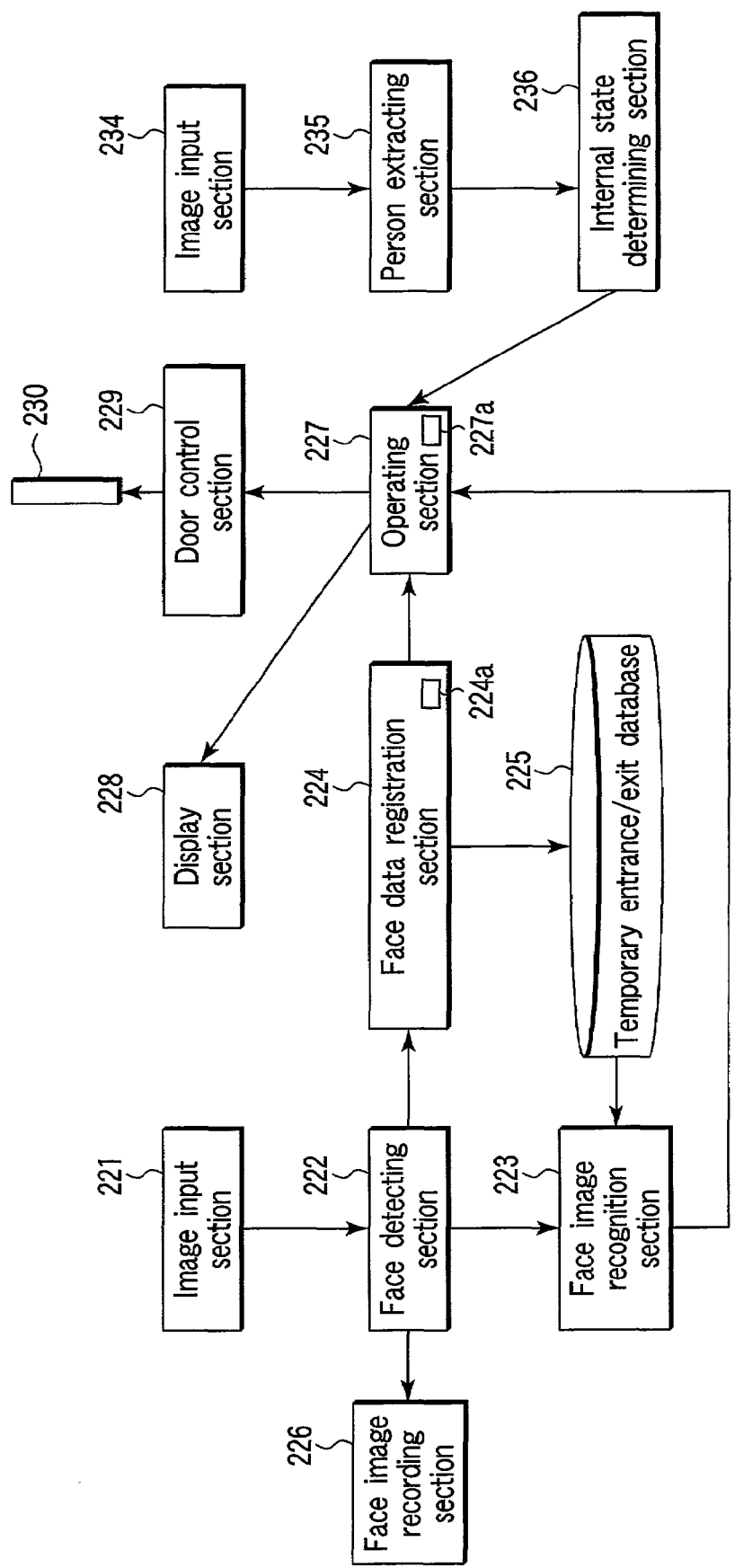
F I G. 61

ENTRANCE MANAGEMENT APPARATUS AND ENTRANCE MANAGEMENT METHOD

CROSS-REFERENCE TO RELATED APPLICATIONS

This application is based upon and claims the benefit of priority from the prior Japanese Patent Applications No. 2001-074206, filed Mar. 15, 2001; No. 2001-159381, filed May 28, 2001; and No. 2001-301367, filed Sep. 28, 2001, the entire contents of all of which are incorporated herein by reference.

BACKGROUND OF THE INVENTION

1. Field of the Invention

This invention relates to an entrance management apparatus and entrance management method which manage entrance (or entry) into a room or important facility in which much importance is given to the security, for example.

2. Description of the Related Art

Conventionally, a system which controls the open/closed state of a door or the fastened/unfastened state of a lock mounted on a door based on authentication of a subject person by using information of a living body such as a face inherent to a person is provided. For example, in Jpn. Pat. Appln. KOKAI Publication No. 7-175929, an automatic door opening/closing management system which manages entrance (or entry) into a room or important facility in which much importance is given to the security is proposed. In Jpn. Pat. Appln. KOKAI Publication No. 7-175929, the feature of a body (face) of a person is identified according to image data and the locked/unlocked state of the door is controlled based on the result of identification.

However, the automatic door opening/closing management system disclosed in Jpn. Pat. Appln. KOKAI Publication No. 7-175929 has the following problems.

There is no description about the management of entrance of a visitor who is not previously registered or the management of entrance of a plurality of visitors. For example, in the authentication process based on a face image, the precision of the authentication process is lowered and the degree of security is lowered as the number of registered persons to be authenticated increases.

Further, there is no description about a change of the physical feature of a registered person with time or the management of entrance of a temporary user.

In addition, there is no description about a process for confirming or monitoring the result of authentication based on the physical feature in order to enhance the security.

BRIEF SUMMARY OF THE INVENTION

Accordingly, an object of this invention is to provide an entrance management apparatus and entrance management method which can attain a high degree of security and permit a visitor to easily enter.

An entrance management apparatus according to one embodiment of this invention which manages entrance through a first gate and entrance through a second gate provided inside the first gate comprises a first living body information input section which acquires living body information of the visitor at the first gate, a feature amount extracting section which extracts a feature amount of the living body information of the visitor based on the living body information acquired by the first living body information input section, a registration section which registers the feature amount of the living body information extracted by the feature amount extracting section in correspondence to entrance permission time information which defines time during which the visitor whose living body information is acquired by the first living body information input section is permitted to enter through the second gate, a second living body information input section which acquires living body information of the visitor at the second gate, a collating section which extracts a feature amount of the living body information of the visitor based on the living body information acquired by the second living body information input section and collates the extracted feature amount with the feature amount registered in the registration section, and an entrance control section which controls the entrance of the visitor whose living body information is acquired by the second living body information input section through the second gate based on the result of collation by the collating section and the entrance permission time information registered in the registration section and corresponding to the result of collation.

An entrance management apparatus according to another embodiment of this invention which manages entrance through a gate comprises an image input section which acquires a face image of a visitor at the gate, a face detecting section which detects a feature amount of the face based on the face image acquired by the image input section, an image recording section which records the face image acquired by the image input section in the case where the feature amount of the face is detected by the face detecting section, and an access control section which permits access through the gate only in the case where the feature amount of the face is detected by the face detecting section.

An entrance management method according to still another embodiment of this invention which is a method for managing entrance through a first gate and entrance through a second gate provided inside the first gate comprises acquiring living body information of a visitor at the first gate, extracting a feature amount of the living body information of the visitor based on the living body information acquired at the first gate, registering the extracted feature amount of the living body information in correspondence to entrance permission time information which defines time during which the visitor is permitted to enter through the second gate into a registration section, acquiring living body information of the visitor at the second gate, extracting a feature amount of the living body information of the visitor based on the living body information acquired at the second gate and collating the extracted feature amount with the feature amount registered in the registration section, and controlling the entrance of the visitor whose living body information is acquired at the second gate through the second gate based on the result of collation and the entrance permission time information registered in the registration section and corresponding to the result of collation.

An entrance management apparatus according to a further embodiment of this invention which manages entrance through a first gate and entrance through a plurality of second gates provided inside the first gate comprises a registration section in which a feature amount of living body information of at least one person who has authorization of entrance through the first gate is registered in correspondence to the presence or absence of authorization of entrance through at least one of the second gates, a destination input section by use of which a destination is input by a visitor at the first gate, a first living body information input section which acquires living body information of the visitor at the first gate, a first feature amount extracting section which extracts a feature amount of living body information based on the living body information acquired by the first living body information input section, a first collating section which collates the feature amount extracted by the first feature amount extracting section with the feature amount registered in the registration section, a first entrance control section which permits entrance of the visitor in the case where the feature amount is successfully collated with the feature amount registered in the registration section by the first collating section and controls entrance of the visitor based on a specification of a person who exists in the destination input by the destination input section in the case where the feature amount is not successfully collated with the feature amount registered in the registration section by the first collating section, a storage section which stores a feature amount of living body information of a visitor who obtains permission of entrance based on the specification of the person existing in the destination in correspondence to one of the second gates which corresponds to the destination, a second living body information input section which acquires living body information of the visitor at the second gate, a second feature amount extracting section which extracts a feature amount of living body information based on the living body information acquired by the second living body information input section, a second collating section which collates the feature amount extracted by the second feature amount extracting section with the feature amount registered in the registration section and the feature amount stored in the storage section, a second entrance control section which permits entrance through the second gate in the case where the feature amount is successfully collated with the face feature amount corresponding to a person who has authorization to enter through the second gate and registered in the registration section by the second collating section and controls entrance of the visitor through the second gate based on a specification of a person who exists inside the second gate in the case where the feature amount is successfully collated with the feature amount of living body information corresponding to a person who has no authorization to enter through the second gate and registered in the registration section by the second collating section or in the case where the feature amount is successfully collated with the feature amount of living body information of a person related to the second gate which is the destination stored in the storage section, and an access inhibiting section which inhibits access through any one of the second gates by the visitor in the case where the feature amount is not successfully collated with the feature amount registered in the registration section by the second collating section or in the case where the feature amount is not successfully collated with the feature amount of living body information of a person related to the second gate which is the destination stored in the storage section.

An entrance management method according to another embodiment of this invention which is a method for managing entrance through a first gate and entrance through a plurality of second gates provided inside the first gate comprises registering a feature amount of living body information of at least one person who has authorization of entrance through the first gate in correspondence to the presence or absence of authorization of entrance through at least one of the second gates into a registration section, inputting a destination by a visitor at the first gate, acquiring living body information of a visitor at the first gate, extracting a feature amount of living body information based on the acquired living body information, collating the extracted feature amount with the feature amount registered in the registration section, permitting entrance of the visitor in the case where the feature amount is successfully collated with the feature amount registered in the registration section and controlling entrance of the visitor based on a specification of a person who exists in the destination in the case where the feature amount is not successfully collated with the feature amount registered in the registration section, storing a feature amount of living body information of the visitor who obtains permission of entrance based on the specification of a person existing in the destination in correspondence to one of the second gates which corresponds to the destination into a storage section, acquiring living body information of the visitor at the second gate, extracting a feature amount of living body information based on the acquired living body information, collating the extracted feature amount with the feature amount registered in the registration section and the feature amount stored in the storage section, permitting entrance through the second gate in the case where the feature amount is successfully collated with the feature amount of a face of a person who has authorization to enter through the second gate registered in the registration section by collation at the second gate, controlling entrance of the visitor through the second gate based on a specification of a person who exists inside the second gate in the case where the feature amount is successfully collated with the feature amount of living body information corresponding to a person who has no authorization to enter through the second gate and registered in the registration section by collation at the second gate or in the case where the feature amount is successfully collated with the feature amount of living body information of a person associated with the second gate which is the destination stored in the storage section, and inhibiting access through any one of the second gates by the visitor in the case where the feature amount is not successfully collated with the feature amount registered in the registration section by collation at the second gate or in the case where the feature amount is not successfully collated with the feature amount of living body information of a person associated with the second gate which is the destination stored in the storage section.

An entrance management apparatus according to an embodiment of this invention which manages entrance through a gate comprises a first image input section which acquires living body information of a user in the case where the user exits or leaves an area inside the gate, a first feature amount extracting section which extracts a feature amount of living body information of the user based on the living body information acquired by the first image input section, a registration section which registers the feature amount of the living body information extracted by the first feature amount extracting section, an exit control section which permits the user to exit through the gate in the case where registration of the feature amount of the living body information by the registration section is completed, a second living body information input section which acquires living body information of the user in the case where the user enters the area inside the gate, a second feature amount extracting section which extracts a feature amount of living body information of the user based on the living body information acquired by the second image input section, a collating section which collates the feature amount of the living body information extracted by the second feature amount extracting section with the feature amount of the living body information registered in the registration section, and an entrance control section which controls entrance of the user at the gate based on the result of collation by the collating section.

An entrance management apparatus according to an embodiment of this invention which manages entrance through a gate comprises a storage section in which feature amounts of faces of existing users are previously stored, an image input section which acquires a face image of a visitor at the gate, a face feature amount extracting section which extracts a feature amount of the face of the visitor based on the face image acquired by the image input section, a collating section which collates the feature amount of the face extracted by the face feature amount extracting section with the face feature amounts stored in the storage section, a registration section which registers the face feature amount of the visitor extracted by the face feature amount extracting section as information of a visitor who has visited for the first time in the case where the feature amount cannot be satisfactorily collated with any one of the feature amounts stored in the storage section by the collating section, and an entrance control section which controls entrance of the visitor to a destination in the case where the feature amount is satisfactorily collated with one of the feature amounts stored in the storage section by the collating section or in the case where registration of the face feature amount by the registration section is completed.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 1 is a block diagram schematically showing the configuration of an entrance management apparatus according to a first embodiment of this invention, FIG. 4 is a diagram for illustrating a face pattern searching process executed by the face feature extracting section, FIG. 5 is a diagram for illustrating a face pattern searching process executed by the face feature extracting section, FIG. 6 is a diagram for illustrating a face pattern searching process executed by the face feature extracting section, FIG. 12 is a block diagram schematically showing the configuration of an entrance management apparatus according to a fourth embodiment of this invention, FIG. 15 is a simulated view schematically showing the configuration of an entrance management apparatus according to a sixth embodiment of this invention and the whole configuration of a building to which the entrance management apparatus is applied, FIG. 16 is a simulated view schematically showing the configuration of a reception server according to the sixth embodiment, FIG. 21 is a view showing an example of an output screen of a display section, FIG. 22 is a view showing an example of an output screen of a display section, FIG. 23 is a view showing an example of an output screen of a display section, FIG. 29 is a simulated view schematically showing the configuration of an entrance management apparatus according to an eighth embodiment of this invention and the whole configuration of a building to which the entrance management apparatus is applied, FIG. 30 is a simulated view schematically showing the configuration of a room terminal device provided inside the room in the eighth embodiment, FIG. 31 is a simulated view schematically showing the configuration of a room terminal device provided outside the room in the eighth embodiment, FIG. 32 is a block diagram schematically showing the whole configuration of the room terminal device in the eighth embodiment, FIG. 33 is a view showing an example of an input screen indicating an absence period in an information inputting section of the room terminal device in the eighth embodiment, FIG. 34 is a flowchart for illustrating the flow of a process after a registrant and visitor arrive at a common entrance door until they enter respective rooms, FIG. 42 is a flowchart for illustrating the flow of a process at the time of re-entrance into the security area in the tenth embodiment, FIG. 52 is a block diagram schematically showing the configuration of an entrance/exit authentication apparatus according to a twelfth embodiment of this invention, FIG. 55 is a block diagram schematically showing the configuration of an entrance/exit authentication apparatus according to a thirteenth embodiment of this invention, FIG. 58 is a block diagram schematically showing the configuration of an entrance/exit authentication apparatus according to a fourteenth embodiment of this invention, FIG. 61 is a block diagram schematically showing the configuration of an entrance/exit authentication apparatus according to a fifteenth embodiment of this invention.

DETAILED DESCRIPTION OF THE INVENTION

Figure 2:
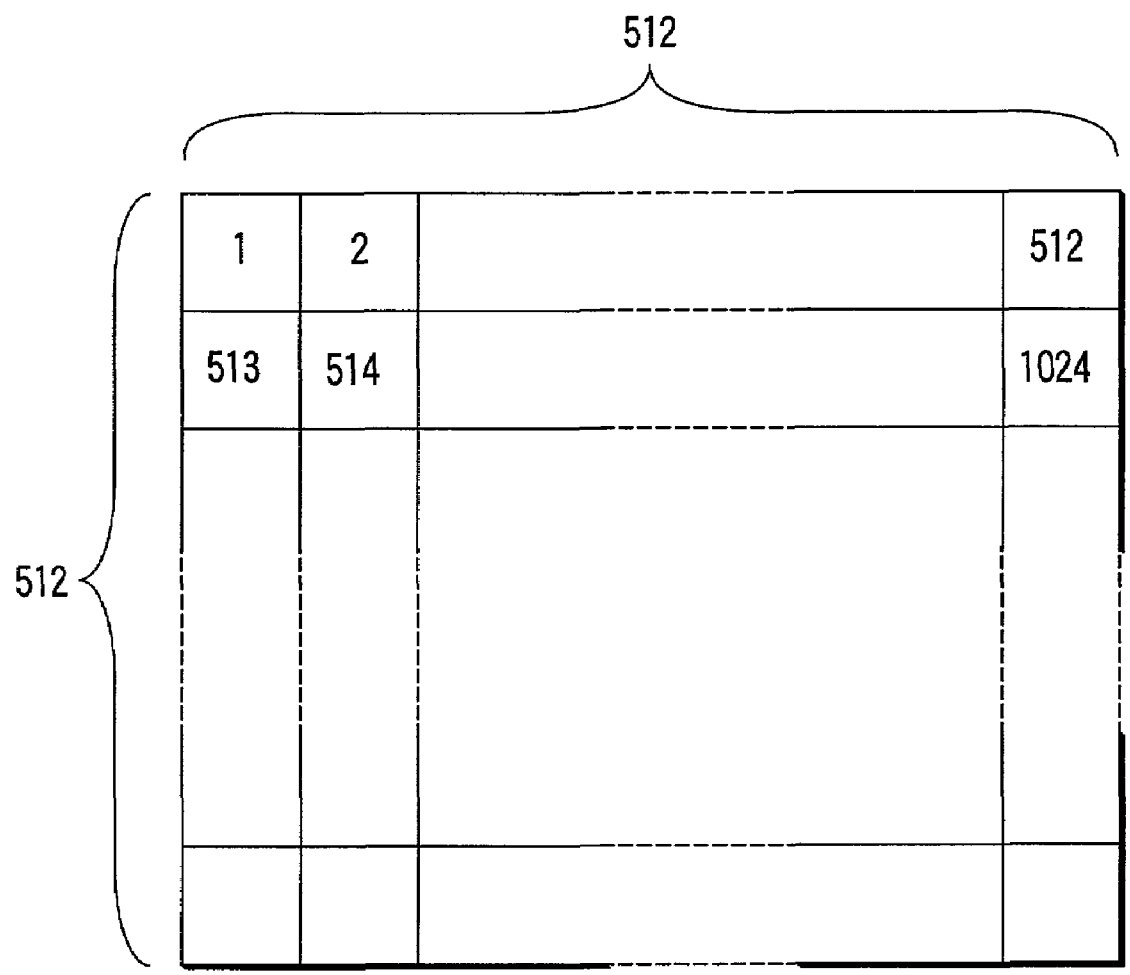
FIG. 2 is a diagram showing one example of a form of image data output from an image input section.

There will now be described embodiments of this invention with reference to the accompanying drawings.

First, a first embodiment of this invention is explained.

FIG. 1 schematically shows the configuration of an entrance management apparatus according to the first embodiment. The entrance management apparatus includes a reception device 1 disposed in position near a door of a doorway commonly used for all of gates of a facility, a plurality of terminal devices 2a, 2b, . . . disposed in positions corresponding rooms in the facility and a LAN 3 to which the reception device 1 and terminal devices 2a, 2b, . . . are connected.

The reception device 1 includes an ID reading section 11 used as identification information acquiring means, an image input section 12 used as image input means, a face feature amount extracting section 13 used as face image extracting means, face data registration section 14, door 15, a door control section 16 used as entrance control means, a dictionary management section 17 used as entrance permission time information forming means and the like.

Each of the terminal devices 2a (2b, . . . ) includes an image input section 21 (31) used as image input means, a door control section 23 (33) used as entrance control means, door 24 (34), face recognition section 22 (32) and the like.

The LAN 3 is a network to which the reception device 1 and terminal devices 2a, 2b, . . . are connected. The LAN 3 may be configured by a network using a communication line or a network using radio.

The ID reading section 11 acquires ID information (identification information) of a visitor. Each of the image input sections 12, 21, 31 acquires a face image of a visitor. The face feature amount extracting section 13 extracts a feature amount of a face of a visitor. Each of the door control sections 16, 23, 33 controls entrance of a visitor. The dictionary management section 17 forms entrance permission time information. Each of the face recognition sections 22, 32 recognizes a face image of a visitor. The door 15 is a door disposed at a common doorway for all of the gates of the facility. The door 24 (34) is a door disposed for a corresponding one of the rooms in the facility. The door control sections 16, 23, 33 control the fastening/unfastening states of the locks mounted on the respective doors 15, 24, 34. Further, the door control sections 16, 23, 33 may control the opening/closing operations of the respective doors 15, 24, 34.

Next, each of the above sections is explained in detail below.

The ID reading section 11 is operated by the visitor or the operator of the reception device 1 to input detail information (such as ID information) associated with a visitor in a place (for example, at the entrance of the visiting destination) where the reception device 1 is disposed. In the ID reading section 11, ID information given to each of the registrants is input. The ID information is information such as a character string, barcode or 2-dimensional code which is given to each registrant. Further, the ID information is stored in a storage medium such as a magnetic card, IC card or the like. The ID information may be input to the ID reading section 11 by the user using buttons or the like. Further, it is possible for the operator of the reception device 1 to adequately issue an ID number to a temporary visitor (unregistered person) and input the ID number to the ID reading section 11 for the visitor.

The image input section 12 photographs a face image of a visitor and inputs the photographed image at the reception desk of the visiting destination. The image input section 12 is mainly configured by a video camera, for example. As shown in FIG. 2, for example, the image input section 12 outputs a light and shade image photographed by use of the video camera as digital data (image data) configured by 512 pixels in the horizontal direction and 512 pixels in the vertical direction.

The face feature amount extracting section 13 performs an image searching process to detect a face pattern based on image data having a form as shown in FIG. 2 and output from the image input section 12 and an image extracting process to extract a detected image. The process by the face feature amount extracting section 13 is performed by the processing procedure as shown in the flowchart of FIG. 3, for example.

Figure 3:
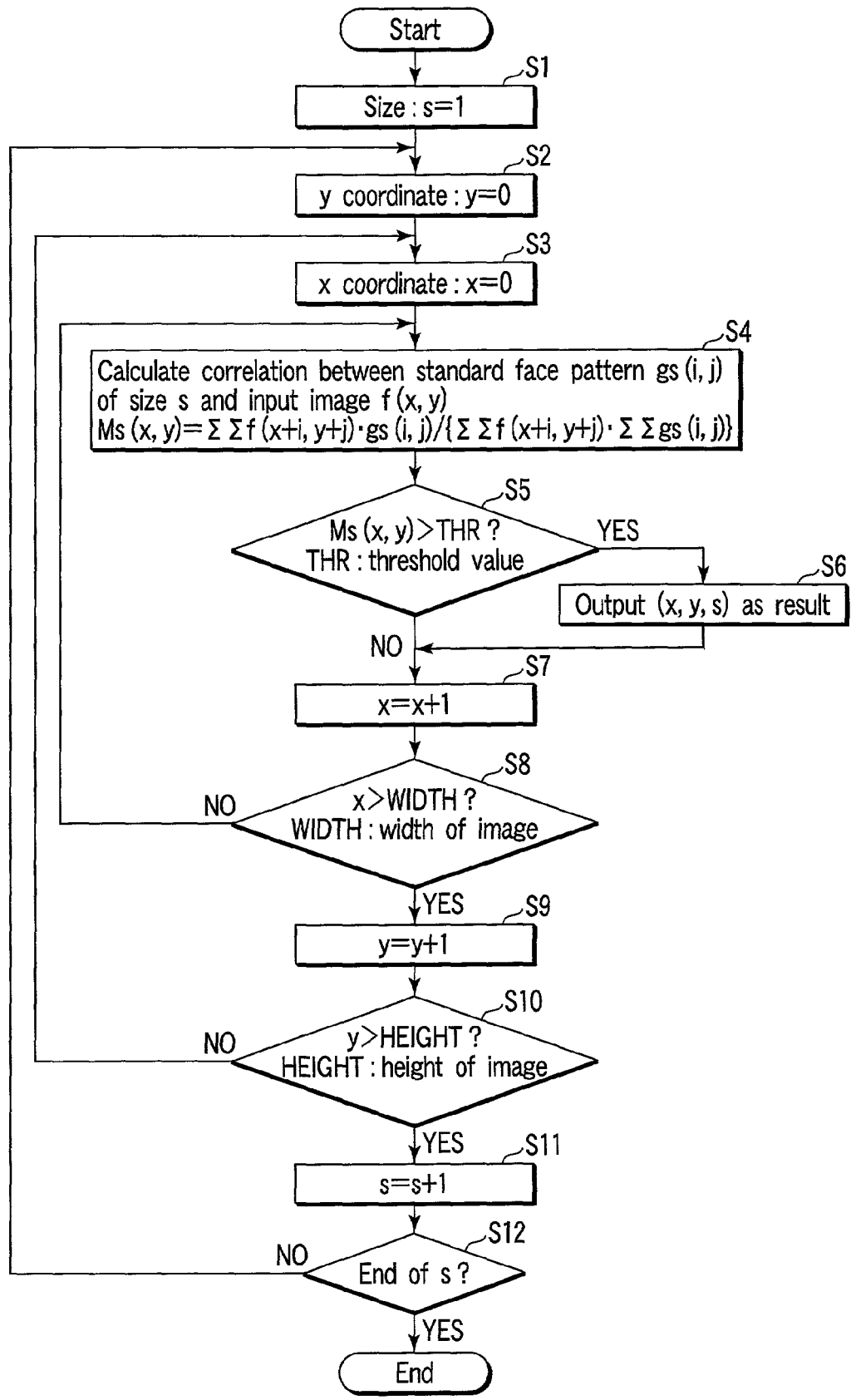
FIG. 3 is a flowchart for illustrating the processing procedure executed by a face feature extracting section.

Next, the processing procedure shown in FIG. 3 is explained. First, as the image searching process, the face feature amount extracting section 13 defines the size, y coordinate and x coordinate as s, y, x and initializes respective variables (steps S1 to S3). Then, the face feature amount extracting section 13 calculates correlations Ms(x, y) with a local region in an input image f(x, y) by use of a plurality of previously prepared standard face patterns gs(i, j) having different sizes according to the following equation (1) (step S4).

$$Ms(x,y)=\Sigma f(x+i,y+i)\cdot gs(i,j)/\{\Sigma f(x+i,y+i)\cdot \Sigma gs(i,j)/\}$$

The standard face patterns gs(i, j) having different sizes are formed by averaging previously collected face patterns having predetermined sizes.

Next, the face feature amount extracting section 13 determines that a face pattern is detected if the derived correlation Ms(x, y) is equal to or larger than a constant threshold value THR ("YES" in the step S5). If it is determined that a face pattern is detected, the face feature amount extracting section 13 outputs the detected face pattern (step S6).

The face feature amount extracting section 13 repeatedly performs a process such as the steps S4 to S6 while shifting the coordinates (x, y) (steps S7 to S10). Further, as typically shown in FIGS. 4, 5, 6, a process such as the steps S1 to S10 is repeatedly performed while changing the size s of the standard face pattern gs(i, j) (steps S11, S12). For example, FIG. 4 shows a case wherein s=1, FIG. 5 shows a case wherein s=2 and FIG. 6 shows a case wherein s=10.

The face feature amount extracting section 13 outputs a face pattern rc(i, j) which is normalized to have a constant image size with respect to the image pattern with the size s by performing the above image searching process. In this case, the subscript "c" is an identifier for given ID information. The face pattern rc(i, j) is used as reference data (reference feature amount) in the face recognition process. In FIGS. 4, 5, 6, reference numerals 41, 43, 45 each indicate the whole portion of an input image and reference numerals 42, 44, 46 indicate respective standard face patterns gs(i, j).

The face data registration section 14 stores (registers) each face pattern rc(i, j) which is the face feature amount output from the face feature amount extracting section 13 together with and in relation to ID information input from the ID reading section 11. At the time of completion of the above storing operation, the door control section 16 unlocks the door 15 to permit the visitor to enter the place.

Figure 7:
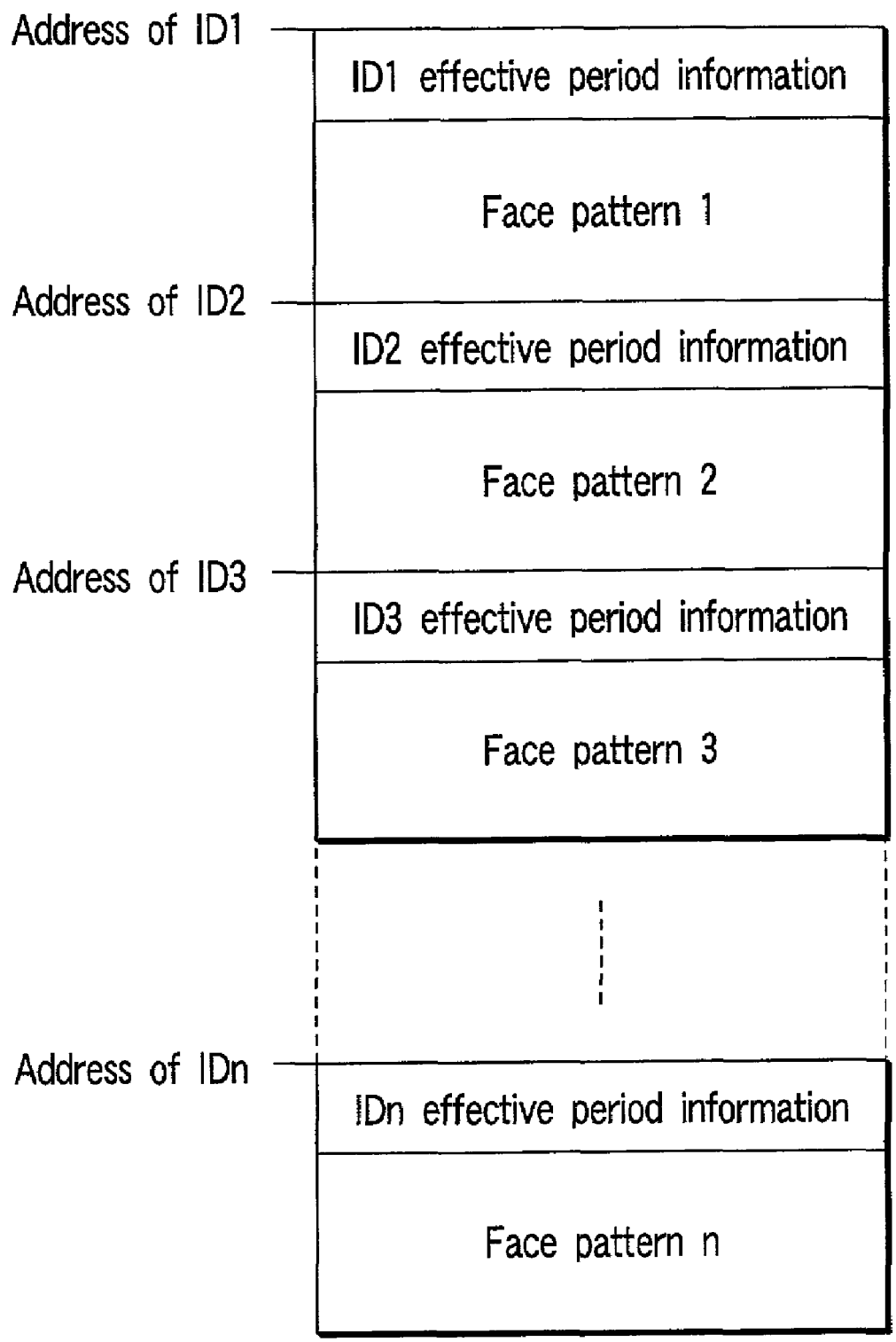
FIG. 7 is a diagram showing an example of data stored in a dictionary data management section.

The dictionary management section 17 stores ID information and information (entrance permission time information) defining a period (time) during which the face pattern is effective in relation to the face pattern stored in the face data registration section 14. For example, as shown in FIG. 7, in the dictionary data management section 17, each face pattern is stored in relation to a corresponding one of the entrance permission time information items having the ID information attached thereto. The entrance permission time information (effective period information) is set by the face data registration section 14 based on a preset effective period of time with the entrance permission time used as a reference.

For example, the face data registration section 14 creates entrance permission time information which keeps the face pattern effective only for preset time of t minutes while time at which information of "open the door" is output to the door control section 16 is set as a reference. The entrance permission time information is output to the dictionary data management section 17. The dictionary data management section 17 stores the entrance permission time information in relation to the face pattern. The entrance permission time information is transmitted together with the face pattern of the visitor to the face recognition sections 22, 32 as dictionary data by the dictionary data management section 17.

The entrance permission time information can be created by setting a time point at which ID information is input from the ID reading section 11 or a time point at which the face feature amount is extracted by the face feature amount extracting section 13 as a reference.

Further, the entrance permission time information can be created based on an effective time period which is adequately set by the operator of the reception device 1 or based on an effective time period previously set for each room of the visiting destination.

The image input section 21 is disposed in position near the door 24 at the entrance of a "room A". The image input section 21 photographs a face image of a visitor who comes near the entrance of the "room At". For example, the image input section 21 is mainly configured by a video camera. For example, as shown in FIG. 2, the image input section 21 outputs a photographed image as digital light and shade image data of 512 pixels in the horizontal direction and 512 pixels in the vertical direction to the face recognition section 22.

The image input section 31 is disposed in position near the door 34 at the entrance of a "room B". The image input section 31 photographs a face image of a visitor who comes near the entrance of the "room B". For example, the image input section 31 is mainly configured by a video camera. For example, as shown in FIG. 2, the image input section 31 outputs a photographed image as digital light and shade image data of 512 pixels in the horizontal direction and 512 pixels in the vertical direction to the face recognition section 32.

The door 24 is provided at the entrance of the "room A". The locking/unlocking state of the door 24 is controlled by the door control section 23. The door 34 is provided at the entrance of the "room B". The locking/unlocking state of the door 34 is controlled by the door control section 33.

A visitor who obtains permission of entrance at the reception device 1 passes the reception desk and visits a to-be-visited place. For example, a visitor who obtains permission of entrance at the reception desk comes near the door 24 at the entrance of the "room A", the image input section 21 photographs a face image of the visitor and outputs the photographed face image to the face recognition section 22.

The face recognition section 22 extracts a feature amount from the face image of the visitor input from the image input section 21. After extracting the feature amount, the face recognition section 22 performs a collation process for collating the extracted feature amount with dictionary data (face patterns) transmitted from the dictionary data management section 17 via the LAN 3. If it is determined by the collation process that the visitor is the subject person, the face recognition section 22 determines whether entrance of the visitor is permitted or not based on the entrance permission time information. If it is determined in the above determination process that the entrance is permitted, the face recognition section 22 causes the door control section 23 to unlock the door 24. As a result, the visitor is permitted to enter the "room A".

That is, like the face feature amount extracting section 13, the face recognition section 22 performs a face pattern extracting process based on the face image of the visitor input from the image input section 21. The face recognition section 22 performs a collation process for collating the face pattern extracted by the extraction process with the face pattern (dictionary pattern) transmitted from the dictionary data management section 17. If a plurality of face patterns are transmitted from the dictionary data management section 17, the most similar face pattern (the face pattern having the maximum similarity) is used as the result of collation. The above process (face collating process) is performed according to the processing procedure shown in the flowchart of FIG. 8, for example.

Figure 8:
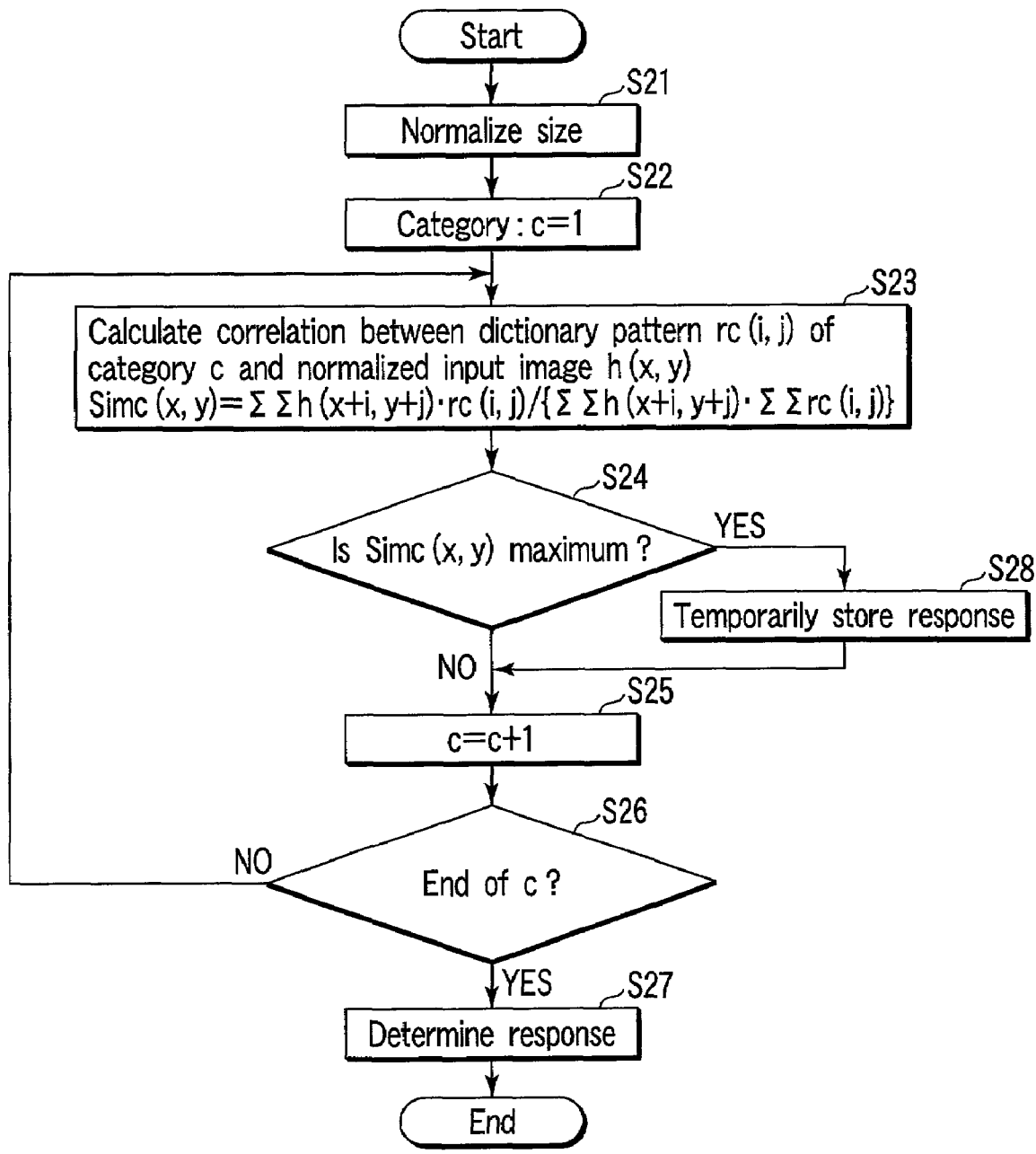
FIG. 8 is a flowchart for illustrating the processing procedure executed by a face recognition section.

The processing procedure shown in FIG. 8 is explained below.

First, the face recognition section 22 detects a range of a face image with respect to image data input from the image input section 21. When the range of the face image is detected, the face recognition section 22 normalizes the size of an image having preset numbers of pixels in the horizontal and vertical directions with respect to the detected range of the face image to create a face pattern h(x, y) (step S21). Next, the face recognition section 22 initializes a category c (step S22). After initializing the category c, the face recognition section 22 calculates similarity Simc(x, y) between face patterns (dictionary patterns) rc(i, j) of the category c in the dictionary data management section 17 and the normalized face pattern h(x, y) (step S23). The similarity Simc(x, y) is calculated by deriving the correlation according to the following equation.

$$\mathrm{Sim}c(x,y) = \Sigma h(x+i, y+i) \cdot rc(i,j) / \{\Sigma h(x+i, y+i) \cdot \Sigma rc(i,j)\}$$

The face recognition section 22 performs the calculation process of the similarity Simc(x, y) for all of the face patterns (dictionary patterns) rc(i, j) of the category c. The face recognition section 22 outputs the maximum similarity Simc(x, y) as the result of collation (steps S24 to S28). Thus, the face recognition section 22 determines a person corresponding to the maximum similarity Simc(x, y) among the similarities between the face pattern h(x, y) and the dictionary patterns rc(i, j) of the category c.

As described above, when the maximum similarity Simc (x, y) is obtained, the face recognition section 22 supplies information of "open the door" to the door control section 23 to unlock the door 24 if the maximum similarity Simc(x, y) is larger than a preset threshold value and effective period information corresponding to the ID information attached thereto indicates an appropriate time period.

As a result, even in a case where a plurality of visitors are present and a collation process of 1:N is to be performed, an individual collation process approximately equal to a collation process of 1:1 can be performed by limiting data.

Since the image input section 31, face recognition section 32, door control section 33 and door 34 provided for the "room B" perform the same operations as those of the image input section 21, face recognition section 22, door control section 23 and door 24 provided for the "room A", the explanation thereof is omitted.

As described above, according to the first embodiment, it is possible to provide an entrance management apparatus which permits a visitor to pass through within a specified time by recognizing the face of the visitor so as to ensure high security and permits the visitor to easily enter the place without requiring the visitor to perform a special operation.

Next, a second embodiment of this invention is explained.

Figure 9:
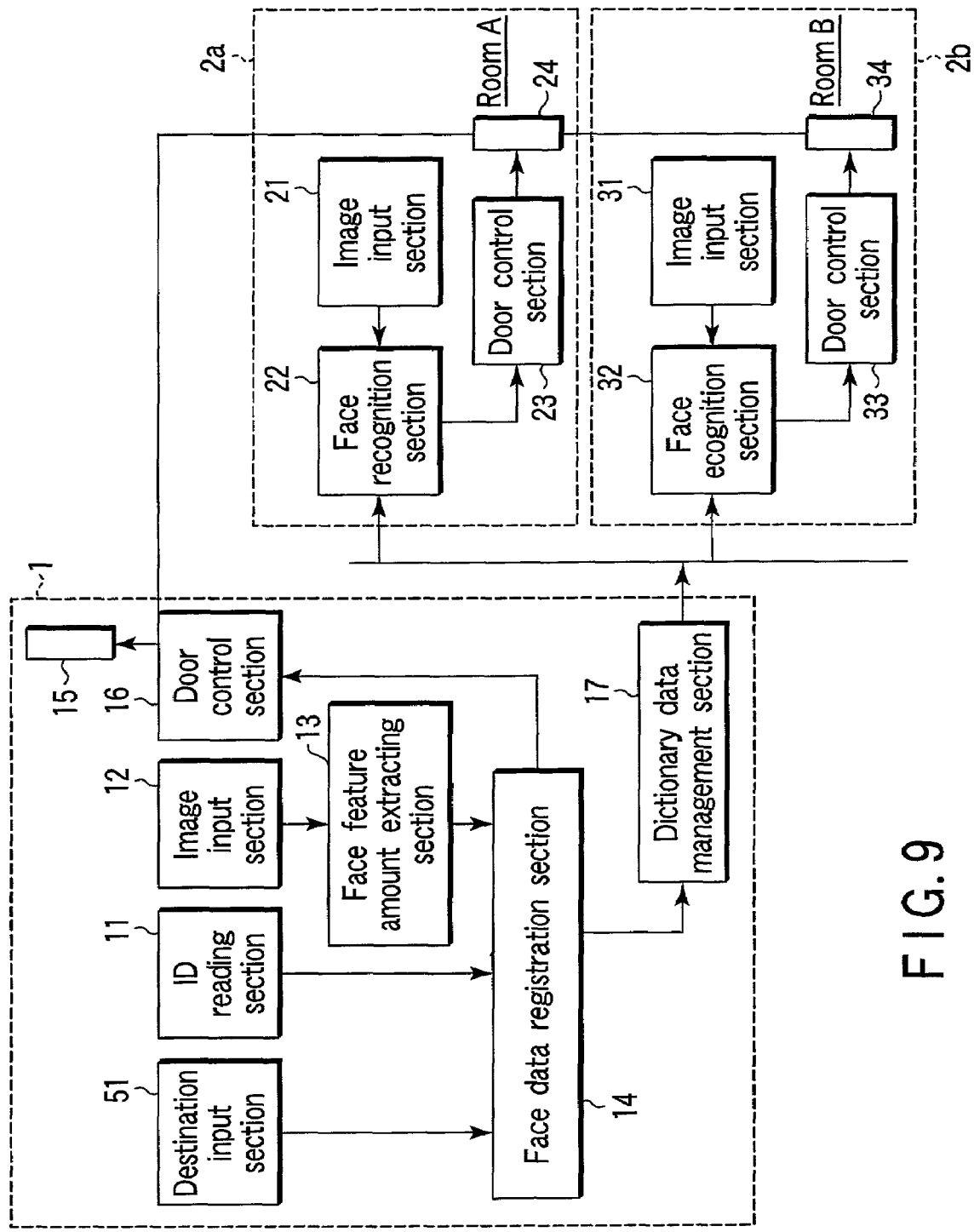
FIG. 9 is a block diagram schematically showing the configuration of an entrance management apparatus according to a second embodiment of this invention.

FIG. 9 schematically shows the configuration of an entrance management apparatus according to the second embodiment. As shown in FIG. 9, the second embodiment is obtained by additionally providing a destination input section 51 used as visiting place information acquiring means in the reception device 1 of the first embodiment. The destination input section 51 is used to acquire visiting place information indicating a visiting place which a visitor is to visit. Further, in the second embodiment, the operations of a dictionary data management section 17 and face recognition sections 110, 111 are different from those of the first embodiment by additionally providing the destination input section 51. The second embodiment is similar to the first embodiment except that the destination input section 51 is additionally provided.

Therefore, only a portion of the second embodiment which is different from that of the first embodiment is explained.

The destination input section 51 is used to input visiting place information indicating a visiting place (destination) which the visitor is to visit. The destination input section 51 is configured by a keyboard, for example. The visiting place information is input by the operator of the reception device 1 by using the destination input section 51. It is also possible for the visitor to input visiting place information by use of the destination input section 51.

Figure 10:
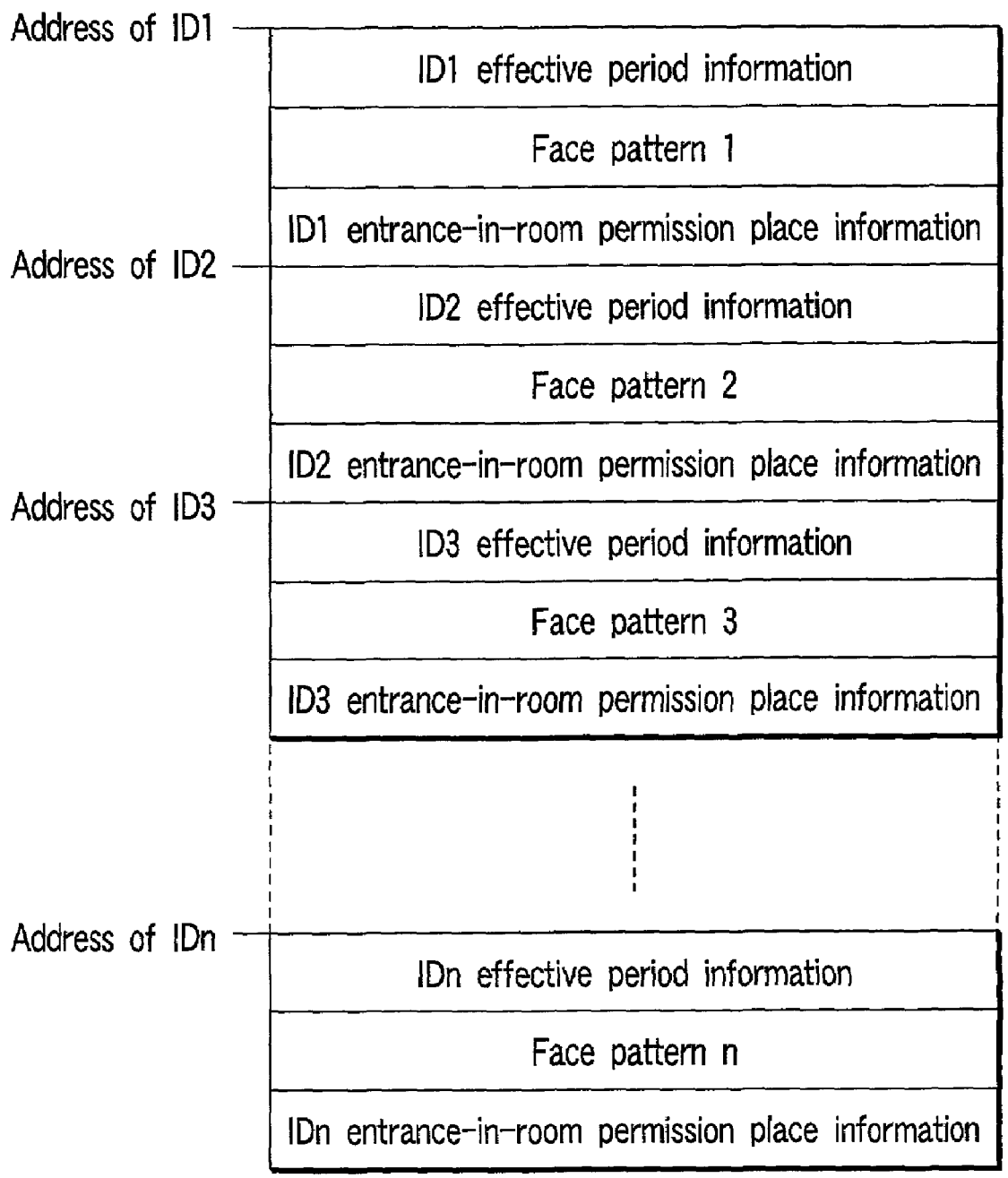
FIG. 10 is a diagram showing an example of data stored in a dictionary data management section.

As shown in FIG. 10, the dictionary data management section 17 attaches each entrance permission time information created by a face data registration section 14 and each visiting place information input by the destination input section 51 to a corresponding one of face patterns stored in the face data registration section 14. As explained in the first embodiment, the entrance permission time information is information (entrance permission time information) defining a period (time) during which the face pattern is kept effective with the entrance permission time set as a reference.

For example, the face data registration section 14 creates entrance permission time information which keeps the face pattern effective only for a preset period of t minutes while time at which information of "open the door" is output to the door control section 16 is set as a reference. If the face data registration section 14 creates the entrance permission time information, the dictionary data management section 17 attaches the entrance permission time information to the said face pattern and attaches the visiting place information input by the destination input section 51 thereto. The dictionary data management section 17 supplies the face pattern having the entrance permission time information and visiting place information attached thereto to the face recognition section 22 or 32 as dictionary data of the visitor. The dictionary data management section 17 may be configured to select one of the face recognition sections to which the dictionary data is supplied based on the visiting place information.

The dictionary data management section 17 stores each ID information, entrance permission time information and visiting place information in connection with a corresponding one of the face patterns stored in the face dictionary registration section 14. For example, as shown in FIG. 10, in the dictionary data management section 17, the respective face patterns are stored in relation to corresponding entrance permission time information items (effective period information items) each having ID information attached thereto and corresponding visiting place information items (entrance permission place information items) each having ID information attached thereto. The entrance permission time information is set by the face dictionary registration section 14 based on a preset effective time period with the entrance permission time set as a reference.

For example, the face dictionary registration section 14 creates entrance permission time information which makes and keeps the face pattern effective only for a preset period of t minutes while a time point at which information of "open the door" is output to the door control section 16 is set as a reference. The entrance permission time information is output together with visiting place information input by the destination input section 51 and the face pattern of the visitor to the dictionary data management section 17. The dictionary data management section 17 stores the entrance permission time information and visiting place information in connection with the face pattern. The entrance permission time information and visiting place information are supplied together with the face pattern of the visitor to the face recognition section 22 or 32 as dictionary data by the dictionary data management section 17.

When a visitor who obtains permission of entrance at the reception device 1 arrives at the entrance (second gate) of the visiting place, the image input section of the terminal device disposed at the entrance of the visiting place photographs a face image of the visitor. For example, if the visitor appears in front of the "room A", the image input section 21 of the terminal device 2a photographs a face image of the visitor. The face image photographed by the image input section 21 is output to the face recognition section 22.

The face recognition section 22 (32) extracts a feature amount from the face image of the visitor output from the image input section 21 (31) and performs a collation process for collating the extracted feature amount with dictionary data (face patterns) transmitted from the dictionary data management section 17. If it is determined by the collation process that the visitor is the subject person, the face recognition section 22 (32) determines whether entrance of the visitor is permitted or not based on the entrance permission time information and visiting place information. If it is determined in the above determination process that permission of entrance is given, the face recognition section 22 (32) causes the door control section 23 (33) to unlock the door 24 (34) and permit the visitor to enter the "room A".

That is, like the face feature amount extracting section 13, the face recognition section 22 performs a face pattern extracting process and then performs a collation process for collating the extracted face pattern with the face patterns transmitted from the dictionary data management section 17. Like the first embodiment, the above process is performed according to the processing procedure shown in the flowchart of FIG. 6 and the maximum similarity Simc(x, y) is determined as an answer.

When the maximum similarity Simc(x, y) is obtained, the face recognition section 22 outputs information of "open the door" to the door control section 23 to unlock the door 24 if the maximum similarity Simc(x, y) is larger than a preset threshold value, effective period information corresponding to the ID information attached thereto indicates an appropriate time period and the visiting place is a place corresponding to visiting place information which corresponds to the said ID information.

The terminal device 2b provided for the "room B" performs the same operation as that of the terminal device 2a provided for the "room A". Therefore, the explanation for the terminal device 2b provided for the "room B" is omitted.

As described above, according to the second embodiment, it is possible to provide an entrance management apparatus which permits a visitor to enter a specified place within a specified time by recognizing the face of the visitor so as to ensure high security and permits the visitor to easily enter the place without requiring the visitor to perform a special operation.

Next, a third embodiment of this invention is explained.

Figure 11:
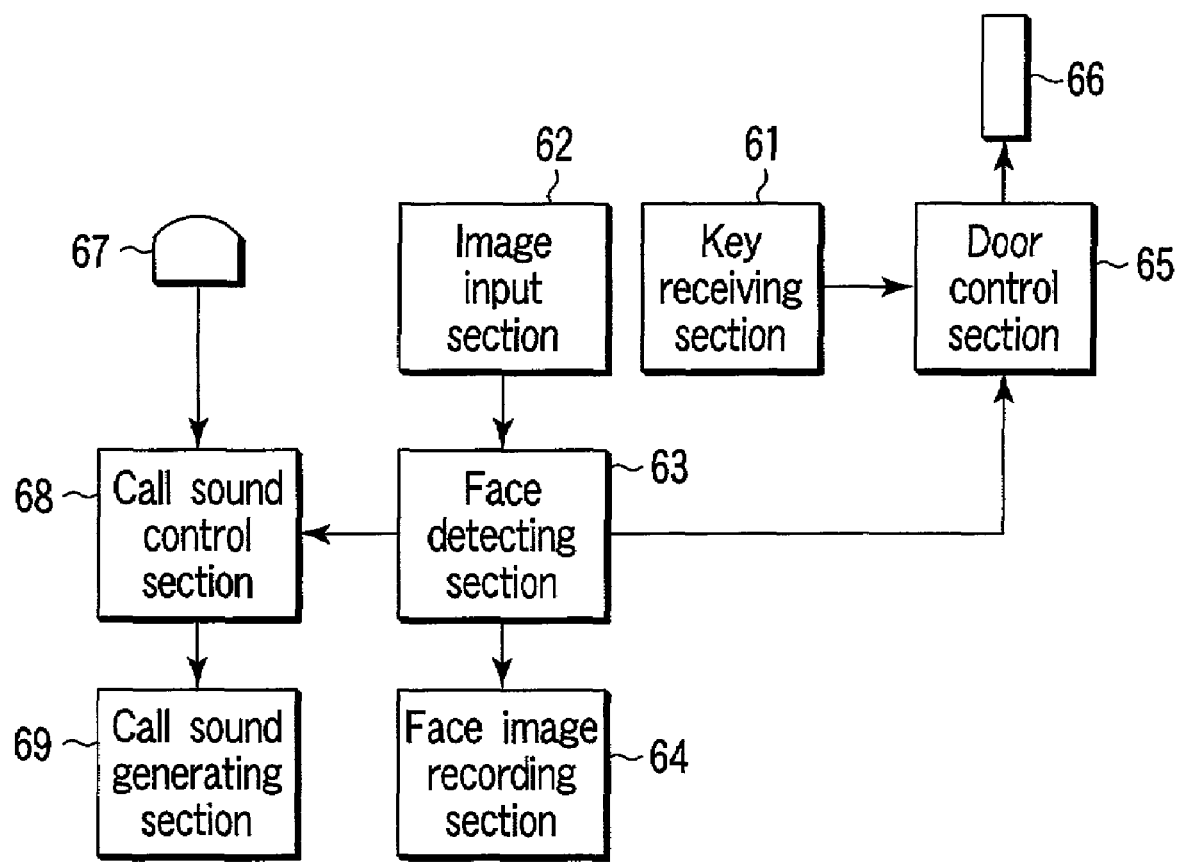
FIG. 11 is a block diagram schematically showing the configuration of an entrance management apparatus according to a third embodiment of this invention.

FIG. 11 schematically shows the configuration of an entrance management apparatus according to the third embodiment. For example, the third embodiment is applied to the reception device 1 explained in the first embodiment or applied to each of the terminal devices 2a, 2b, . . . .

In the following description of the third embodiment, an entrance management apparatus which mainly controls entrance at one entrance is explained.

As shown in FIG. 11, the entrance management apparatus includes a key receiving section 61 used as key medium receiving means, an image input section 62 used as image input means, a face detecting section 63 used as face detecting means, a face image recording section 64 used as image recording means, a door control section 65 used as lock control means, door 66, a call button 67 used as call signal input means, call sound control section 68 and a call sound generating section 69 used as call information generating means.

The key receiving section 61 receives a key medium presented by the visitor. The image input section 62 acquires a face image of the visitor. The face detecting section 63 detects a face pattern from a face image input by the image input section. The face image recording section 64 records a face image input by the image input section or a face pattern detected by the face detecting section. The door control section 65 controls the fastening/unfastening state of a lock mounted on the door 66. The call button 67 inputs a call signal used to generate a call sound by which the visitor calls a to-be-visited person. The call sound control section 68 controls the call sound in response to depression of the call button. The call sound generating section 69 issues a call sound to call the to-be-visited person under the control of the call sound control section.

Next, each of the above sections is explained in detail.

The key receiving section 61 receives a key medium such as a key, magnetic card or IC card presented by the visitor to unlock the door at the entrance of the visiting place. The key receiving section 61 outputs information of "open the door" to the door control section 61 only when the received key medium is an adequate key medium.

The image input section 62 photographs a face image of the visitor and outputs the photographed face image to the face detecting section 63. The image input section 62 is mainly configured by a video camera, for example. As shown in FIG. 2, the image input section 62 outputs a light and shade image photographed by use of a video camera or the like as digital data (image data) configured by 512 pixels in the horizontal direction and 512 pixels in the vertical direction.

The face detecting section 63 detects and extracts a face pattern from the image data of a form shown in FIG. 2 and input from the image input section 62. For example, the process is performed by the processing procedure shown in the flowchart of FIG. 3. Since the process is the same as that explained in the first embodiment, the explanation thereof is omitted.

When the result of detection is larger than a preset threshold value THR, the face detecting section 63 supplies a signal which permits the door control section 65 and call sound control section 68 to operate, and at the same time, supplies a signal which causes the face image recording section 64 to record the face image input from the image input section 62.

When the face detecting section 63 detects the face pattern, the face image recording section 64 records the face image of the visitor input from the image input section 62. The face image recording section 64 is configured by an image recoding device using a video tape recorder, hard disk device or semiconductor memory, for example.

If the door control section 65 is supplied with both of information of "open the door" output when a proper key medium is presented to the key reception section 61 and an "operation permission signal" output when the face detecting section 63 detects a face, it unlocks the door 66. If the door control section 65 unlocks the door 66, the visitor obtains permission of entrance.

That is, even if a proper key medium is presented to the key reception section 61, the door control section 65 is not operated unless a face pattern is detected. Therefore, even if a person who tries to unfairly enter the place has a key medium, the entrance is not permitted unless the face image is recorded. Thus, all of the persons who try to enter the place can be monitored and the effect of inhibiting the unfair or dishonest access can be attained.

When receiving an operation permission signal from the face detecting section 63, the call sound control section 68 makes a call signal from the call button 67 effective. If the call button 67 is depressed while the call signal is kept effective, the call sound control section 68 outputs a call signal which causes a call sound to be generated to the call sound generating section 69. When receiving the call signal from the call sound control section 68, the call sound generating section 69 generates a call sound.

Thus, the call sound control section 68 controls the call sound according to the result of detection of the face pattern in the face detecting section 63. That is, the call sound control section 68 causes a call sound to be generated in response to depression of the call button 67 only when the face detecting section 63 detects the face pattern. If the face detecting section 63 does not detect the face pattern, the call sound control section 68 does not cause a call sound to be generated.

As a result, a mischievous call by a doubtful person can be monitored and the effect of inhibiting the mischievous behavior can be attained.

Thus, according to the third embodiment, it is possible to provide an entrance management apparatus which has a monitoring function and inhibition effect to prevent dishonest entrance by detecting and recognizing the face of a visitor so as to attain high security.

Next, a fourth embodiment of this invention is explained.

FIG. 12 schematically shows the configuration of an entrance management apparatus according to the fourth embodiment. As shown in FIG. 12, the fourth embodiment is obtained by adding a face image recoding section 71 and face data monitoring section 72 to the second embodiment. That is, in the fourth embodiment, the operation for recording an input face image and outputting the recorded face image and the like as a visible image as required is added to the second embodiment. Therefore, in the following explanation for the fourth embodiment, the explanation for the same portions as those of the second embodiment is omitted.

The face image recoding section 71 has the same function as the face image recording section 64 explained in the third embodiment. The face image recoding section 71 records a face image input from the image input section 21 or 31 when a face pattern is detected by the face recognition section 22 or 32. The face image recoding section 71 is configured by an image recoding device using a video tape recorder, hard disk device or semiconductor memory, for example.

The face data monitoring section 72 permits monitoring of dictionary data stored in the dictionary management section 17 and an image recorded in the face image recoding section 71 by visual observation. That is, the face data monitoring section 72 is useful in monitoring the entrance state at the doors 24, 34. For example, the face data monitoring section 72 causes a display device 72a to visually display dictionary data stored in the dictionary management section 17 and an image recorded in the face image recoding section 71. Further, the face data monitoring section 72 may cause an image forming device 72b to print dictionary data stored in the dictionary management section 17 and an image recorded in the face image recoding section 71.

Figure 13:
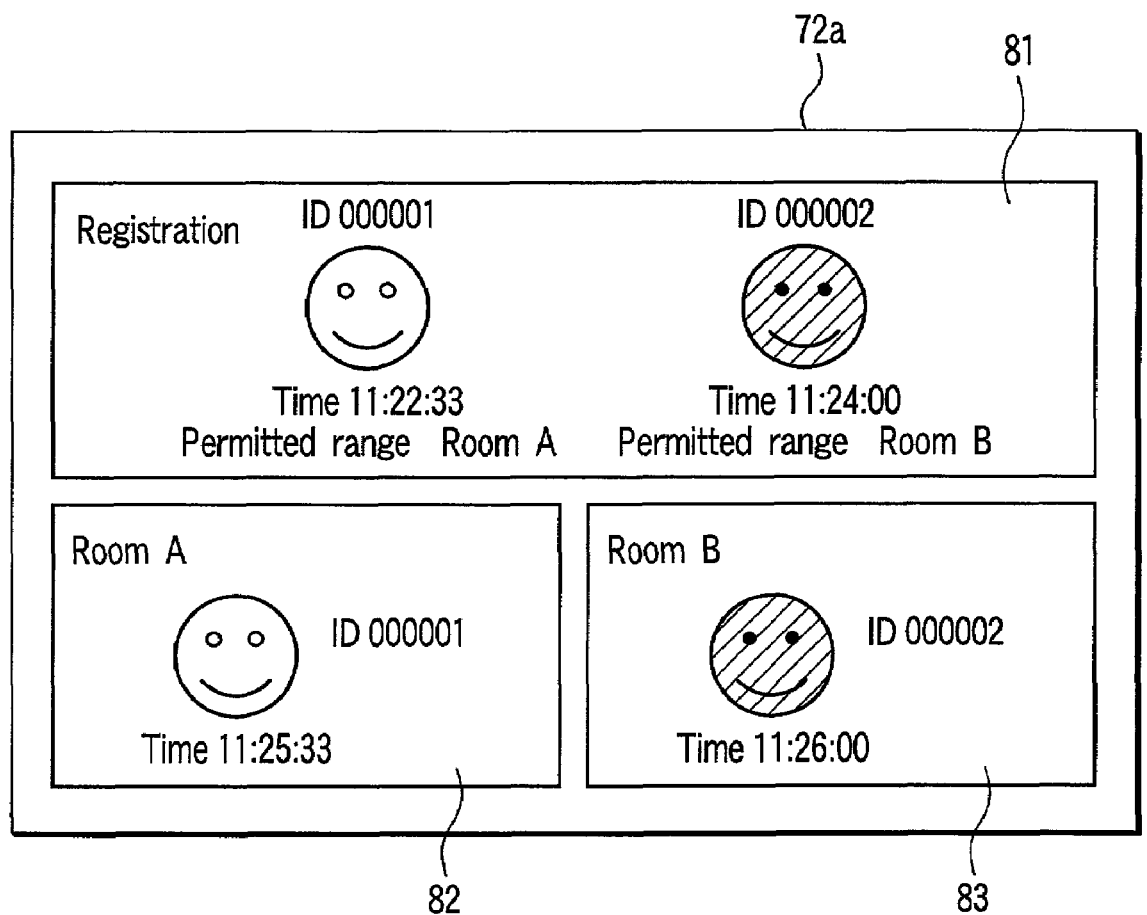
FIG. 13 is a view showing an example of data displayed on a face data monitoring section.

FIG. 13 shows an example of display of the display device 72a provided on the face data monitoring section 72. As shown in FIG. 13, the face data monitoring section 72 visually displays information as shown in FIG. 13 on the display device 72a, for example. In the example of FIG. 13, the display device 72a has display areas 81, 82, 83. In the display area 81, data such as entrance permission time information, ID information and face pattern registered in the dictionary management section 17 is displayed. In the display area 82, ID information selected as the result of face recognition, passage time, face image acquired in the "room A" and the like are displayed. In the display area 83, ID information selected as the result of face recognition, passage time, face image acquired in the "room B" and the like are displayed. Thus, it is possible to instantly monitor and determine whether or not a registered visitor enters a correct visiting place at correct time.

As described above, according to the fourth embodiment, it is possible to provide an entrance management apparatus which can permit a visitor to pass through within a specified period of time by recognizing the face of the visitor so as to ensure high security, permit the visitor to easily enter the visiting place without requiring the visitor to perform a special operation and monitor the state thereof.

Next, a fifth embodiment of this invention is explained.

Figure 14:
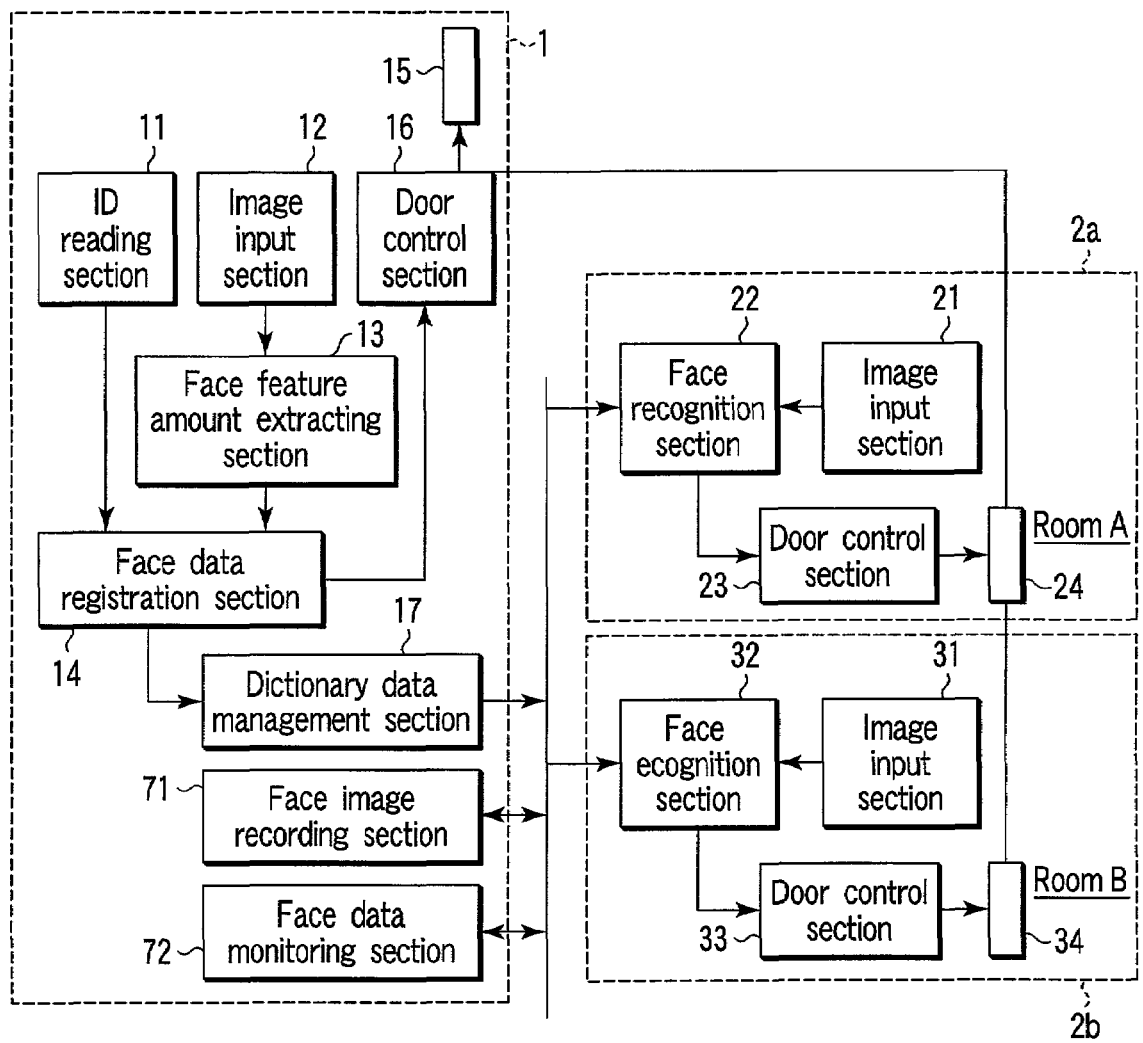
FIG. 14 is a block diagram schematically showing the configuration of an entrance management apparatus according to a fifth embodiment of this invention.

FIG. 14 schematically shows the configuration of an entrance management apparatus according to the fifth embodiment. The fifth embodiment can be attained by adding a face image recoding section 71 and face data monitoring section 72 which are substantially the same as those of the fourth embodiment to the first embodiment.

Therefore, in the fifth embodiment, the face image recoding section 71 and face data monitoring section 72 are substantially the same as those of the fourth embodiment and the remaining configuration is the same as that of the first embodiment and the explanation thereof is omitted.

As described above in detail, according to the first to fifth embodiments of this invention, it is possible to provide an entrance management apparatus and entrance management method which can permit a visitor to pass through within a specified period of time so as to ensure high security and permit the visitor to easily enter the visiting place without requiring the visitor to perform a special operation.

Further, according to the second embodiment, it is possible to provide an entrance management apparatus and entrance management method which can permit a visitor to enter a specified place within a specified period of time so as to ensure high security and permit the visitor to easily enter the specified place without requiring the visitor to perform a special operation.

In addition, according to the third embodiment, an entrance management apparatus and entrance management method can be provided which have a monitoring function and inhibition effect to prevent dishonest entrance so as to attain a high security effect.

Further, according to the fourth and fifth embodiments, it is possible to provide an entrance management apparatus and entrance management method which can permit a visitor to pass through only within a specified period of time so as to ensure high security, permit the visitor to easily enter a specified place without requiring the visitor to perform a special operation and monitor the state thereof.

Next, sixth to ninth embodiments of this invention are explained with reference to the accompanying drawings below.

In the following sixth to ninth embodiments, a case wherein an entrance management apparatus is applied to an apartment house such as a high-class apartment house is explained.

First, the sixth embodiment is explained.

The sixth embodiment is an entrance management apparatus which controls access of a person who temporarily obtains permission of entrance. The sixth embodiment is explained in detail below.

FIG. 15 schematically shows the whole configuration of an entrance management apparatus according to the sixth embodiment and a building such as an apartment house to which the entrance management apparatus is applied. In FIG. 15, a reference numeral 101 indicates a building such as an apartment house (for example, a high-class apartment house). In the apartment house 101, one common doorway 102 is provided and a plurality of rooms 103, . . . are provided. That is, after a person who comes from the exterior passes the common doorway 102 and enters the building, he enters a corresponding one of the rooms 103.

The entrance management apparatus is configured by a reception server 104 used as a reception processing device disposed at the common doorway 102 of the building 101, a plurality of room terminal devices 105, . . . respectively disposed at the entrances of the plurality of rooms 103 in the building 101, and a network device 106 which connects the reception server 104 and a plurality of room terminal devices 105 so that they can communicate with each other.

In each of the following embodiments, a case wherein the reception server 104 is disposed at the common doorway 102 of the whole building 101 and the room terminal devices 105 are respectively disposed for the rooms 103 in the building 101 is explained. Application of the entrance management apparatus explained in the following embodiments is not limited to the rooms in the building and it can be applied to an open space in the outdoors or a facility in the outdoors. Further, in each of the following embodiments, an example in which a plurality of rooms are provided in the building such as an apartment house is explained in order to clarify the explanation.

FIG. 16 is a view showing an example of the configuration of the reception server 104 disposed at the common doorway 102 of the building 101.

As shown in FIG. 16, the reception server 104 includes a camera 111, liquid crystal monitor (display means) 112, speaker 113, microphone 114, control device 115, registration information holding device 116 and door control device 117.

For example, as shown in FIG. 16, the camera 111 photographs at least a face image of a person (also referred to as a visitor) standing in front of a door 102a of the common doorway 102. The display section 112 is configured by a liquid crystal display device or the like. The display section 112 displays an image photographed by the camera 111 or guidance from each of the room terminal devices 105, for example. The speaker 113 outputs a response with a voice from a person in each of the rooms 103 or guidance from each of the room terminal devices 105 with a voice. The microphone 114 transmits a voice of a visitor to each of the room terminal devices.

The control device 115 is configured by a personal computer or work station, for example. The control device 115 performs the control process for the whole portion of the entrance management apparatus, face image registration process, authentication process and the like. The registration information holding device 116 registers (stores) feature amounts of faces of persons (registrants) who are previously permitted to enter the building 101 as reference feature amounts. The door control device 117 controls an electric lock 102b of the door 102a on the common doorway 102 based on the result of authentication of a face of a person.

Among the above devices, the camera 111, display section 112, speaker 113 and microphone 114 are disposed outside the door 102a and the other devices are disposed near the common doorway 102.

Next, the room terminal device 105 is explained.

Figures 17, 18:
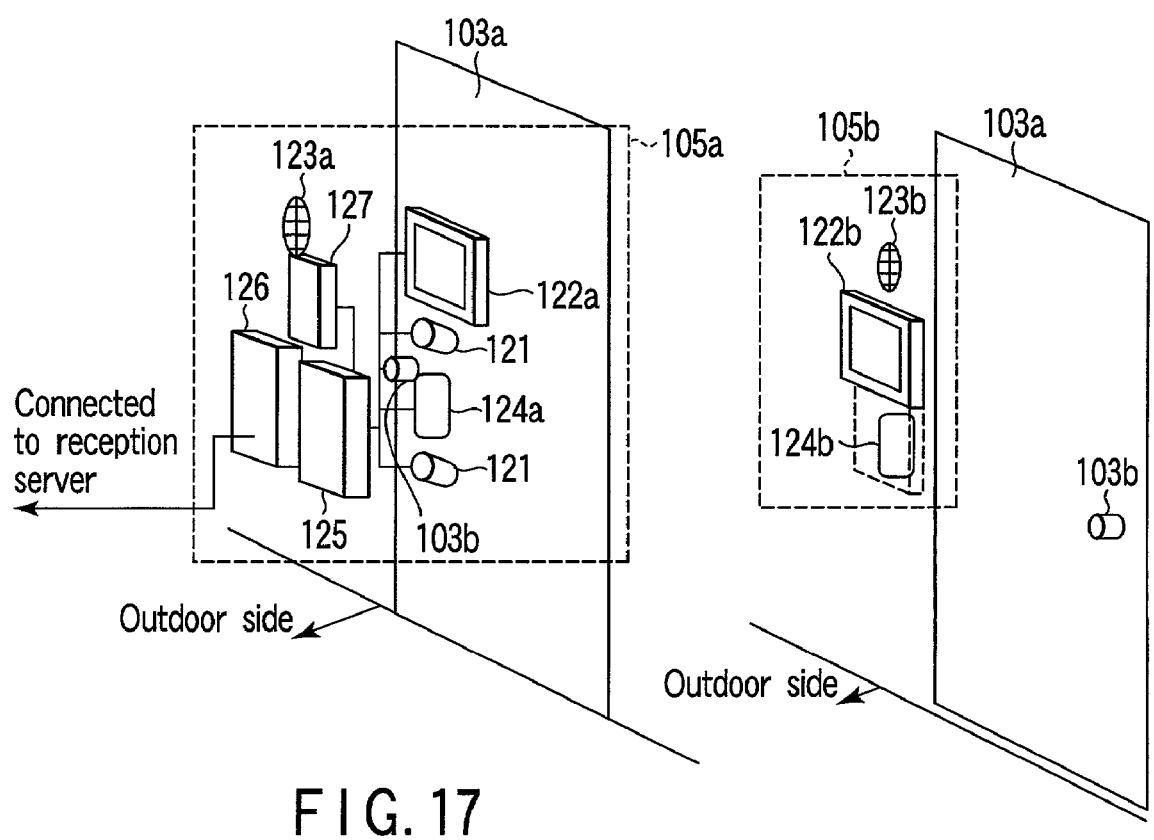
FIG. 17 is a simulated view schematically showing the configuration of a room terminal device provided inside the room in the sixth embodiment.
FIG. 18 is a simulated view schematically showing the configuration of a room terminal device provided outside the room in the sixth embodiment.

FIGS. 17 and 18 are views showing the configuration of the room terminal device 105.

As shown in FIGS. 17 and 18, each room terminal device 105 includes an outdoor room terminal device 105a disposed on the outdoor side and near a door 103a of a corresponding one of the rooms 103 and an indoor room terminal device 105b disposed on the indoor side and near the door 103a of the room 103. FIG. 17 shows an example of the configuration of the outdoor room terminal device 105a and FIG. 18 shows an example of the configuration of the indoor room terminal device 105b.

The room terminal device 105 includes a camera 121, display sections 122a, 122b, speakers 123a, 123b, microphones 124a, 124b, control device 125, registration information holding device 126 and door control device 127.

Further, as shown in FIG. 17, in the outdoor room terminal device 105a, the camera 121, display section 122a, speaker 123a, microphone 124a, control device 125, registration information holding device 126 and door control device 127 are provided. As shown in FIG. 18, in the indoor room terminal device 105b, the display section 122b, speaker 123b, microphone 124b are provided.

The camera 121 is disposed on the outdoor side and near the entrance of the room 103. The camera 121 photographs at least a face image of a person (also referred to as a visitor) standing in front of the outdoor side of the door 103a.

The display section 122*a* is configured by a liquid crystal display device or the like. The display section 122*a* displays guidance for a visitor on the outdoor side. The speaker 123*a* issues a response with a voice from a person in the room or guidance with a voice. The display section 122*b* is configured by a liquid crystal display device or the like. The display section 122*b* displays a face image of a visitor who stands on the outdoor side and photographed by the camera 121 for a person in the room. The speaker 123*a* issues a response with a voice from a person in the room or guidance with a voice.

The microphone 124*a* issues a voice to a person in the room from a visitor on the outdoor side. The microphone 124*a* outputs a voice to the indoor speaker 123*b* under the control of the control device 125. The microphone 124*b* issues a response voice from a person in the room to the visitor. The microphone 124*b* transmits a voice to the speaker 123*a* on the outdoor side or the speaker 113 of the reception server 104 under the control of the control device 125.

The control device 125 is configured by a personal computer or work station, for example. The control device 125 performs the control process for the whole portion of the room terminal device 105, face image registration process, face image authentication process and the like.

The registration information holding device 126 reads out face feature amounts of persons registered in the registration information holding device 16 and registers (stores) them as reference feature amounts. The door control device 127 controls an electric lock 103*b* of the door 103*a* based on the result of authentication of a face of a person.

Among the above devices, the control device 125, registration information holding device 126 and door control device 127 may be disposed in position near the entrance of the room 103 or may be disposed on the indoor side. Further, the position of the constituents of the indoor room terminal device 105*b* is not limited to the nearby portion of the door 103*a* and it is satisfactory if they are disposed inside the room 103.

Next, the internal configuration of the reception server 104 is explained.

Figure 19:
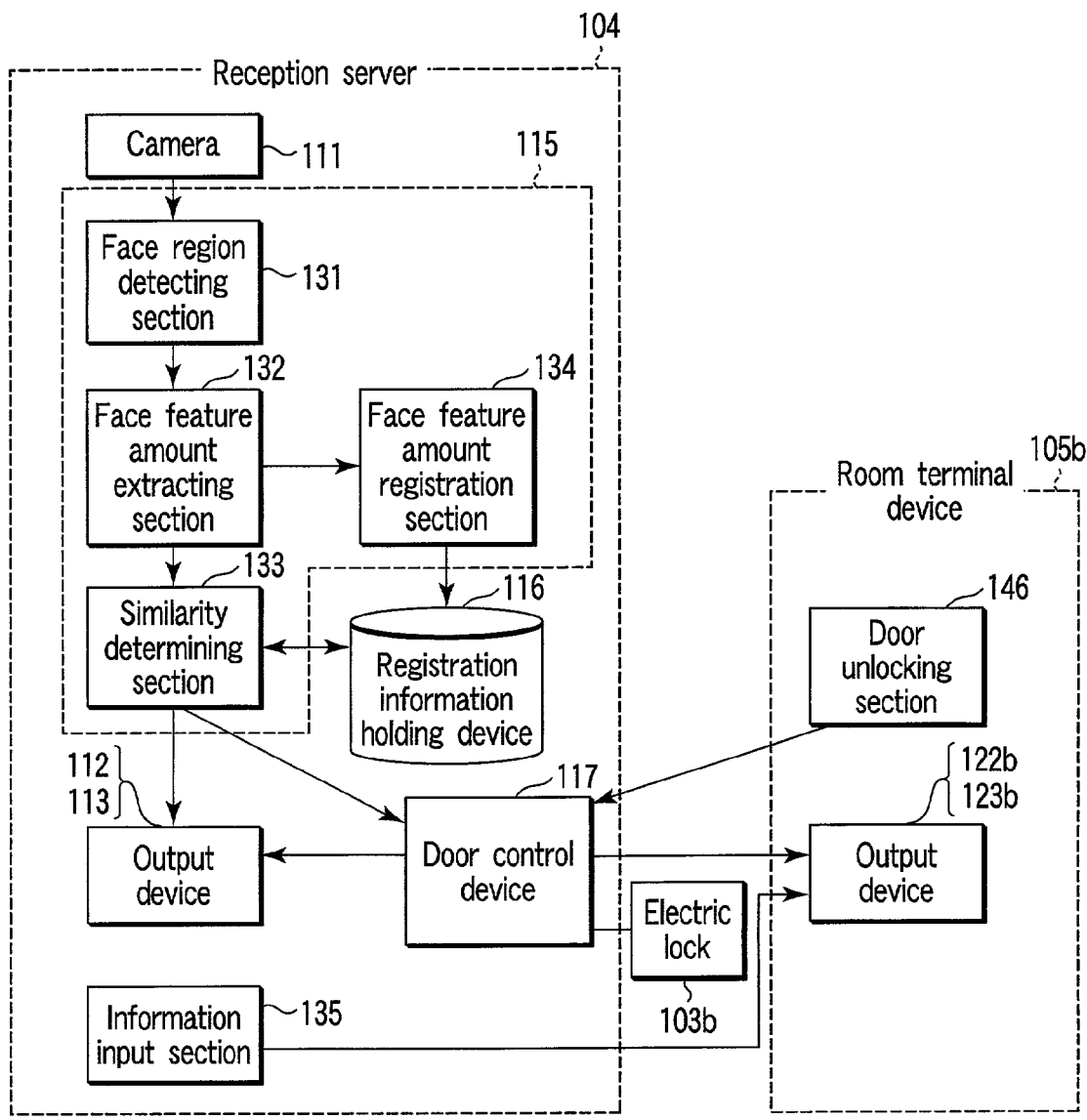
FIG. 19 is a block diagram schematically showing the whole configuration of a reception server according to the sixth embodiment.

FIG. 19 is a block diagram showing the internal configuration of the reception server 104. As shown in FIG. 19, the control device 115 includes a face region detecting section 131 used as face region detecting means, a face feature amount extracting section 132 used as face feature amount extracting means, a similarity determining section 133 used as similarity determining means and a face feature amount registration section 134.

The face region detecting section 131 detects a face region from an image photographed by the camera 111. The face feature amount extracting section 132 extracts the face feature amount based on the face region detected by the face region detecting section 131. The similarity determining section 133 determines the similarity between the feature amount extracted by the face feature amount extracting section 132 and the reference feature amount registered in the registration information holding device 116. The face feature amount registration section 134 registers the feature amount extracted by the face feature amount extracting section 132 into the registration information holding device 116.

Further, an information input section 135 used as information input means is operated by a visitor to input a voice message or information which specifies a destination such as a room number at the common doorway 102. The information input section 135 will be described later in detail.

Next, the internal configuration of the room terminal device 105 is explained.

Figure 20:
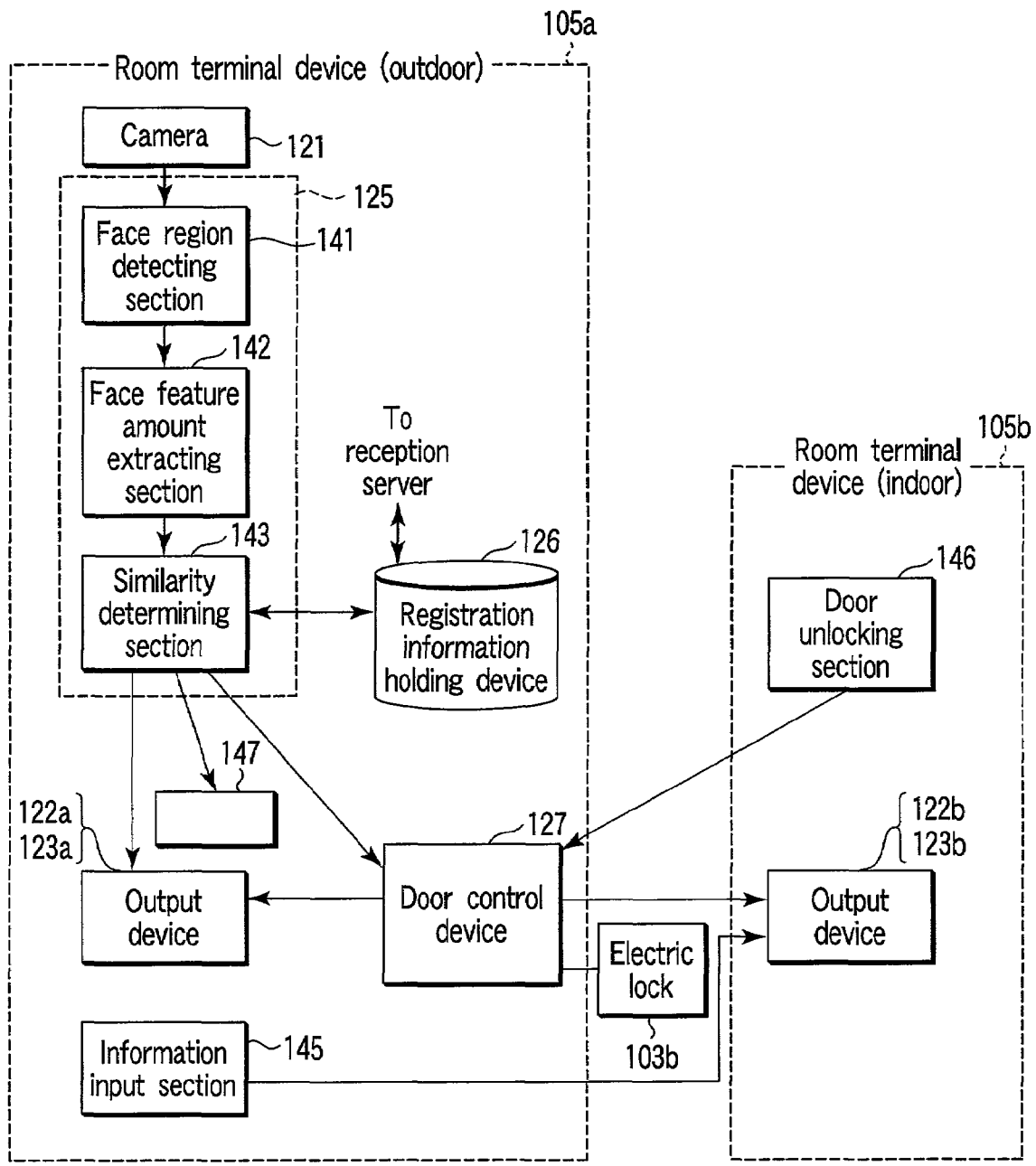
FIG. 20 is a block diagram schematically showing the whole configuration of a room terminal device in the sixth embodiment.

FIG. 20 is a block diagram showing the internal configuration of the room terminal device 105. As shown in FIG. 20, the control device 125 includes a face region detecting section 141 used as face region detecting means, a face feature amount extracting section 142 used as face feature amount extracting means and a similarity determining section 143 used as similarity determining means.

The face region detecting section 141 detects a face region from a face image input by the camera 121. The face feature amount extracting section 142 extracts the face amount of the face based on the face region detected by the face region detecting section 141. The similarity determining section 143 determines the similarity between the feature amount extracted by the face feature amount extracting section 142 and the reference feature amount registered in the registration information holding device 126.

Further, an information input section 145 used as information input means is operated by a visitor to input a voice message at the entrance of the room 103. The information input section 145 will be described later in detail. A door unlocking section 146 used as entrance control means is disposed in the room 103. The door unlocking section 146 supplies a door unlocking signal which causes the electric lock 102*b* or 103*b* to be unfastened to the door control device 117 or 127 by the operation of a person in the room 103 as required.

An access inhibition section 147 inhibits every access from the exterior according to the result of determination of the similarity determining section 143. For example, when the access inhibition section 147 inhibits every access from the exterior, it makes every input from the information input section 145 ineffective while the electric lock 102*b* is kept fastened by the door control section 127. The access inhibition state by the access inhibition section can be released from the exterior by a person in the room or by a preset registrant.

Next, each of the above sections is explained.

First, the respective sections of the reception server 104 are explained in detail.

The camera 111 is configured by an ITV camera, for example. The camera 111 photographs a face image of a person standing in front of the door 102*a* of the common doorway 102. The camera 111 A/D-converts the photographed face image and stores the A/D-converted face image into an image memory (not shown) provided in the face region detecting section 131.

The number of cameras 111 is not specifically limited and a plurality of cameras are not always necessary and a single camera may be used. Further, the camera 111 may be a fixed type camera or may be a camera having a pan/tilt/zoom function. If the camera having the pan/tilt/zoom function is used, it is possible to input an image of wide area by use of one camera or raise the resolution of an observed area by use of the zooming function. If a plurality of cameras are used, all of the images taken by the cameras and stored in the image memory are subjected to the process up to the process performed by the similarity determining section 133 as will be described later.

The face region detecting section 131 performs the face region detecting process with respect to an image stored in the image memory by the camera 111. The face region detecting section 131 derives correlation values while moving previously prepared template image data of an average face on input image data. The face region detecting section 131 sets a position which gives the largest correlation value among the calculated correlation values as a face region.

The face region detecting process by the face region detecting section 131 can be attained by performing an evaluation process based on the similarity by use of the template image of a face and a partial space method. Further, not only one face region but also a plurality of face regions may be detected depending on the result of the face region detecting process in some cases. If a plurality of face regions are detected, each of the face regions is subjected to the process up to the process performed by the similarity determining section 133 as will be described later.

First, the face feature amount extracting section 132 performs a process for detecting face parts such as eyes, nose, mouth from the face region detected by the face region detecting section 131. The face part detecting process can be performed by using a method described in a document ("Face Feature Point Extraction by Combination of Shape Extraction and Pattern Collation" by Kazuhiro Fukui, Osamu Yamaguchi, Study Papers of Institute of Electronic Information and communication Engineers of Japan (D), vol. J80-D-II, No. 8, pp. 2170 to 2177 (1997)).

The face feature amount extracting section 132 performs the face feature amount extracting process based on the detected face parts. That is, the face feature amount extracting section 132 extracts a face region of a preset size and shape based on position data of the detected face parts and corrects the inclination and size thereof to create a region of m pixels×n pixels. The face feature amount extracting section 132 creates a face feature vector by using the region of m pixels×n pixels as information of m×n dimension.

If the face feature amount extracting section 132 cannot detect the face part, it is possible for the display section 112 used as the output device to display guidance for a photographed person. Further, in a case where the face feature amount extracting section 132 cannot detect the face parts such as eyes and nose and if information indicating that the face part can be easily detected by turning the face in a different direction from the present direction is previously stored in the dictionary or if the face region can be detected but is not changed at all like a photograph, it is possible for the display section 112 used as the output device to display a guidance sentence "please turn in a preset direction" or it is possible for the speaker 113 to output guidance of "please turn in a preset direction" with a voice.

The registration information holding device 116 holds face feature amounts (dictionary data) used to identify a person. The dictionary data can be calculated by storing face images obtained by use of the camera 111 and face region detecting section 131 in a time-series fashion and deriving a normal orthogonal vector by use of known K-L expansion with respect to the thus obtained data items.

It is also possible to prepare a plurality of dictionary data items (feature amounts) for one person. For example, in a case where a considerable variation is caused by a variation in the makeup or the presence or absence of glasses, a plurality of dictionary data items (feature amounts) may be prepared in the registration information holding device 116. If a plurality of dictionary data items (feature amounts) are prepared for one person, it is determined that the person can be identified when the feature amount can be identified with (determined to be the same as) anyone of the dictionary data items.

The registration information holding device 116 is configured by a storage medium such as a silicon disk, optical disk or hard disk, for example. The registration information holding device 116 can be any type of device if it can store digital information.

Further, the registration information holding device 116 of the reception server 104 is used as a server as viewed from the registration information holding device 126 of the room terminal device 105. When new face information of a person (also referred to as a visitor) who obtains temporary permission of entrance is registered, the registration information holding device 116 broadcasts the face information of the visitor to the room terminal devices 105. Thus, the face information of the visitor is registered in the registration information holding device 126 of each room terminal device 105.

Next, the similarity determining section 133 is explained in detail.

A similarity determining (person recognition) method in the similarity determining section 133 utilizes a mutual partial space method described in "Person Authentication Apparatus and Person Authentication Method" disclosed in Jpn. Pat. Appln. KOKAI Publication No. 9-251534 or in a document ("Pattern Matching Method using Local Configuration" by Kenichi Maeda, Sadaichi Watanabe, Study Papers of Institute of Electronic Information and Communication Engineers of Japan (D), vol. J68-D, No. 3, pp. 345 to 352 (1985)), for example. The person recognition method can be performed by use of another pattern recognition method.

The similarity determining section 133 stores a certain number of feature amounts derived by the face feature amount extracting section 132 in a time-series fashion. The similarity determining section 133 calculates a partial space by deriving a normal orthogonal vector by use of the K-L expansion with respect to the thus obtained data items. The similarity determining section 133 compares the thus derived data with dictionary data items (reference feature amounts) previously held in the registration information holding device 116. If the result of comparison having the highest degree of similarity (maximum similarity) which is larger than a preset threshold value is obtained, the similarity determining section 133 determines that a person corresponding to the feature amount of the registration dictionary which gives the maximum similarity is the subject person.

If the highest degree of similarity does not exceed the preset threshold value, the similarity determining section 133 determines that the person is not a person (also referred to as a registrant) who is previously permitted to enter the building 101 but a visitor who is temporarily permitted to enter the building.

As shown in FIGS. 21, 22, 23, the output device 10 (display section 112, speaker 113) feeds back the result of face detection, provides guidance of start of authentication, outputs a guidance voice or displays the result of authentication for the to-be-authenticated person. The display section 112 may be any type of display device such as a normal CRT display other than the liquid crystal display device if it can display an image and characters. The information input section 145 is configured by a touch panel contained in the liquid crystal display device used as the display section 112. Further, the information input section 145 may be configured by a ten-key pad separately provided. As the output device, an LED or lamp which is lit to inform the result of determination or a preset operation may be used in addition to the display section 112 and speaker 113.

Next, a display example of the display section 112 is explained.

FIG. 21 shows a display example displaying an image photographed by the camera 111 and a region detected as a face region. As shown in FIG. 21, if the face region is detected, the image photographed by the camera 111 and a frame indicating the region detected as the face region are displayed on the display section 112.

FIG. 22 is a view showing a display example when the person is determined as a "visitor" in the authentication process. FIG. 23 is a view showing a display example of the display section 122b of the room terminal device 105 which is disposed in the room specified as a visiting destination by the visitor.

If the person is determined as a "visitor" in the authentication process at the reception server 104, a screen which suggests the visitor to input information indicating a visiting destination such as a room number of the visiting destination is displayed together with the face image of the visitor on the display section 112. For example, in the example shown in FIG. 22, a display region 151, operation button 152 and display region 153 are displayed together with the guidance "please select an object room" on the display section 112. In this case, assume that the touch panel used as the information input section 135 is contained in the display section 112.

The display region 151 is a region in which the face image of the visitor is displayed. The operation button 152 includes a ten-key pad used to input a room number, an "OK" key which specifies confirmation of the input, a "correction key (X)" which corrects the input and the like. The display region 153 is a region in which information input by use of the operation button 152 is displayed.

If an input screen of information indicating the visiting destination as shown in FIG. 22 is displayed on the display section 112, the visitor inputs information indicating the visiting destination. When the visitor inputs information indicating the visiting destination, the reception server 104 transfers the face image of the visitor to the room terminal device 105 of the visiting destination.

As a result, a notification screen as shown in FIG. 23 is displayed on the display section 122b of the visiting destination. In the example shown in FIG. 23, a display region 154 in which the face image of the visitor is displayed, entrance permission button 155, entrance effective period setting button 156 and entrance refusal button 157 are displayed. In this case, assume that the touch panel used as the information input section 145 is contained in the display section 122b.

The display region 154 is a region in which the face image of the visitor is displayed. The entrance permission button 155 is depressed when permission of entrance is given to the visitor. The entrance effective period setting button 156 is operated to set an effective period of entrance with respect to the visitor. The entrance refusal button 157 is depressed when entrance of the visitor is refused.

The face feature amount registration section 134 registers the face feature amount extracted by the face feature amount extracting section 132 into the registration information holding device 116 when the "visitor" is determined by the similarity determining section 133 and the visitor is permitted to enter the building 101 by a person who exists in the room 103 of the visiting destination. At the same time, the face feature amount registration section 134 broadcasts the face feature amount to the registration information holding sections 126 of the room terminal devices 105.

The door control device 117 controls the door 102a of the common doorway 102 of the whole building 101 according to the result of determination by the similarity determining section 133. The door control device 117 instantaneously unfastens the electric lock 102b of the door 102a so as to permit the visitor to enter the building 101 when the "registrant" is determined by the similarity determining section 133.

Further, in a case where the "visitor" is determined by the similarity determining section 133 and the visitor is permitted to enter the building 101 by the operation of the door unlocking section 146 of the room terminal device 105 of the visiting destination, the door control device 117 first registers the face feature amount information into the registration information holding device 116 and then unfastens the electric lock 102b of the door 102a so as to permit the visitor to enter the building 101.

The information input section 135 is used to input information which specifies a room of a visiting destination. For example, the information input section 135 is configured by a touch panel contained in the display section 112 or a ten-key pad separately provided.

Further, as the information input section 135, a microphone 114 used to input a voice of a visitor or the like is contained. The microphone 114 as the information input section 135 is used by a visitor to transmit his voice to a person in the room 103 of the visiting destination. For example, when the visitor specifies a room of the visiting destination by use of the touch panel contained in the display section 112, the microphone 114 transmits a voice to the room terminal device disposed at the entrance of the room 103 of the visiting destination. As a voice transmission system between the reception server 104 and each of the room terminal devices 105, a transmission system using a network based on digital compression can be used as well as a transmission system using a normal analog signal.

Next, each of the sections of the room terminal device 105 is explained in detail.

The camera 121 photographs a face image of a person standing in front of the door 103a of the room 103. The camera 121 is disposed outside the door 103a at the entrance of the room 103. The camera 121 may be the same as the camera 111 of the reception server 104. For example, when the visitor registered at the reception server 104 enters the building 101 and arrives at the room 103 which is the visiting destination, the camera 121 photographs the face image of the visitor.

The face region detecting section 141 detects a face region from an image input from the camera 121. The face region detecting section 141 may be the same as the face region detecting section 131 of the reception server 104. The face feature amount extracting section 142 may be the same as the face feature amount extracting section 132 of the reception server 104.

The registration information holding device 126 holds a face feature amount broadcasted from the registration information holding device 116 of the reception server 104. Of course, face information items of the existing registrants are held in the registration information holding device 126. For example, when the visitor registers the face by use of the reception server 104 at the common doorway 102 of the building 101, registration information such as the face feature amount of the visitor is transferred to the registration information holding device 126 of each room terminal device 105. The storage medium used in the registration information holding device 126 is the same as that of the registration information holding device 116 of the reception server 104.

The similarity determining section 143 compares the face feature amount derived by use of the face feature amount extracting section 142 with the face feature amounts registered in the registration information holding device 126. The similarity determining section 143 authenticates a person based on the face image photographed by the camera 121. The similarity determining section 143 determines whether the person whose face image is photographed by the camera 121 is a "registrant permitted to enter the room 103", "registrant who is not permitted to enter the room 103", "visitor who obtains permission of entrance from the room 103" or "another person".

For example, if the similarity corresponding to a person who gives the highest degree of similarity among all of the registrants and the visitors whose face information items are registered is smaller than a preset threshold value, the similarity determining section 143 determines that the person is "another person". If the similarity corresponding to a person who gives the maximum similarity exceeds the preset threshold value, the similarity determining section 143 determines that the person is the person who gives the maximum similarity.

After determining the person, the similarity determining section 143 determines the attribute of the thus determined person. The attribute of the person is information stored in the registration information holding device 126 in relation to the face feature amount. For example, as the attribute of the person, a "registrant permitted to enter the room", "registrant who is not permitted to enter the room", "visitor" and the like are set. The similarity determining section 143 determines the person whose face image is photographed by the camera 121 based on the attribute of the person.

The method of comparison with the feature amount of the registration information holding device 126 is the same as that of the similarity determining section 133 of the reception server 104.

Assuming that the electric lock 103b of the door 103a controlled by the door control device 127 cannot be unfastened by use of physical unlocking means, the following explanation is made. However, the electric lock 103b may be so designed that it can be physically unfastened in a condition that face information is necessarily registered when the door 103a is unlocked. If the physical unlocking means is used, a key which is extremely difficult to duplicate or pick is preferably used as the physical unlocking means.

If the similarity determining section 143 determines that the person is a "registrant permitted to enter the room", the door control device 127 immediately unfasten the electric lock 103b of the door 103a. In other cases, the door control device 127 does not immediately unfasten the electric lock 103b and the output devices 112 and 113 notify the internal portion of the room 103 about the result of determination by the similarity determining section 143.

Next, the process based on the similarity determination process by the similarity determining section 143 is explained.

Figure 24:
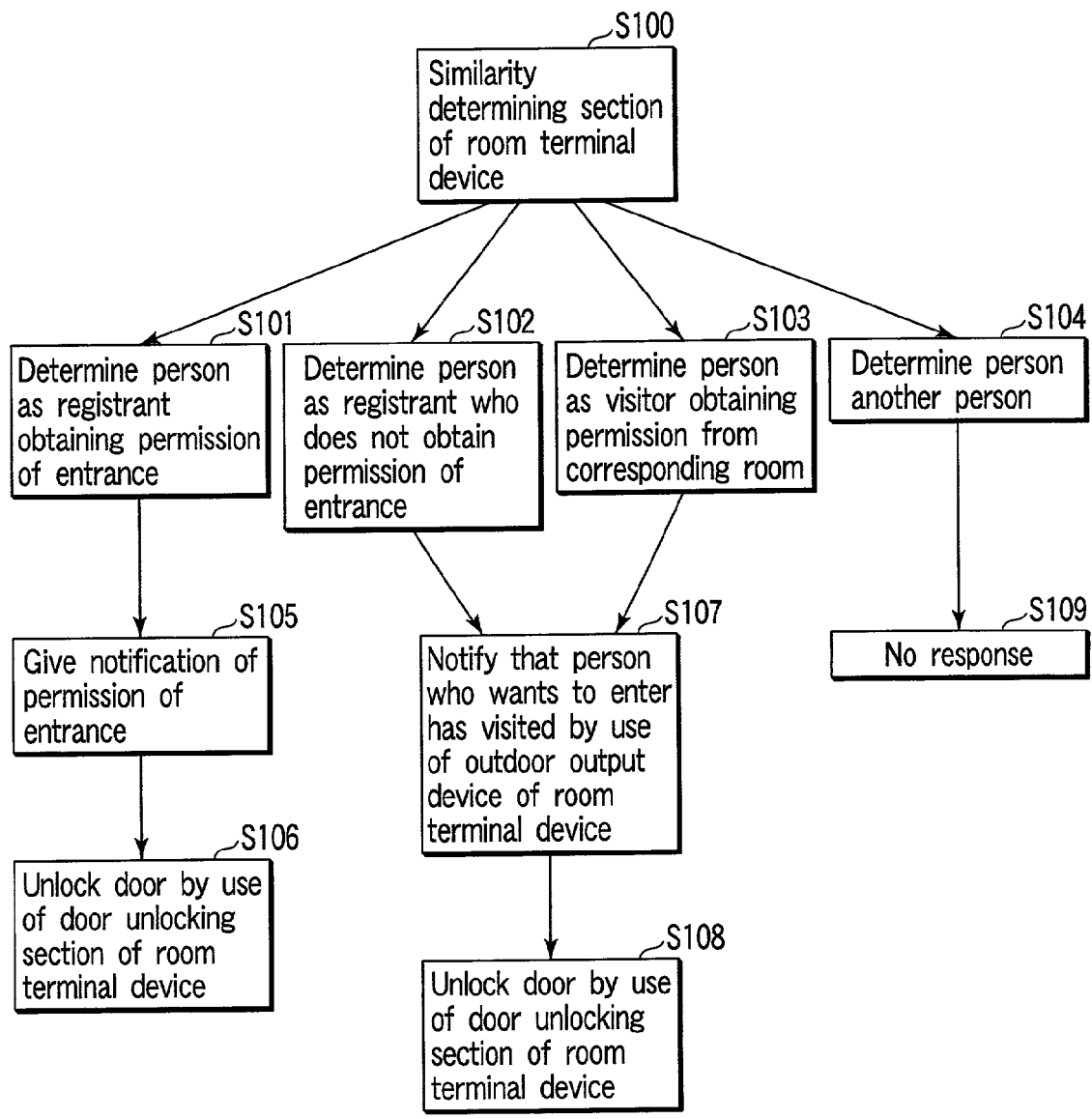
FIG. 24 is a flow diagram for illustrating the flow of unfastening of a door lock in the room terminal device in the sixth embodiment.

FIG. 24 is a flowchart for illustrating the process based on the similarity determination. Further, the following table 1 shows the relation of determination at the reception server, determination at the room terminal device of the room A, determination at the room terminal device of the room B with respect to various access rights.

TABLE 1

| Access right | Reception server | Room terminal device of A | Room terminal device of B |
|---|---|---|---|
| Registrant permitted to enter rooms A and B | Unlocking based on face authentication | Unlocking based on face authentication | Unlocking based on face authentication |

TABLE 1-continued

| Access right | Reception server | Room terminal device of A | Room terminal device of B |
|---|---|---|---|
| Registrant permitted to enter only room A | Unlocking based on face authentication | Unlocking based on face authentication | Notification to interior can be made, permission from interior must be obtained in order to unlock door |
| Visitor who tries to visit room B as destination | Notification to interior can be made, permission from interior must be obtained in order to unlock door | Inaccessible | Notification to interior can be made, permission from interior must be obtained in order to unlock door |
| Visitor who tries to visit room A as destination | Notification to interior can be made, permission from interior must be obtained in order to unlock door | Notification to interior can be made, permission from interior must be obtained in order to unlock door | Inaccessible |

The access rights of the table 1 show the results of determination by the similarity determining section 143. The operations of the output devices (display sections 122a, 122b, speakers 123a, 123b), door control device 127 and the like are determined based on the access right obtained as the result of determination by the similarity determining section 143.

For example, as described before, the display section 122a and speaker 123a used as the output devices are disposed outside the door 103a. The display section 122a and speaker 123a output the contents of determination to the outside of the door 103a by use of a screen and voice according to the result of determination by the similarity determining section 143.

Further, the display section 122b and speaker 123b used as the output devices are disposed inside the door 103a, that is, in the room 103. The display section 122b and speaker 123b output the contents of determination to the outside of the door 103a by use of a screen and voice according to the result of determination by the similarity determining section 143.

For example, if the determination result indicates that the person is a "registrant permitted to enter the room" (steps S100, S101), guidance which suggests the person to enter the room is displayed on the display section 122a disposed outside the room (step S105). When the guidance to suggest the entrance is displayed on the display section 122a, the door unlocking section 146 causes the door control device 127 to unfasten the electric lock 103b of the door 103a (step S106).

Further, if the determination result indicates that the person is a "registrant who is not permitted to enter the room" (steps S100, S102) or a "registrant permitted to enter the building by a person in the room" (steps S100, S103), information indicating that a person who wants to enter the room is present in front of the room is output to the display section 122b and speaker 123b disposed inside the room (step S107). When the presence of the person who wants to enter the room is notified by use of the display section 122b and speaker 123b, the door unlocking section 146 unfastens the electric lock 103b of the door 103a according to the operation by a person in the room.

For example, the display section 122b displays the face image of the person photographed by the camera 121 and standing outside the room and the speaker 123b sounds a chime. As a result, a person in the room recognizes that the person who wants to enter the room is present in front of the room. When recognizing the person who desires to enter the room, the person in the room confirms the person who desires to enter the room according to the image displayed on the display section 122b or a voice from the speaker 123b. If permitting the entrance of the person who desires to enter the room, the person in the room specifies unfastening of the electric lock of the door 103a by use of an operating section (not shown) or the like. Then, the door unlocking section 146 causes the door control section 147 to unfasten the electric lock 103b of the door 103a (step S108).

Further, if the determination result indicates that the person is a "person (another person) who is neither a registrant nor a person who obtains permission of entrance from the room" (steps S100, S104), the access inhibiting section 147 inhibits access to any one of the rooms from the exterior (step S109). At this time, for example, the devices such as the output devices (display sections 122a, 122b, speakers 123a, 123b) and door control device 127 are not operated.

That is, the operation for sounding the chime in the room 103 of the visiting destination of the "visitor" is not performed at all in the rooms other than the room which the visitor is permitted to enter when the face is registered at the reception server 104. Therefore, a visit of the visitor who is permitted to enter the room at the reception desk is neglected in the other rooms. As a result, it is possible to prevent the visitor from accessing the rooms other than the room which the visitor specifies as a visiting destination.

If a person who comes in front of the door 102a of the common doorway 102 wants to enter a certain one of the rooms 103, whether permission of entrance is issued or not is displayed on the indoor display section 122b as shown in FIG. 23 and specified by a person in the room. Thus, the visitor can enter the building 101 only when permission of entrance is issued by a person in the room 103 of the visiting destination. Further, when the fact that a person who desires to enter the room has visited is notified by use of the room terminal device 105, whether permission of entrance is issued or not is displayed on the indoor display section 122b as shown in FIG. 23 and specified by a person in the room. Thus, the visitor can enter the room only when permission of entrance is issued by the person in the room 103 of the visiting destination.

The door unlocking section 146 is operated according to permission of entrance specified by a person in the room with respect to a person other than the registrants of the respective rooms 103.

The table 1 shows procedures which persons having different access rights can take. According to the table 1, a registrant who is permitted to enter the room A and room B can pass the reception desk and enter the room A and room B based only on face authentication. A registrant who is permitted to enter only the room A can pass the reception desk, enter the room A based only on face authentication and enter the room B based on face authentication and permission issued from the room B.

Further, a visitor who visits the room A (or room B) as a visiting destination) can pass the reception desk and enter the room A (or room B) based on face authentication and permission issued from the room but the visitor is inhibited from accessing to the room B (or room A) which is not specified as the visiting destination.

For example, when a visitor who comes in front of the door 102a of the common doorway 102 inputs a room number as information indicating a room of the visiting destination by use of the information input section 135, when a visitor who has entered the building 101 comes in front of the door 103a of the room 103 of the visiting destination input at the reception server 104 or when a registrant who is not permitted to enter the room 103 of the visiting destination comes in front of the door 103a, the face image of the person who comes in front of the door is displayed on the indoor output device (display section 122b) as shown in FIG. 23. The person in the room who receives a visit depresses the entrance permission button 155 or entrance refusal button 157 while watching the image displayed on the display section 122b. The door unlocking section 146 controls the unfastening operation of the electric lock 103b of the door 103a according to the button input by the person in the room.

Further, temporary permission of entrance is given to a visitor. Therefore, as shown in FIG. 23, it is assumed that the person in the room who has received the visit of the visitor can specify the effective period of time of the access right with respect to the visitor by use of the entrance effective period setting button 156 when the entrance permission button 155 is input.

The information input section 145 functions as means by use of which the visitor accesses the room 103 of the visiting destination. For example, if the microphone 124a is used as the information input section 145, the visitor can input a voice to the microphone 124a and transmit a message to the room 103.

Next, the flow of a process performed when a registrant who is previously permitted to enter the building 101 enters an objective room 103 and the flow of a process performed when a visitor who is temporarily permitted to enter the building 101 enters the room 103 of the visiting destination are explained.

Figure 25:
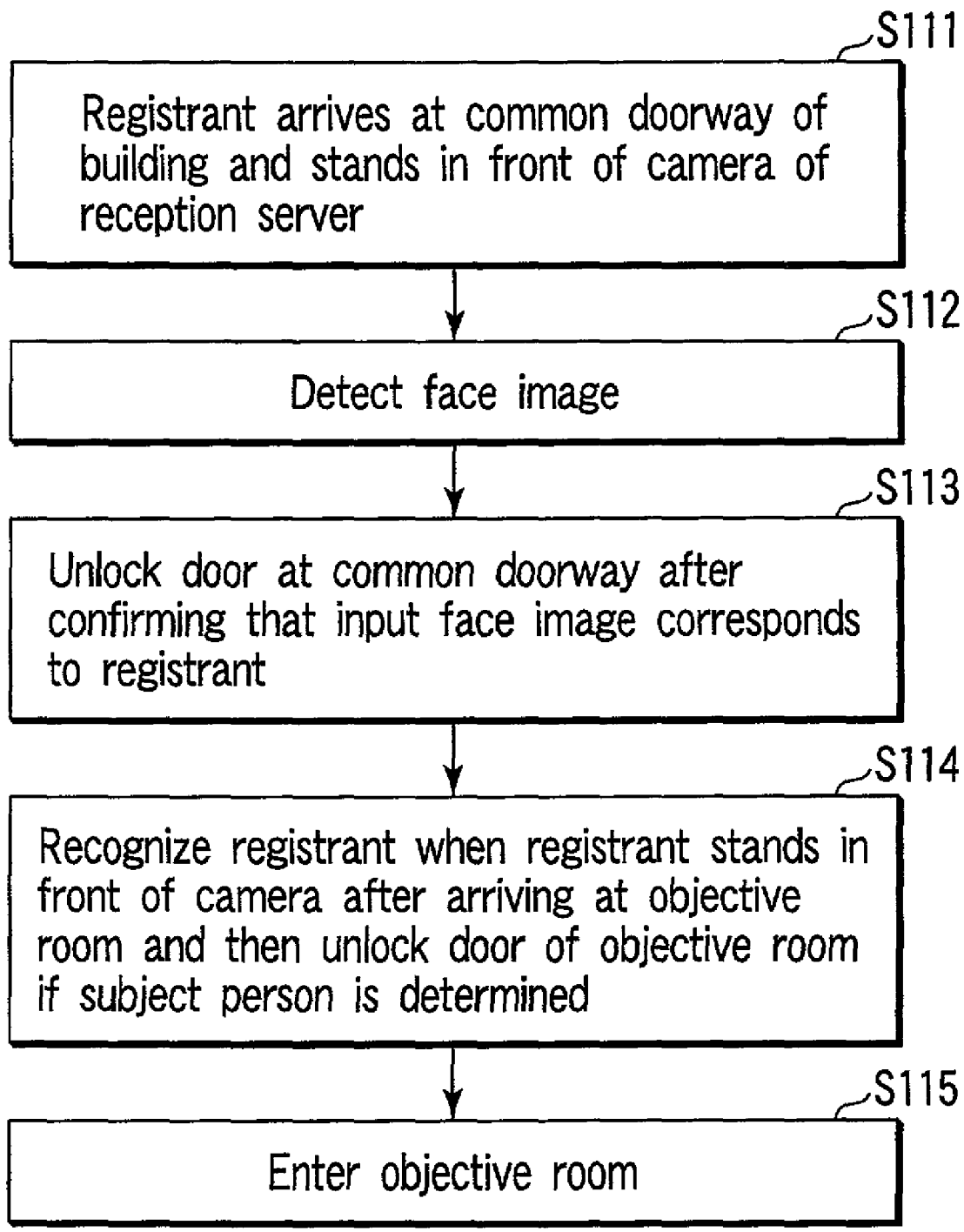
FIG. 25 is a flowchart for illustrating the flow of a process until a registrant enters an object room.

First, the flow of the process performed when a registrant who is previously permitted to enter the building 101 enters an objective room 103 is explained with reference to the flowchart shown in FIG. 25.

When the registrant stands in front of the door 102a of the common doorway 102 of the building 101 (step S111), the reception server 104 detects a face image from the image photographed by the camera 111 (step S112). Then, the reception server 104 having detected the face image collates the detected face image with the dictionary data registered in the registration information holding device 116. If the person is authenticated as a registrant based on the collation result, the reception server 104 causes the door control device 127 to unfasten the electric lock 102b of the door 102a of the common doorway 102 of the whole building 101 and permits the person to enter the building 101 (step S113).

When the registrant who has entered the building 101 arrives at an objective room 103 in the building 101 and stands in front of the door 103a, the room terminal device 105 causes the camera 121 to photograph an image of the registrant. The room terminal device 105 collates the face image detected from the photographed image with the dictionary data held in the registration information holding device 126. If the registrant is successfully authenticated based on the collation process, the door terminal device 105 causes the door control device 127 to unfasten the electric lock 103b of the door 103a and permits entrance (step S114). Thus, the registrant can enter the room which is previously permitted to enter based only on the face authentication (step S115).

Figure 26:
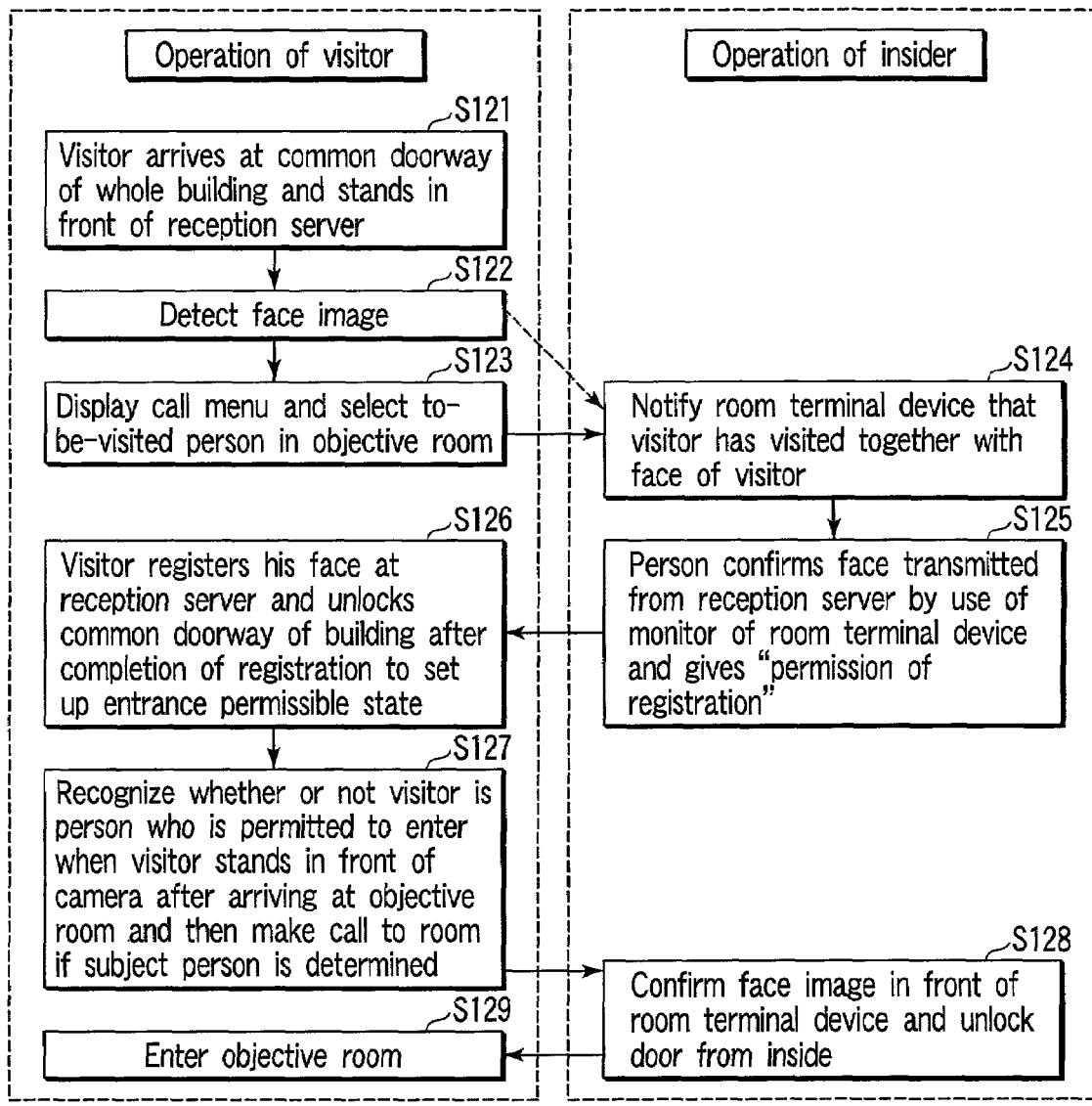
FIG. 26 is a flowchart for illustrating the flow of a process until a visitor enters an object room.

Next, the flow of the process performed when a visitor who is temporarily permitted to enter the building 101 enters the room 103 of the visiting destination is explained with reference to the flowchart shown in FIG. 26.

When the visitor stands in front of the door 102a of the common doorway 102 of the building 101 (step S121), the reception server 104 detects a face image from the image photographed by the camera 111 (step S122). Then, the reception server 104 having detected the face image collates the detected face image with the dictionary data registered in the registration information holding device 116. If the visitor is authenticated as a person who is not a registrant based on the collation result, the reception server 104 displays guidance to the effect that the visiting destination is specified as shown in FIG. 22 on the display section 112. The visitor who observes the guidance screen inputs a room number of the visiting destination by use of the operation button 152 (step S123).

When the room number of the visiting destination is input, the reception server 104 transmits the face image photographed by the camera 111 to the room terminal device 105 disposed at the entrance of the room 103 of the visiting destination. When receiving the face image of the visitor from the reception server 104, as shown in FIG. 23, the room terminal device 105 notifies that the visitor has come and displays a notification screen which specifies permission or inhibition of entrance on the indoor display section 122b (step S124). At this time, a person in the room 103 of the visiting destination confirms the face image displayed on the display section 122b and permits entrance by depressing the entrance permission button 155 (step S125).

If permission of entrance is issued in the room 103 of the visiting destination, the reception server 104 registers the face image of the visitor into the registration information holding device 116 and transmits the face image of the visitor to the room terminal device 105. After registering the face image of the visitor into the registration information holding device 116, the reception server 104 causes the door control device 117 to unfasten the electric lock 102b of the door 102a of the common doorway 102 and permits the visitor to enter the building 101 (step S126).

When the visitor who has entered the building 101 arrives at the room 103 of the visiting destination in the building 101 and stands in front of the door 103a at the entrance, the room terminal device 105 causes the camera 121 to photograph an image of the registrant. The room terminal device 105 collates the face image detected from the photographed image with the dictionary data held in the registration information holding device 126. If the visitor is authenticated as a visitor who obtains permission of entrance based on the collation process, the door terminal device 105 makes a call which notifies a person in the room of a visit of the visitor (step S127). The call is made by sounding a chime, for example.

When receiving the call which notifies the visit of the visitor, the person in the room confirms the visitor by displaying the face image photographed by the camera 121 on the display section 121. Thus, the person in the room permits entrance of the visitor. In response to permission of entrance made by the person in the room, the room terminal device 105 causes the door unlocking section 146 to unfasten the electric lock 103b of the door 103a (step S128). When the electric lock 103b of the door 103a is unfastened, the visitor can enter the room 103 of the visiting destination (step S129).

If the visitor tries to access a room other than the room which is permitted to enter, the room terminal device 105 does not authenticate the person who accessed as a visitor who obtains permission of entrance. This is because the door terminal device 105 does not receive the face image of the visitor from the reception server 104. If the room terminal device 105 does not authenticate the visitor as a visitor who obtains permission of entrance, it does not permit access to the room by making a call, for example. As a result, it becomes possible to prevent the visitor from accessing the room other than the room which is permitted to enter.

Thus, according to the sixth embodiment, the temporary entrance/exit management process for a person other than the registrant can be performed. That is, when access is made to the door, it is always necessary to show the face and limitation of access to the door can be imposed on three types of response means of "the door is unlockable", "only notification to the internal section is possible" and "access is impossible" according to the result of individual authentication of the face. Thus, even when a visitor or a person who is not normally permitted to enter the room or the building is temporarily permitted to enter the place, the entrance can be managed without losing the security. Further, the influence on a person who has no direct relation with the visitor can be suppressed to minimum by inhibiting access to a place other than the place which is permitted to enter.

Next, the seventh embodiment is explained.

The seventh embodiment is an entrance management apparatus which automatically detects the dishonest behavior of a person who temporarily obtains permission of entrance and then performs the access limiting operation in addition to the process of the sixth embodiment. The seventh embodiment is explained in detail below.

Figure 27:
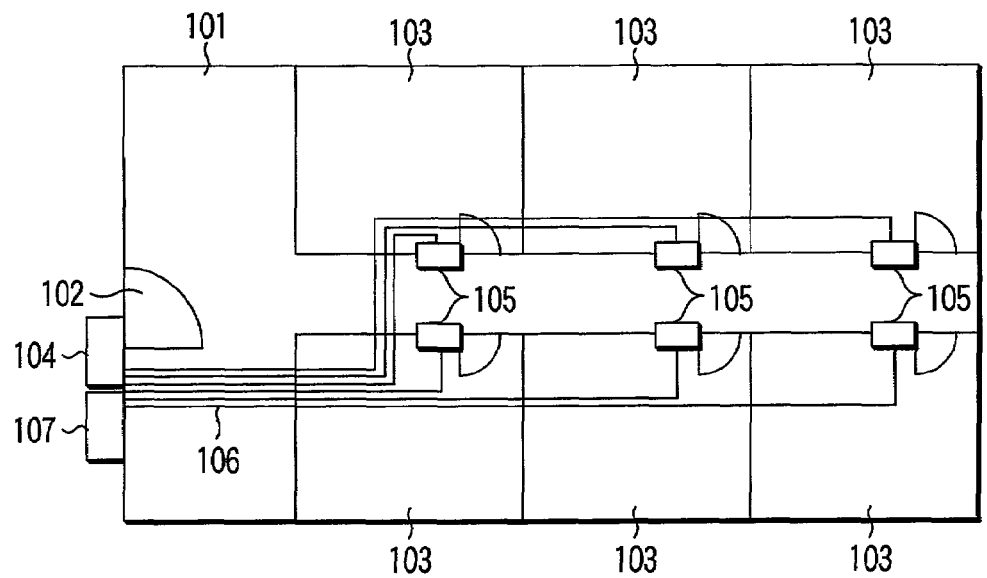
FIG. 27 is a simulated view schematically showing the configuration of an entrance management apparatus according to a seventh embodiment of this invention and the whole configuration of a building to which the entrance management apparatus is applied.

FIG. 27 schematically shows the configuration of an entrance management apparatus according to the seventh embodiment and the whole configuration of a building such as an apartment house to which the entrance management apparatus is applied. As shown in FIG. 27, the seventh embodiment is different from the sixth embodiment in that an authentication history server 107 used as authentication history holding means is additionally provided. Since the other portions are the same as those of the sixth embodiment, the explanation for the same portions is omitted and only the different portions are explained.

The authentication history server 107 is disposed near a reception server 104, for example. The authentication history server 107 is connected to the reception server 104 and room terminal devices 105 via a network circuit 106. The authentication history server 107 holds (stores) the whole authentication history (including authentication time, authentication result, authentication place, face image input at the time of authentication, face feature information and the like) in each of the room terminal devices 105 and reception server 104. Further, the authentication history server 107 also holds a dishonest accessing person list 107a used to register persons who perform dishonest acts together with corresponding authentication histories.

A similarity determining section 133 of the reception server 104 performs the same process as the similarity determination process explained in the sixth embodiment. For example, the process up to the process to determine a person who stands in front of a door 102a of a common doorway 102 is the same as the process in the sixth embodiment.

In the seventh embodiment, the similarity determining section 133 also performs a process of collation with information in the authentication history server 107 in addition to the process of the sixth embodiment. That is, the similarity determining section 133 determines that the visitor is a dishonest accessing person when the similarity with a person registered as a dishonest accessing person in the dishonest accessing person list 107a of the authentication history server 107 exceeds a preset threshold value. Further, in the seventh embodiment, any access (entrance into and notification to the objective room by authentication in each room terminal device 105, entrance into the building 101 by authentication at the reception server 104) by a person who is determined as the dishonest accessing person is refused.

A similarity determining section 143 of the room terminal device 105 performs the same process as the similarity determination process explained in the sixth embodiment. For example, the process up to the process for determining a person who stands in front of a door 103a of a room 103 is the same as the process in the sixth embodiment.

In the seventh embodiment, like the similarity determining section 133 of the reception server 104, the similarity determining section 143 also performs a process of collation with information in the dishonest accessing person list 107a of the authentication history server 107 in addition to the process of the sixth embodiment. That is, the similarity determining section 143 determines that a person who stands in front of the door 103a is a dishonest accessing person when the similarity for a specified person among the dishonest accessing persons exceeds a preset threshold value.

Each authentication history obtained in the authentication (similarity determination) process is transferred to the authentication history server 107. Therefore, the authentication history obtained in each of the reception server 104 and room terminal devices 105 is held in the authentication history server 107. The authentication history contains authentication time, authentication result, authentication place (the room terminal device in which the authentication process is performed), face image used for the authentication process, face feature information extracted from the face image and the like.

The authentication history held in the authentication history server 107 is used to form the dishonest accessing person list 107a. A dishonest accessing person is determined by performing the authentication process based on the face image according to the dishonest accessing person list 107a. As a result, even if a person has entered the building 101 for the first time, whether the person is a dishonest accessing person or not can be recognized and it is possible to refuse access to each room 103.

For example, assume that the number of times by which dishonest access is made is X and the threshold value of the number of dishonest access times which is used as a criterion to determine a dishonest accessing person is Y. When the number X of dishonest access times by a certain person exceeds the threshold value Y, the authentication history server 107 adds information of the person to the dishonest accessing person list 107a.

Figure 28:
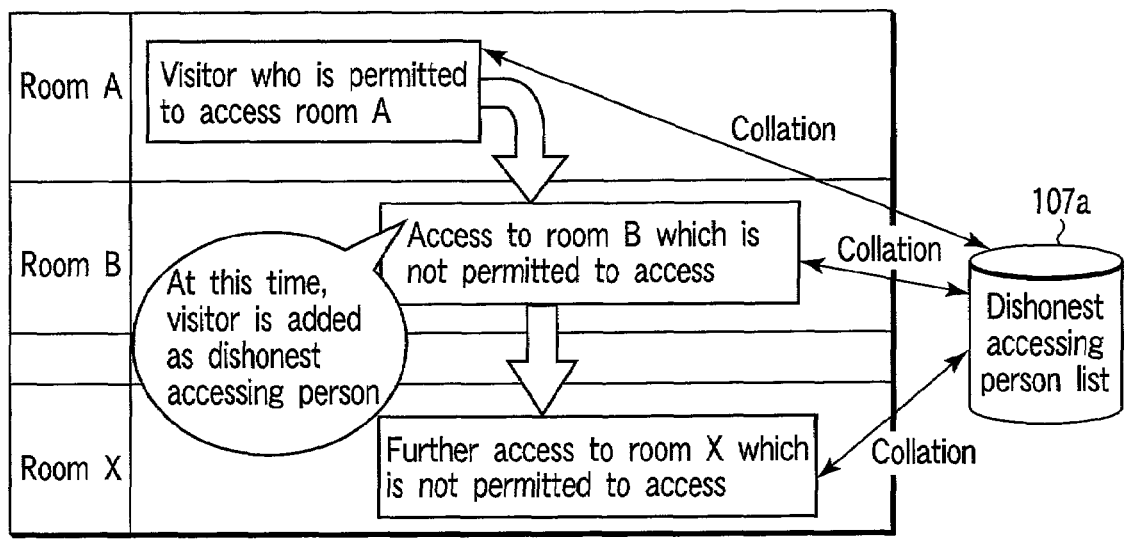
FIG. 28 is a diagram for illustrating a dishonest accessing person additional registration process in the seventh embodiment.

In an example shown in FIG. 28, if the threshold value of the number of dishonest access times is set to "1" (Y=1) and when a person who is permitted to access the room A tries to access the room B, the person is registered as a dishonest accessing person into the dishonest accessing person list 107a. As a result, the person who is registered as a dishonest accessing person into the dishonest accessing person list 107a is hereafter refused to access the reception server 104 and each of the room terminal devices 105.

The output devices (display sections 122a, 122b, speakers 123a, 123b) of each of the room terminal devices 105 have the same configuration as those of the sixth embodiment. Further, in the seventh embodiment, the authentication history held in the authentication history server 107 can be confirmed by use of the above output devices. For example, each room terminal device 105 reads out an authentication history relating to a corresponding one of the rooms 103 from information in the authentication history server 107 and causes the readout authentication history to be displayed on the indoor display section 122b.

As a result, in each of the rooms 103, the authentication history can be confirmed and whether a dishonest access is made or not can be determined.

Further, in the seventh embodiment, it is assumed that only the authentication history of a corresponding one of the rooms 103 can be confirmed for each room 103 by taking the privacy of each registrant into consideration. If there is no problem of privacy and the like, it is possible to confirm the authentication histories of all of the rooms or the authentication histories of the other rooms at the reception server 104 or each of the room terminal devices 105. In a case where only the manager can be permitted to confirm the authentication histories of all of the rooms or the authentication histories of the other rooms, it is possible to set a password number used to authenticate the manager and permit the manager to confirm all of the histories only when the password number of the manager is correctly authenticated.

Thus, according to the seventh embodiment, a doubtful behavior of a person who is temporarily permitted to enter can be automatically detected. That is, it is always necessary to show his face when he accesses the door and limitations of access to the door can be imposed on three types of response means of "the door is unlockable", "only notification to the internal section is possible" and "access is impossible" according to the result of individual authentication of the face. Thus, it is possible to automatically detect that a person who is temporarily permitted to enter one of the rooms of one building or part of a site dishonestly accesses a place other than the previously permitted place and give no more permission of entrance to the dishonest accessing person.

Next, the eighth embodiment is explained.

The eighth embodiment is an entrance management apparatus which automatically registers information indicating that a person is present or not in a room by performing the face authentication process at the time of exit and limit access to the room by another person while he is absent.

Now, the eighth embodiment is explained in detail below.

FIG. 29 schematically shows the configuration of the entrance management apparatus according to the eighth embodiment and the whole configuration of a building such as an apartment house to which the entrance management apparatus is applied. The eighth embodiment is different from the sixth embodiment in that a presence-in-room management server 108 used as presence-in-room management information holding means is additionally provided and a camera is disposed on the indoor side of each of the room terminal devices 105 to authenticate the face of a person who exits or leaves the room. Since the other portions are the same as those of the sixth embodiment, the explanation for the same portions is omitted and only the different portions are explained.

FIGS. 30, 31 schematically show the configuration of the room terminal device 105 according to the eighth embodiment. The eighth embodiment is different from the sixth embodiment in that a camera 121b used to acquire (input) at least a face image of a person is disposed inside a door 103a. The other portions are the same as those of the sixth embodiment. A camera disposed outside the door 103a is denoted by a reference symbol 121a.

FIG. 32 is a block diagram showing the whole configuration of the room terminal device 105 according to the eighth embodiment. Further, the eighth embodiment is different from the sixth embodiment in that the camera 121b disposed inside the door 103a and a control device 125b for the camera 121b are additionally provide and the other portions are the same as those of the sixth embodiment.

That is, as shown in FIG. 32, a control device 125a of an outdoor side room terminal device 105a includes a face region detecting section 141a, face feature amount extracting section 142a and face similarity determining section 143a. The face region detecting section 141a detects a face region from a face image photographed by the camera 121a. The face feature amount extracting section 142a extracts a face feature amount based on the face region detected by the face region detecting section 141a. The face similarity determining section 143a determines the similarity between the feature amount extracted by the face feature amount extracting section 142a and reference feature amounts registered in a registration information holding device 126.

Further, the control device 125b of an indoor side room terminal device 105b includes a face region detecting section 141b, face feature amount extracting section 142b and face similarity determining section 143b. The face region detecting section 141b detects a face region from a face image photographed by the camera 121b. The face feature amount extracting section 142b extracts a face feature amount based on the face region detected by the face region detecting section 141b. The face similarity determining section 143b determines the similarity between the feature amount extracted by the face feature amount extracting section 142b and the reference feature amounts registered in the registration information holding device 126.

Respective sections shown in FIG. 32 are the same as corresponding sections of the same names shown in FIG. 20. Further, an information input section 145a on the outdoor side and an information input section 145b on the indoor side are the same as the information input section 145 shown in FIG. 20.

The respective sections are explained below but the explanation for portions which are the same as those of the sixth embodiment is omitted.

The presence-in-room management server 108 is disposed near a reception server 104. The presence-in-room management server 108 is connected to the reception server 104 and each room terminal device 105 via a network circuit 106. The presence-in-room management server 108 holds presence-in-room management information for all of the registrants. The presence-in-room management information indicates that the registrant is present or absent in the room and time at which the registrant comes back if the registrant is absent. Further, the presence-in-room management server 108 holds a registrant list 108a used to inhibit access to a corresponding room while the registrant is being absent.

The following table 2 indicates an example of the registrant list 108a.

TABLE 2

| Registrant | Presence-in-room information | Countermeasure method when subject person is absent | | | |
|---|---|---|---|---|---|
| | | Registrant A | Registrant B | . . . Registrant Z | Visitor |
| Registrant A | Presence in room | | Refusal of entrance | . . . Refusal of entrance | Refusal of entrance |
| Registrant B | Absence (-2001/2/5) | Permission of entrance | | . . . Refusal of entrance | Dependence on another person in room |
| . . . | . . . | | | . . . | |
| Registrant Z | Absence (-2001/2/24) | Permission of entrance | Permission of entrance | . . . | Dependence on another person in room |

As shown in the table 2, the registrant list 108a collectively shows the correspondence relation between the access rights and presence-in-room information items of respective registrants associated with entrance into corresponding rooms. In the registrant list 108a, items of "presence-in-room information" and "countermeasure taken at the time of absence" are provided for each registrant. In the item of "presence-in-room information", the presence-in-room state of each registrant is stored. For example, in the table 2, it is understood that information indicating that the registrant A is present in the room, the registrant B will be absent until Feb. 5, 2001 and the registrant Z will be absent until Feb. 24, 2001 is registered.

Further, in the column of "countermeasure taken at the time of absence of the subject registrant", the type of access right given to another registrant and a visitor when the subject registrant is absent is stored. For example, in the table 2, the condition is so set that any one of the registrant and visitor is refused to enter the room when the registrant A is absent. That is, in the table 2, the condition is so set that no one is permitted to enter the room if the registrant A is not present. Further, the condition is so set that the registrant A is permitted to enter the room of the registrant B irrespective of the presence-in-room information of the registrant B, but the registrant Z cannot enter the room if the registrant B is absent.

Further, in the item of a "visitor" of the column of "countermeasure taken at the time of absence of the subject registrant", information indicating the way to deal with a person who is temporarily permitted to enter the place is stored. "No entrance" as the countermeasure indicates the condition that entrance is inhibited. Further, "dependence on another person in room" as the countermeasure indicates the condition that if another person is present in the corresponding room when the subject registrant is absent, determination of permission or inhibition of entrance is made dependent on the person in the room.

Thus, the registrant list 108a as shown in the table 2 is set for the registrants for all of the rooms 103 to which entrance limitation is applied in the building 101. The adequate entrance/exit condition can be set according to the presence-in-room state of a person in each room 103 by use of the registrant list 108a.

If a person is determined as a registrant by use of the similarity determining section 133, the reception server 104 causes the door control device 117 to unfasten the electric lock 102b of the door 102a of the common doorway 102 of the registrant.

If the person is determined as a visitor, the reception server 104 registers face information of the visitor into the face feature amount registration section 134 and suggests the visitor to input information indicating a room such as a room number of the visiting destination by use of the information input section 135. If the visitor inputs information indicating the room, the reception server 104 determines permission or inhibition of access of the visitor to the room based on the registrant list 108a corresponding to the specified room.

For example, if the visitor is permitted to enter the room based on the registrant list 108a, the reception server 104 notifies the indoor side output device (display section 122b) of the room 103 of the visiting destination that the visitor has come. The person in the room of the visiting destination having received the notification specifies permission or inhibition of entrance of the visitor. If the person in the room of the visiting destination permits entrance of the visitor, the door unlocking section 146 unfastens the electric lock 103b of the door 103a.

On the other hand, if entrance of the visitor is inhibited based on the registrant list 108a, the reception server 104 refuses entrance of the visitor without unfastening the electric lock 102b of the door 102a. If entrance of the visitor is thus refused, the output device (display section 112) of the reception server 104 notifies that there is no person who can permit entrance in the room of the visiting destination.

The similarity determining sections 143a, 143b of the room terminal device 105 perform the same similarity determining process as the similarity determining process explained in the sixth embodiment. For example, the process up to the process for determining a person who stands in front of the door 103a of the room 103 is the same as that in the sixth embodiment. In the eighth embodiment, when a person who is authenticated as a registrant enters the room 103, the room terminal device 105 transmits information indicating that the registrant is present in the room to the presence-in-room management server 108. Thus, the presence-in-room management server 108 sets the item "presence-in-room information" of the registrant list 108a to "presence in room".

On the other hand, if the registrant exits the room 103 to the exterior, the room terminal device 105 transmits information indicating that the registrant is absent in the room to the presence-in-room management server 108. Thus, the presence-in-room management server 108 sets the item "presence-in-room information" of the registrant list 108a to "absence in room".

When a person enters the room 103, the room terminal device 105 reads out entrance limitation information associated with the person based on information in the presence-in-room management server 108. The room terminal device 105 controls the fastening/unfastening state of the electric lock 103b, notification to the internal section of the room 103 and permission/refusal of entrance based on the readout entrance limitation information associated with the person.

Further, when a person exits the room 103 to the exterior, the room terminal device 105 performs the authentication process for the person who exits the room. By performing the authentication process, the room terminal device 105 notifies exit of the person specified as the result of authentication to the presence-in-room management server 108 and unfastens the electric lock 103b of the door 103a.

The output devices (liquid crystal display monitors 122a, 122b, speakers 123a, 123b) of the room terminal device 105 are the same as those of the sixth embodiment.

For example, presence-in-room information for each room can be displayed on the display section 122b on the indoor side of the room 103 based on the registration information list 108a in the presence-in-room management server 108. Therefore, a person in each room can confirm the presence-in-room state of each room 103 and the setting state of the access right of each registrant. Further, in the eighth embodiment, it is assumed that, in each room terminal device 105, only the presence-in-room information of a corresponding one of the rooms can be confirmed in order to protect the privacy of each of the registrants in the building 101.

Also, it is possible to set a password number of a manager who manages the whole building 101 and permit all of the presence-in-room information items in the presence-in-room management server 108 to be confirmed only when the password number of the manager is authenticated.

Further, a password number of a person who has a right to change the setting of the registration information list 108a may be set. In this case, it is possible to change the setting contents of the registration information list 108a only when the password number of the person who has the right to change the setting of the registration information list 108a is authenticated.

The information input sections 145a, 145b of the room terminal device 105 have the same function as that of the information input section explained in the sixth embodiment. When a person exits the room 103, it is possible for the person who exits the room to input an absence period by use of the information input section 145b. That is, when the registrant exits the room 103, the room terminal device 105 authenticates the person who exits the room. The room terminal device 105 transmits information indicating that the authenticated registrant is "absent" to the presence-in-room management server 108.

At this time, the room terminal device 105 displays guidance suggesting the registrant to input the absence period on the display section 122b. The registrant who exits the room inputs the absence period according to the guidance by use of the information input section 145b if the absence period is previously known. If the registrant who exits the room inputs the absence period, the room terminal device 105 transmits the absence period of the registrant to the presence-in-room management server 108. The presence-in-room management server 108 registers the registrant who is absent and the absence period into the registration information list 108a based on information transmitted from the room terminal device 105. Thus, it is also possible to notify a person who visits during the absence about the absence period.

FIG. 33 is a view showing an example of an input screen indicating an absence period displayed on the display section 122b when the registrant exits the room. In FIG. 33, a display example of a case wherein the information input section 145b is configured by a touch panel contained in the display section 122b is shown. In the example of the absence period input screen shown in FIG. 33, an operation button 158 used to input an absence period and the like, a display section 159 used to display the input absence period and an input cancel button 160 used to correct the input contents are displayed.

Next, the flow of a process for controlling permission of entrance for a registrant and visitor based on presence-in-room information is explained.

The flowchart shown in FIG. 34 illustrates the flow of a process performed after a registrant and visitor arrive at a common doorway 102 of the whole building 101 until they enter respective rooms 103. The explanation is made below with reference to the flowchart of FIG. 34.

When a person stands in front of the door 102a of the common doorway 102 of the building 101, the reception server 104 authenticates a face based on a face image input from the camera 111 (step S131). Then, the reception server 104 determines whether the person is a visitor or not based on the result of authentication (step S132). If it is determined as the result of determination that the person is not a visitor (the person is a registrant), the reception server 104 unfastens the electric lock 102b of the door 102a of the common doorway 102 and permits the person to enter the building 101 (step S133).

When the registrant who has entered the building 101 arrives at an objective room 103 in the building 101, he stands in front of the door 103a. As a result, the room terminal device 105 causes the camera 121a to photograph a face image of the registrant. After photographing the face image, the room terminal device 105 performs the authentication process for the photographed face image (step S134). If a person with the photographed face image is specified by the authentication process, the room terminal device 105 accesses the presence-in-room management server 108 and reads out the registrant list 108a of the corresponding room 103 (step S135). After reading out the registrant list 108a, the room terminal device 105 determines whether or not the present registrant is permitted to enter the room based on the registrant list 108a (step S136).

If it is determined in the above determination process that the present registrant is permitted to enter the room, the room terminal device 105 causes the door control section 127 to unfasten the electric lock of the door 103a and permits the present registrant to enter the room 103 (step S137). On the other hand, if it is determined in the above determination process that the present registrant is not permitted to enter the room, the room terminal device 105 outputs a message indicating the absence of a registrant who is required for permitting entrance on the display section 122a on the outdoor side and keeps the electric lock 103b of the door 103a fastened (step S138).

Further, if it is determined as the result of determination in the step S132 that the person is a visitor, the reception server 104 displays an input screen of a visiting destination used to inquire about the visiting destination as shown in FIG. 22 on the display section 112 of the common doorway 102. The visitor inputs a room number of the objective visiting destination by use of the operation button 152 of the input screen of the visiting destination displayed on the display section 112 (step S139).

When the room number of the visiting destination is input, the reception server 104 reads out the registrant list 108a of the corresponding room from the presence-in-room management server 108 (step S140). After reading out the registrant list 108a, the reception server 104 determines whether or not a registrant who is required for permitting entrance is present in the room (step S141). If it is determined as the result of determination that the registrant required for permitting entrance is absent, the reception server 104 outputs a message indicating the absence of the registrant required for permitting entrance on the display section 112 of the common doorway 102 and keeps the electric lock 102b of the door 102a of the common doorway 102 in the fastened state (step S142).

If it is determined as the result of determination in the step S141 that the registrant required for permitting entrance is present in the room, the reception server 104 transmits a face image photographed by the camera 111 to the room terminal device 105 of the room 103 of the visiting destination. The room terminal device 105 which has received the face image of the visitor displays a screen notifying a visit of the visitor as shown in FIG. 23 on the display section 122b on the indoor side.

Thus, the person in the room recognizes that the visitor has appeared at the common doorway 102. The person in the room 103 of the visiting destination who has received the notification confirms the face image displayed on the display section 122b and depresses the entrance permission button (not shown) if he permits entrance of the visitor. If the entrance permission button is depressed, the door unlocking section 146 of the room terminal device 105 transmits a door unlocking request to the reception server 104. Then, the reception server 104 causes the door control device 117 to unfasten the electric lock 102b of the door 102a of the common doorway 102 and permits the visitor to enter the building 101.

At this time, the reception server 104 registers the face image of the visitor into the registration information holding device 116 and transmits the face image of the visitor to the room terminal device 105 of the corresponding room (step S143). As a result, the face image of the visitor is registered into the registration information holding device 126 of the room terminal device 105 of the room into which the visitor is permitted to enter.

The visitor who has entered the building 101 arrives at the room 103 of the visiting destination in the building 101 and then stands in front of the door 103a at the entrance. Therefore, the room terminal device 105 causes a camera 121a to photograph a face image of the visitor. After photographing the face image, the room terminal device 105 performs the authentication process for the photographed face image (step S144). If a person of the photographed face image is specified by the authentication process, the room terminal device 105 accesses the presence-in-room management server 108 to read out the registrant list 108a of a corresponding one of the rooms 103 (step S145). After reading out the registrant list 108a, the room terminal device 105 determines whether or not a person who can give permission of entrance to the visitor is present in the room based on the registrant list 108a (step S146).

If it is determined as the result of determination that the person who can give permission of entrance to the visitor is present in the room, the room terminal device 105 displays a screen notifying a visit of the visitor as shown in FIG. 23 on the display section 122b on the indoor side.

As a result, the person in the room recognizes that the visitor appears in front of the door 102a. The person in the room 103 of the visiting destination who receives the notification confirms the face image displayed on the display section 122b and depresses the entrance permission button 155 if he permits entrance of the visitor. If the entrance permission button 155 is depressed, the door unlocking section of the room terminal device 105 causes the door control device 127 to unfasten the electric lock 103b of the door 103a and permits the visitor to enter the room 103 (step S147).

If it is determined as the result of determination in the step S146 that the person is absent in the room, the room terminal device 105 outputs a message indicating that the person who can permit entrance is absent to the display section 122a on the outdoor side and keeps the electric lock 103*b* of the door 103*a* in the fastened state (step S148).

As described above, according to the eighth embodiment, the absence-in-room state of the room is automatically registered in the presence-in-room management server 108 to control entrance of a person based on the previously set contents thereof. That is, the face authentication process is performed not only when a person enters the room but also when the person exits the room and the presence-in-room state of the registrant is registered in the presence-in-room management server 108. As a result, it becomes possible to perform an adequate access management process previously set according to presence-in-room information and inhibit another person from accessing a room in which the registrant or the like is absent.

Next, the ninth embodiment is explained.

The ninth embodiment is a stand-alone entrance management apparatus which can be used only for one room or one doorway of a building. Of course, like the sixth to eighth embodiments, the entrance management apparatus can be realized as the entrance management apparatus interlocked in the client server system.

The ninth embodiment is the entrance management apparatus in which daily authentication histories are held, the authentication history can be observed at any given time and the growth record and diary of a person who obtains permission of entrance are automatically formed. A case where the entrance management apparatus is applied to one of the rooms of the building shown in FIG. 15 is explained, for example.

Figure 35:
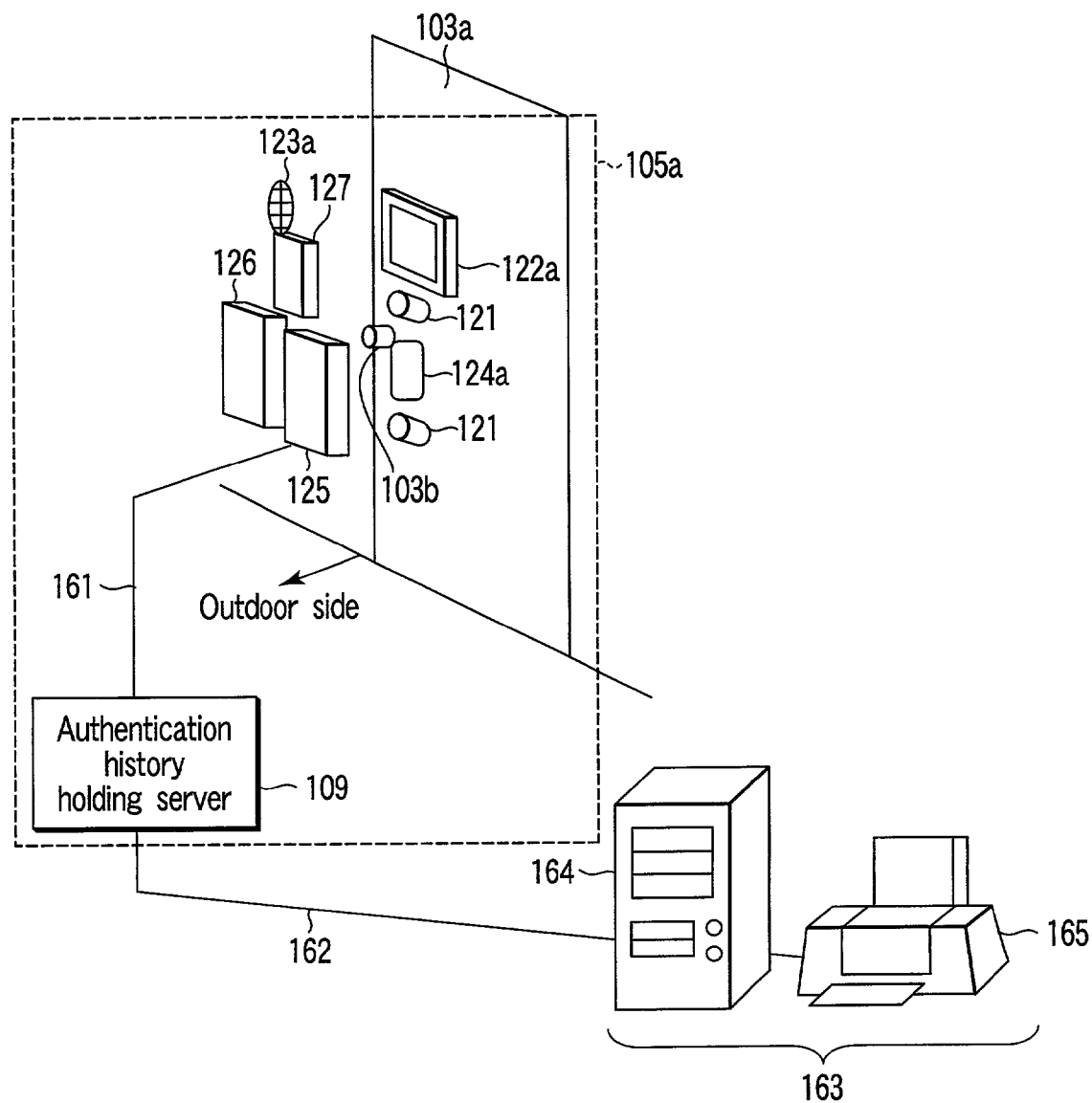
FIG. 35 is a simulated view schematically showing the configuration of an entrance management apparatus according to a ninth embodiment of this invention.

FIG. 35 schematically shows the configuration of the entrance management apparatus according to the ninth embodiment. The basic configuration of the entrance management apparatus according to the ninth embodiment is the same as that of the room terminal device 105 in the sixth embodiment shown in FIGS. 17 and 18. As shown in FIG. 35, the ninth embodiment is different from the sixth embodiment in that an authentication history holding server 109 used as authentication history holding means and an authentication history output device 163 used as authentication history output means are additionally provided in the sixth embodiment. Portions which are the same as those of FIG. 17 are denoted by the same reference symbols, the explanation thereof is omitted and only different portions are explained.

The authentication history holding server 109 is configured by a personal computer or the like. The authentication history holding server 109 holds the authentication history in each of the room terminal devices 105. The authentication history output device 163 includes a personal computer 64 with display and a printer 65. The authentication history output device 163 outputs the authentication history held in the authentication history holding server 109 in a preset form. The authentication history output device 163 permits authentication history information to be observed and outputs the growth record and diary in a preferable form, for example.

In the example of FIG. 35, the authentication history holding server 109 is connected to a control device 125 via a network circuit 161. The authentication history output device 163 is connected to the authentication history holding server 109 via a network circuit 162.

Figure 36:
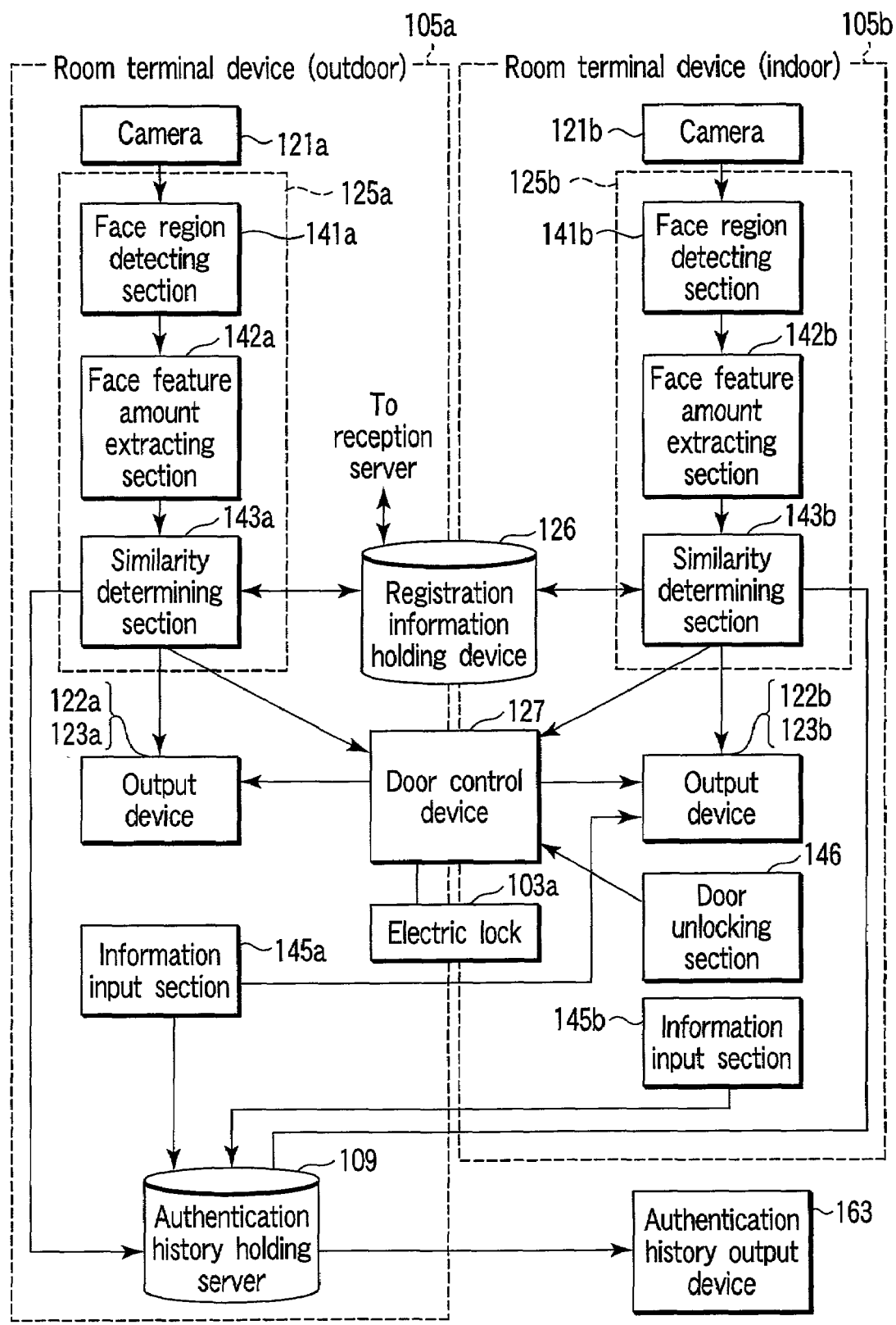
FIG. 36 is a block diagram showing the whole configuration of the entrance management apparatus according to the ninth embodiment.

FIG. 36 is a block diagram showing the whole configuration of the entrance management apparatus according to the ninth embodiment. The basic configuration thereof is the same as the room terminal device 105 shown in FIG. 32 explained in the sixth embodiment. The configuration shown in FIG. 36 is different from that shown in FIG. 32 in that a face feature amount registration section 144, authentication history holding server 109 and authentication history output device 163 are added to the configuration shown in FIG. 32. Portions which are the same as those of FIG. 20 are denoted by the same reference symbols and the explanation thereof is omitted.

The above sections are explained in detail below.

The face feature amount registration section 144 is the same as the face feature amount registration section 134 of the reception server 104 explained before. In order to enhance the security, it is possible to inhibit registration of face feature amounts if it is not combined with a physical security device such as a key or a password number input. Therefore, it is possible to conduct registration of feature amounts only in the presence of a person such as a manager who has the right to register the face feature amount.

The flow of a process up to the process for determining a person who stands in front of the door 103*a* of the room 103 by use of the similarity determining section 143*a*,143*b* can be realized in the same manner as the flow of the process in the sixth embodiment. In the ninth embodiment, a process for transferring the determination result (authentication result) and the face image to the authentication history holding server 109 is performed in addition to the operation in the sixth embodiment.

Figure 37:
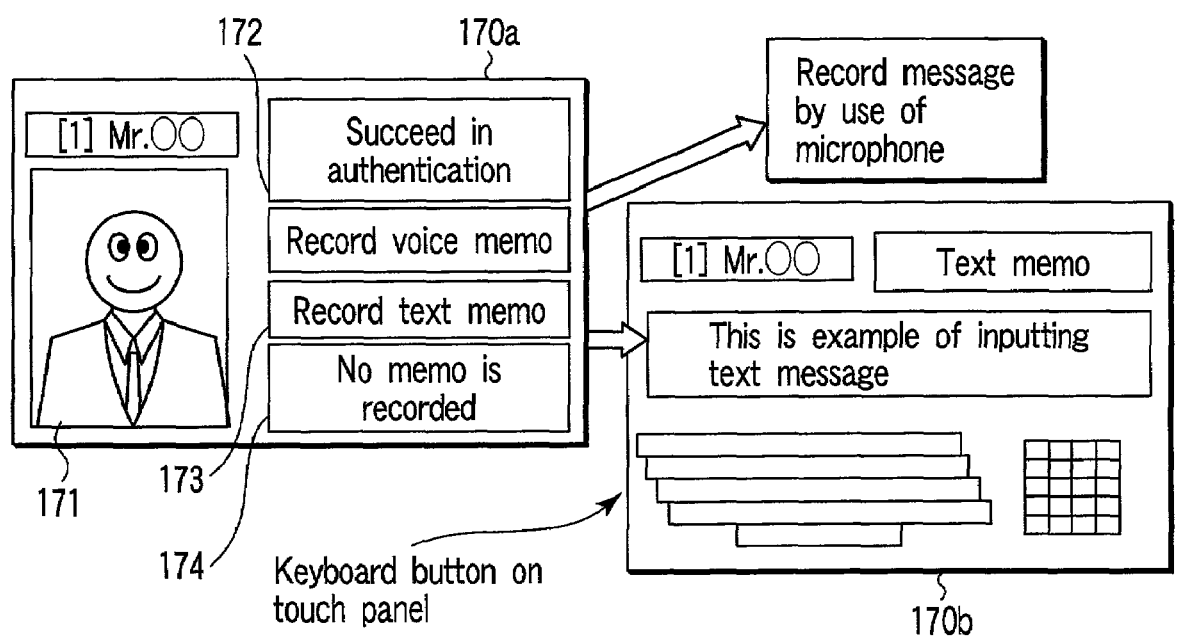
FIG. 37 is a view showing one example of an information input section in the ninth embodiment.

The information input section 145*a*,145*b* can be realized in the same manner as in the sixth embodiment. The information input section 145*a*,145*b* of the ninth embodiment performs the operation for inputting a message which is desired to be recorded in the growth record or diary as voice data or text information in addition to the operation explained in the sixth embodiment. For example, after completion of the authentication process, an inquiry screen 170*a* as shown in FIG. 37 is displayed on the display section 122*a* or 122*b*. Each registrant can record a desired message as the history as required according to guidance displayed on the inquiry screen 170*a*.

Further, a text message can be automatically input based on the voice of the registrant by use of the voice recognition technique.

In the inquiry screen 170*a* shown in FIG. 37, it is assumed that a touch panel contained in the display section 122*a* or 122*b* is used as the information input section 145*a*,145*b*. On the inquiry screen 170*a*, a face image display region 171, voice memo button 172, text memo button 173 and cancel button 174 are displayed.

In the face image display region 171, a face image of a person photographed by the camera 121 and stored as a history is displayed. The voice memo button 172 is operated when the registrant records a voice message. As the voice message, the voice itself can be held as it is or data obtained by converting a voice into a text message by use of the voice recognition technique can be held. The text memo button 173 is operated if a text memo (character data) input by the registrant is kept recorded. The cancel button 174 is operated when no memo is kept recorded.

When the text memo button 173 is input, a text memo input screen 170*b* as shown in FIG. 37 is displayed on the display section 122*a* or 122*b*. As shown in FIG. 37, on the text memo input screen 170*b*, a keyboard is displayed by use of the touch panel contained in the display section 122*a* or 122*b*. The registrant inputs a memo (sentence) by depressing keys to operate the keyboard displayed on the input screen 170*b*.

Figure 38:
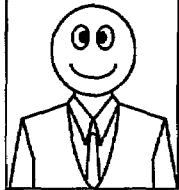
FIG. 38 is a view showing an output example of an authentication history output device in the ninth embodiment.

A memo (comment) input on the inquiry screen 170*a* is held in the authentication history holding server 109 as authentication history information together with the date, authentication time, authenticator, face image and the like. FIG. 38 is a view showing an example of authentication history information held in the authentication history holding server 109. In the example shown in FIG. 38, a voice memo as a comment or a memo based on text is held.

As described before, the authentication history output device 163 is configured by the personal computer 164 and printer 165. The authentication history output device 163 displays or prints out history information held in the authentication history holding server 109. For example, the personal computer 164 and printer 165 used as the authentication history output device 163 are disposed in the room 103.

Therefore, the registrant can display information of the authentication history holding server 109 by use of the personal computer 164 in the room 103. Further, the registrant can print information held in the authentication history holding server 109 by use of the printer 165 in the room 103. In addition, the registrant can confirm whether dishonest access to the room 103 has been made or not by use of the authentication history output device 163. It is possible only for the manager to use the authentication history output device 163 by use of a password number or the like.

Figure 39:
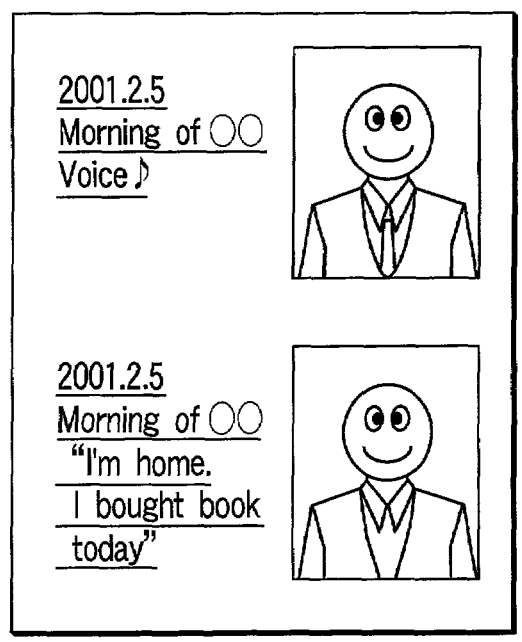
FIG. 39 is a view showing another output example of an authentication history output device in the ninth embodiment.

FIG. 39 is a view showing an output example of authentication history information by the authentication history output device 163. FIG. 39 shows an example in which the authentication history information shown in FIG. 38 is output onto a sheet of paper. For example, the registrant selects desired information from the authentication history and operates the printer 165 to print the selected information. In this case, the printer 165 prints the face image, memo (comment), date and the like corresponding to the information selected by the registrant in a form selected by the registrant. Thus, information held as the authentication history can be printed in an album form or diary form.

As described above, according to the ninth embodiment, in the apparatus which controls the locking/unlocking state of the door of the room according to authentication of the face image, the authentication history is held as the history of entrance/exit and the authentication history can be observed at any desired time. Further, according to the ninth embodiment, not only the authentication history is held as the history of entrance/exit but also a memo of the user is held at the time of entrance/exit. Thus, not only the authentication history can be observed but also a memo of a person who obtains permission of entrance can be held. Further, the authentication history can be used as the diary or growth record of the registrant.

As described above, according to the sixth to ninth embodiments, even when a person such as a guest who is not normally permitted to enter the facility or room is temporarily permitted to enter the corresponding place, the entrance management can be performed without losing the security. Further, it is possible to inhibit a visitor from accessing a place other than the place which the visitor is permitted to enter.

Next, tenth to fifteenth embodiments of this invention are explained with reference to the accompanying drawings.

The tenth to fifteenth embodiments each relate to an entrance/exit authentication apparatus (entrance management apparatus) which manages re-entrance of a user who temporarily exits a security area.

First, the tenth embodiment is explained.

Figure 40:
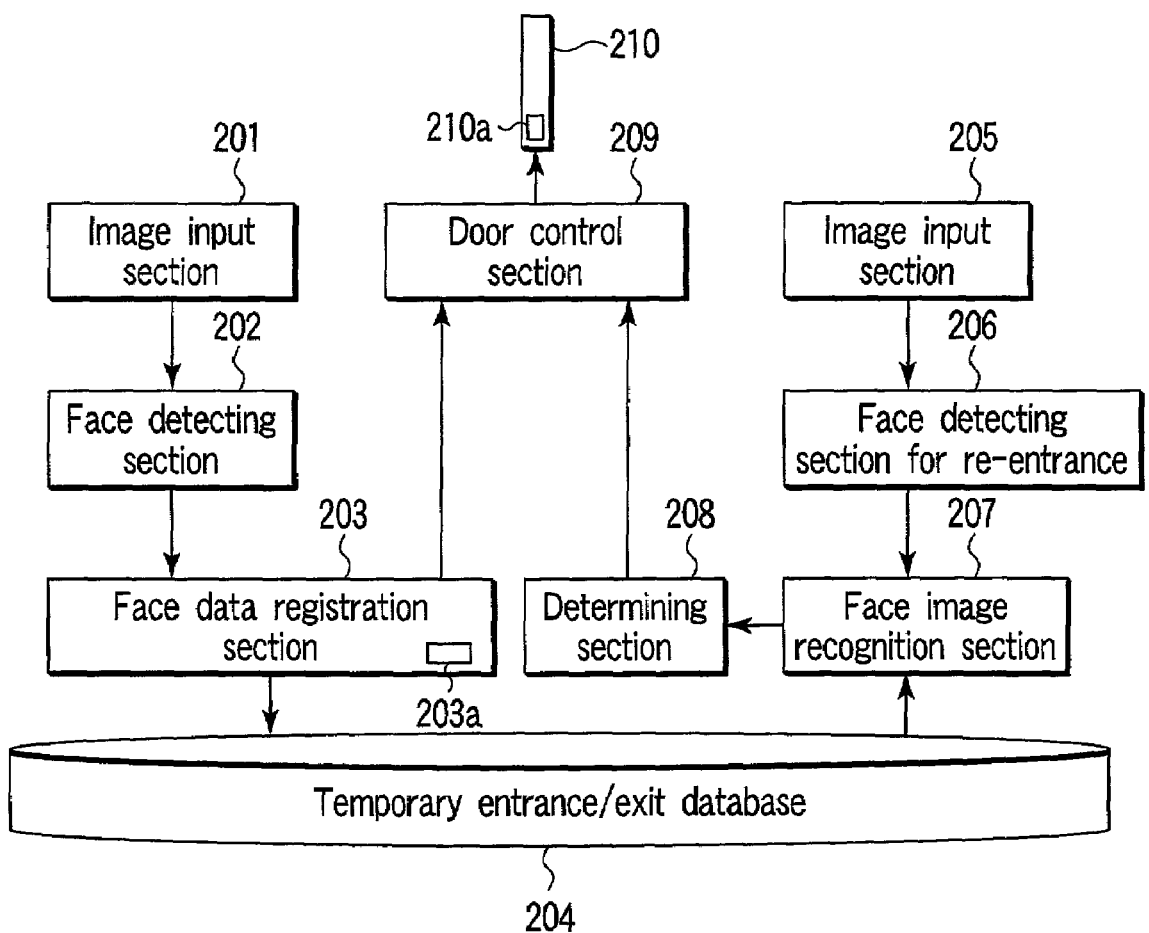
FIG. 40 is a block diagram schematically showing the configuration of an entrance/exit authentication apparatus according to a tenth embodiment of this invention.

FIG. 40 schematically shows the configuration of the entrance/exit authentication apparatus (entrance management apparatus) according to the tenth embodiment. The entrance/exit authentication apparatus includes an image input section 201 used as first image acquiring means, a face detecting section 202 used as first face pattern extracting means, a face data registration section 203 used as registration means, a temporary entrance/exit database 204 also used as registration means, an image input section 205 used as second image acquiring means, a face detecting section 206 for re-entrance used as second face pattern extracting means, a face image recognition section 207 used as face recognition means, a determining section 208 used as determining means, and a door control section 209 used as entrance/exit control means.

The above sections are explained in detail below.

The image input section 201 photographs and inputs at least a face image of a user inside the doorway of the security area when the user temporarily exits the security area to the exterior. The image input section 201 is mainly configured by a video camera, for example. As shown in FIG. 2, a light and shade image photographed by the video camera is output from the image input section 201 as digital data (image data) of 512 pixels in the horizontal direction and 512 pixels in the vertical direction, for example.

The face detecting section 202 detects and extracts a face pattern from image data input from the image input section 201. The process by the face detecting section 202 is performed according to the processing procedure shown in the flowchart of FIG. 3, for example. The processing procedure of FIG. 3 is the same as that explained in the first embodiment with reference to FIGS. 4, 5, 6.

The face data registration section 203 registers (stores) a face pattern rc(i, j) which is a face feature amount output from the face detecting section 202 in relation to information of date and hour counted by a timer 203a contained in the face data registration section 203 into the temporary entrance/exit database 204. At the time of completion of the above registration process, the face data registration section 203 causes the door control device 209 to unfasten an electric lock 210a mounted on a door 210 and sets up a passable state. Assume that the door 210 is provided at the doorway of the security area. The electric lock 210a is mounted on the door 210. The electric lock 210a is unfastened under the control of the door control section 209. Normally, assume that the electric lock 210a is kept in a fastened state if a specification of unlocking is not issued from the door control section 209.

The temporary entrance/exit database 204 is configured by a programmable storage medium such as a hard disk device. The temporary entrance/exit database 204 stores a face pattern of each user in relation to information of date and hour at which the face pattern is acquired.

The image input section 205 photographs and inputs at least a face image of a user outside the doorway of the security area when the user re-enters the security area. The image input section 205 is mainly configured by a video camera, for example. As shown in FIG. 2, a light and shade image photographed by the video camera is output from the image input section 205 as digital data (image data) of 512 pixels in the horizontal direction and 512 pixels in the vertical direction, for example.

The face detecting section 206 for re-entrance detects and extracts a face pattern from image data input from the image input section 205. The process by the face detecting section for re-entrance is performed according to the same processing procedure as that in the face detecting section 202.

The face image recognition section 207 performs a collation process to collate the face pattern of each user registered in the temporary entrance/exit database 204 with the face pattern output from the face detecting section 206 for re-entrance. The face image recognition section 207 performs a face recognition process by selecting the most similar one of the face patterns registered in the temporary entrance/exit database 204 by the above collation process. The process by the face image recognition section 207 is performed according to the processing procedure shown in the flowchart of FIG. 8, for example. The processing procedure of the face image recognition section 207 in the tenth embodiment is the same as that which is obtained by replacing the dictionary data management section 17 in the processing procedure of FIG. 8 explained in the first embodiment by the temporary entrance/exit database 204.

The determining section 208 checks whether or not the maximum similarity Simc(x, y) obtained as the result of the process by the face image recognition section 207 is larger than a preset threshold value. Further, the determining section 208 checks date and hour information registered in relation to the face pattern having the maximum similarity in the face image recognition section 207. The determining section 208 determines permission of entrance in a case where the maximum similarity is equal to or larger than the preset threshold value and re-entrance is made within a previously determined period of time.

The door control section 209 unfastens the electric lock 210a of the door 210 and sets up the passable state based on the notification of permission of passage from the determining section 208.

Next, the flow of the process according to the tenth embodiment with the above configuration is explained.

First, the flow of a process for temporary exit from the security area is explained with reference to the flowchart shown in FIG. 41. When the user temporarily exits the security area to the exterior, the face input section 201 disposed in position inside and near the doorway photographs a face image of the user (step S201). The face image input section 201 transmits the photographed face image to the face detecting section 202. The face detecting section 202 detects a face region based on the image data from the image input section 201 (step S202). After detecting the face region (step S203), the face detecting section 202 extracts a face pattern from the detected face region (step S204).

After the face detecting section 202 extracts the face pattern, the face data registration section 203 registers the extracted face pattern in relation to information of date and hour counted by the timer 203a as information of the user (temporary exit person) into the temporary entrance/exit database 204 (step S205). When information of the user is registered into the temporary entrance/exit database 204, the face data registration section 203 transmits an unfastening request of the electric lock 210a to the door control section 209.

When receiving the unfastening request of the electric lock 210a from the face data registration section 203, the door control section 209 unfastens the electric lock 210a of the door 210 provided at the doorway of the security area (step S206) and sets up a state in which the user can pass through. When the user has passed through the doorway (step S207), the door control section 209 fastens the electric lock 210a of the door 210 again (step S208) and sets up a passage impossible state.

Next, the flow of a process at the time of re-entrance into the security area is explained with reference to the flow charts shown in FIGS. 42 and 43.

When the user re-enters the security area, the image input section 205 disposed outside and near the doorway photographs a face image of the user (step S211). After photographing the face image of the user, the face image input section 205 transmits the photographed face image to the face detecting section 206 for re-entrance. When receiving image data from the face image input section 205, the face detecting section 206 for re-entrance detects a face region based on the photographed image data (step S212). After detecting the face region (step S213), the face detecting section 206 for re-entrance extracts a face pattern from the detected face region (step S214).

Then, the face image recognition section 207 performs the collation process for collating the face pattern output from the face detecting section 206 for re-entrance with the face pattern of each user registered in the temporary entrance/exit database 204. In the collation process, the face image recognition section 207 specifies a person corresponding to the maximum similarity to perform the face recognition process (step S215).

The determining section 208 determines permission of passage when the maximum similarity output from the face image recognition section 207 exceeds a preset threshold value (step S216). Further, the determining section 208 determines whether or not the entrance is re-entrance within a preset period of time based on date and hour information registered in relation to the face pattern which gives the maximum similarity (step S217). That is, the determining section 208 derives a period of absent time (=entrance time−exit time) and checks whether the thus derived period of absent time is shorter than the preset time.

If it is detected in the above checking process that the thus derived period of absent time is shorter than the preset time, that is, if the user temporarily exits and comes back within a preset period of time, the determining section 208 issues a notification of permission of passage to the door control device 209. When receiving the above notification, the door control section 209 unfastens the electric lock 210a of the door 210 (step S218) and sets up a state in which the user can pass through. When the user has passed through the doorway (step S219), the door control section 209 fastens the electric lock 210a of the door 210 again (step S220) and sets up a passage impossible state.

Further, when the user has passed through the doorway (step S219), the face data registration section 203 deletes face data registered by the user at the time of temporary exit from the temporary entrance/exit database 104 (step S221). At this time, the face data registration section 203 records a face patterns and date and hour information as a passage history into the temporary entrance/exit database 104 (step S222) and terminates the process.

If permission of passage is not determined in the step S216 or if it is determined in the checking process of the step S217 that the user does not come back within a preset period of time, the door control device 209 keeps the door in the locked state and inhibits the user from passing therethrough (step S223). At this time, the entrance management apparatus can be configured to display guidance of "No Passage" for the user by use of a display (not shown) provided outside the door 210 (step S223).

If the passage is inhibited, the door control device 209 controls the electric lock 210a of the door by use of substitute authentication means (step S224). As the substitute authentication means, for example, a security device using a key or password number other than face image recognition means is used. At this time, the entrance management apparatus can be configured to inform the user of usage of the substitute authentication means by use of a display (not shown) provided outside the door 210 (step S224).

When the user passes through the doorway by use of the substitute authentication means, the face data registration section 203 checks the face image of the user at the doorway and records the face image as a usage history into the temporary entrance/exit database 204 (step S225). For example, as the above usage history, a face pattern, date and hour information and substitute authentication means used and the like are recorded.

Further, the face data registration section 203 can determine a user who is inhibited from re-entering because of overtime based on the passer list by checking the face image. Therefore, the user who is inhibited from re-entering because of overtime is recorded in the temporary entrance/exit database 204 as the usage history of the user registered in the temporary entrance/exit database 204 at the time of exit (step S225).

As described above, according to the tenth embodiment, the face image is registered at the time of temporary exit and the authentication process using the face image is performed at the time of re-entrance. If it is determined in the authentication process that the re-entrance is made within a preset period of time, permission of entrance of the user is provided. As a result, the user can easily make his temporary exit.

That is, according to the tenth embodiment, in an entrance/exit authentication apparatus which determines entrance/exit with respect to a security area such as an important facility or room on which much importance is put, when the user temporarily exits the security area, the face pattern of the user is registered and re-entrance is controlled by collation with the registered face pattern at the time of re-entrance.

Thus, it is possible to provide an entrance/exit authentication apparatus which can permit the user to easily re-enter the room even if he does not have a security device when the user temporarily exits the room and comes back in a short period of time and which is free from an influence due to a long-term variation with time of a human by limiting the permission time until re-entrance.

Next, the eleventh embodiment is explained.

Figure 44:
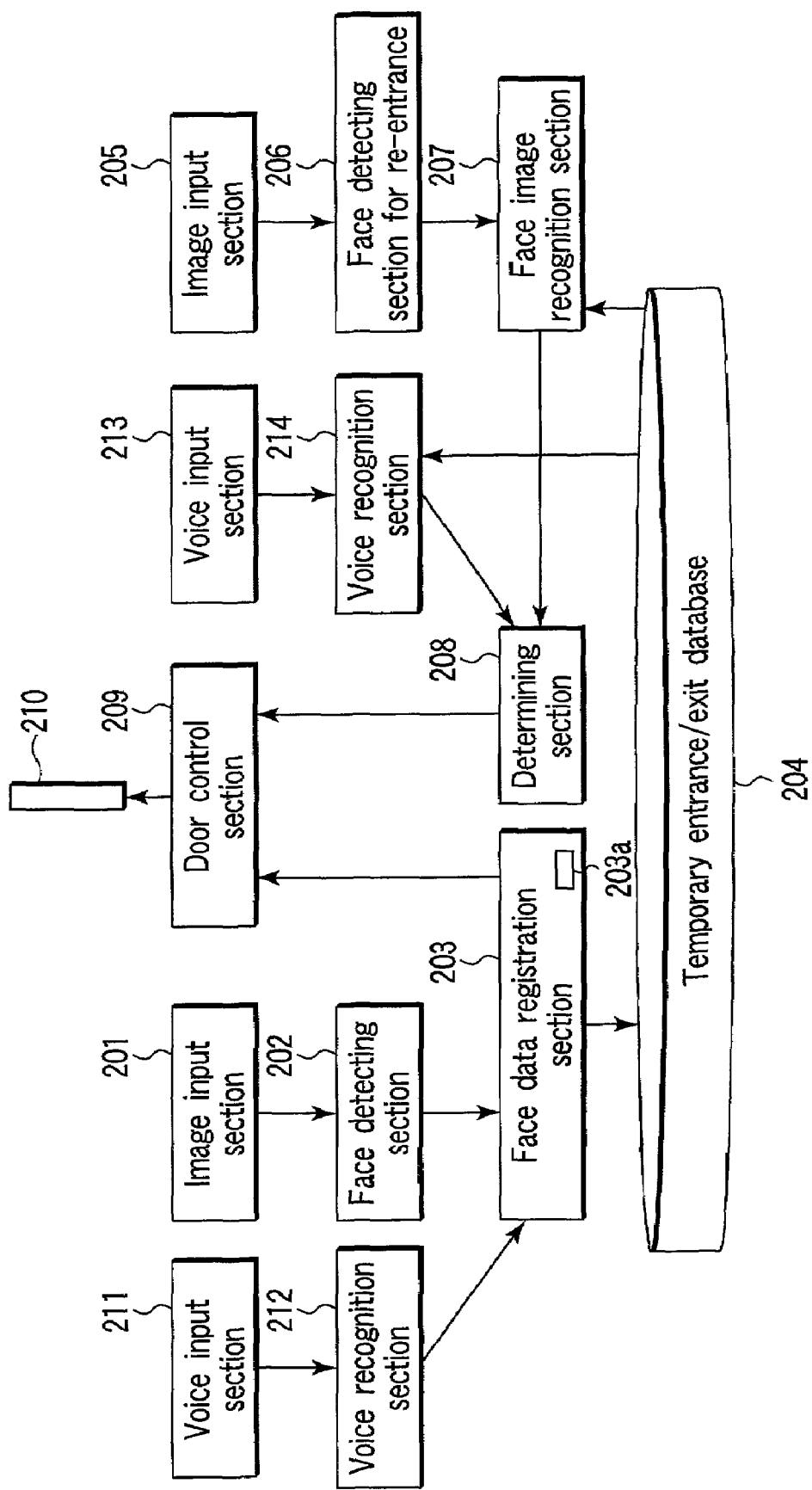
FIG. 44 is a block diagram schematically showing the configuration of an entrance/exit authentication apparatus according to an eleventh embodiment of this invention.

FIG. 44 schematically shows the configuration of an entrance/exit authentication apparatus according to the eleventh embodiment. As shown in FIG. 44, the entrance/exit authentication apparatus according to the eleventh embodiment is different from that of the tenth embodiment in that a voice input section (first voice acquiring means) 211, voice recognition section (second voice acquiring means) 212, voice input section (second voice acquiring means) 213 and voice recognition section (second voice acquiring means) 214 are added to the tenth embodiment. The other portion of the eleventh embodiment is the same as that of the tenth embodiment and only the different portion from that of the tenth embodiment is explained below.

The voice input section 211 is disposed inside the doorway of the security area. The voice input section 211 is configured by a microphone, for example. The voice input section 211 inputs a keyword or the like uttered by the user when the user temporarily exits or leaves the inside place of the security area to the outside. The voice recognition section 212 recognizes the keyword input with a voice by the voice input section 211.

The voice input section 213 is disposed outside the doorway of the security area. The voice input section 213 is configured by a microphone, for example. The voice input section 213 inputs a keyword or the like uttered by the user when the user re-enters the internal place of the security area from the exterior thereof. The voice recognition section 214 recognizes the keyword input with a voice by the voice input section 213.

Next, the flow of a process of the apparatus with the above configuration according to the eleventh embodiment is explained.

First, the flow of a process for temporary exit from the security area is explained with reference to the flowchart shown in FIG. 45. The process from the step S231 to the step S234 is the same as the process from the step S201 to the step S204 explained before and therefore the explanation thereof is omitted.

When a face pattern is extracted in the step S234, a face data registration section 203 requests the user to utter a keyword (step S235). The request of utterance of the keyword to the user is made by displaying to the effect that the keyword is uttered on a display (not shown) for the user, for example. Further, the request of utterance of the keyword to the user may be made by giving voice guidance to the effect that the keyword is uttered by use of a speaker (not shown).

When receiving the utterance request of the keyword, the user utters a keyword to the voice input section 211 disposed inside and near the doorway. When the voice of the keyword by the user is input (step S236), the voice recognition section 212 performs the voice recognition process for the input voice (step S237). When the voice recognition section 212 recognizes the keyword by the voice recognition process, the voice recognition section 212 requests the user to confirm the recognized keyword (step S238).

For example, the keyword confirmation request is made by displaying the keyword obtained as the recognition result on a display (not shown). Further, the keyword confirmation request to the user may be made by giving guidance of the recognized keyword with a voice by use of a speaker (not shown).

If the user does not admit the recognized keyword in the keyword confirmation request operation (step S239), the face data registration section 203 returns the process to the step S235 and makes a request of utterance of a keyword again.

Further, if the user admits the recognized keyword in the keyword confirmation request operation, the face data registration section 203 registers information of date and hour counted by the timer 203a, extracted face pattern, input voice data, recognized keyword and the like which are set in relation to one another as information of the user (temporary exit person) into the temporary entrance/exit database 104 (step S240).

Figure 41:
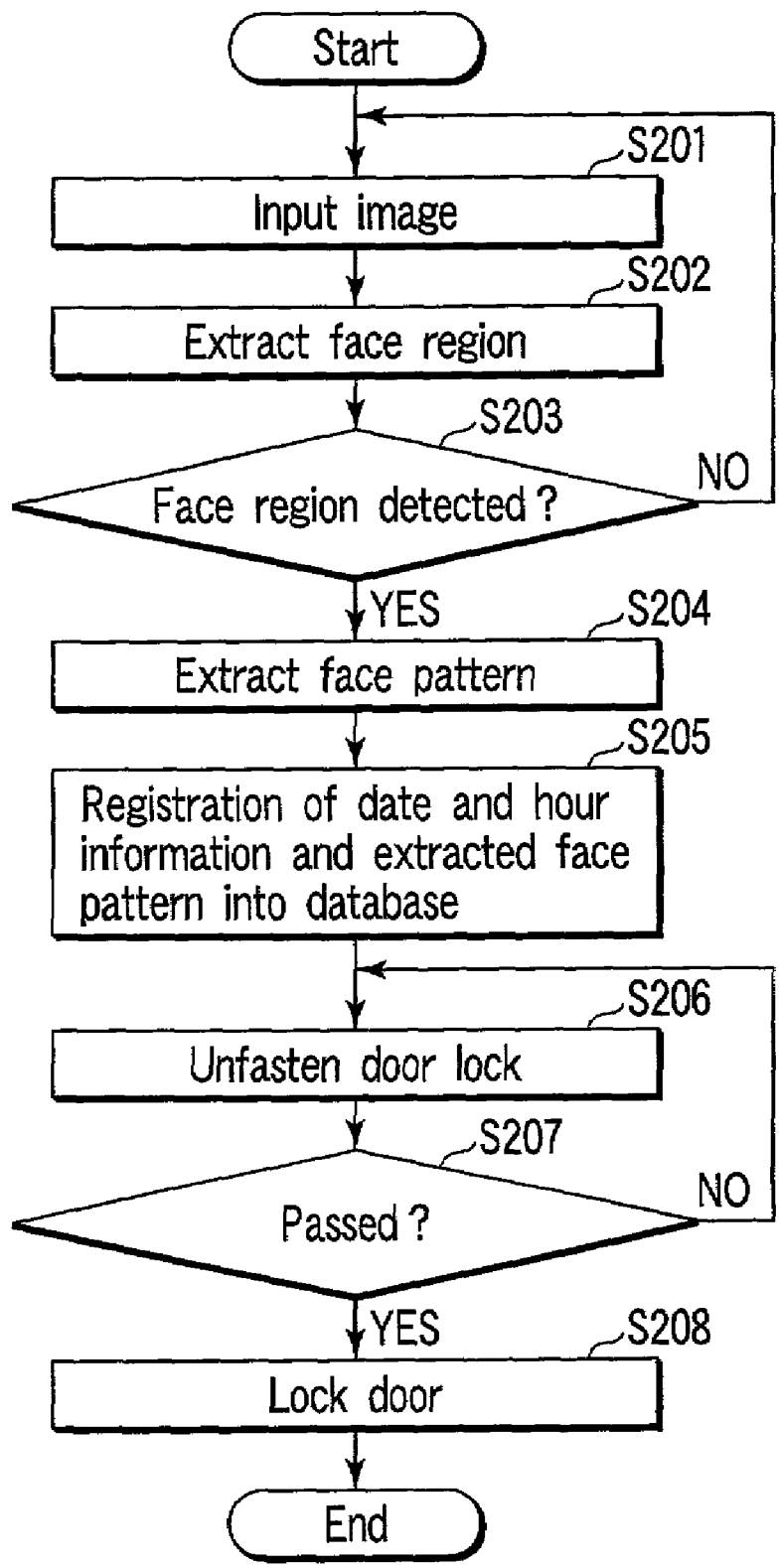
FIG. 41 is a flowchart for illustrating the flow of a process at the time of temporary exit from a security area in the tenth embodiment.

Since the process from the step S241 to the step S243 which will be performed after this is the same as the process from the step S206 to the step S208 of FIG. 41, the explanation thereof is omitted.

Next, the flow of a process at the time of re-entrance into the security area is explained with reference to the flowcharts shown in FIGS. 46 and 47.

Figure 46:
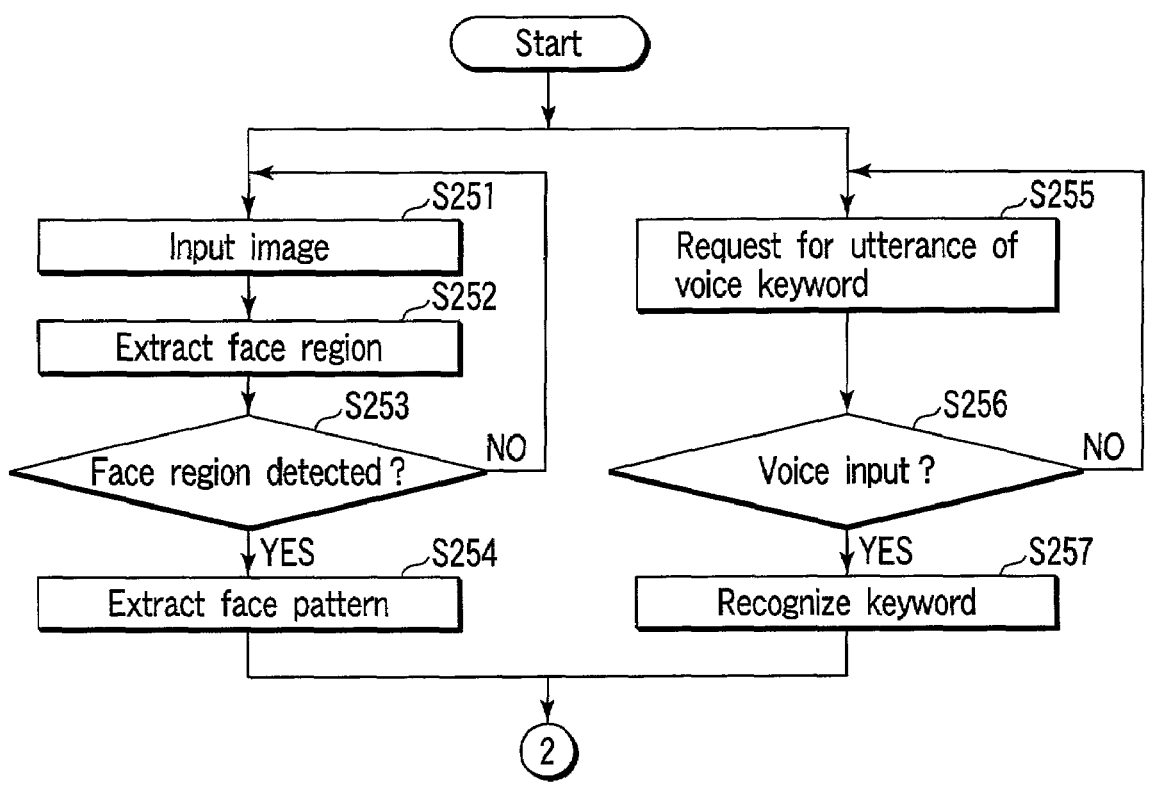
FIG. 46 is a flowchart for illustrating the flow of a process at the time of re-entrance into the security area in the eleventh embodiment.
Figure 47:
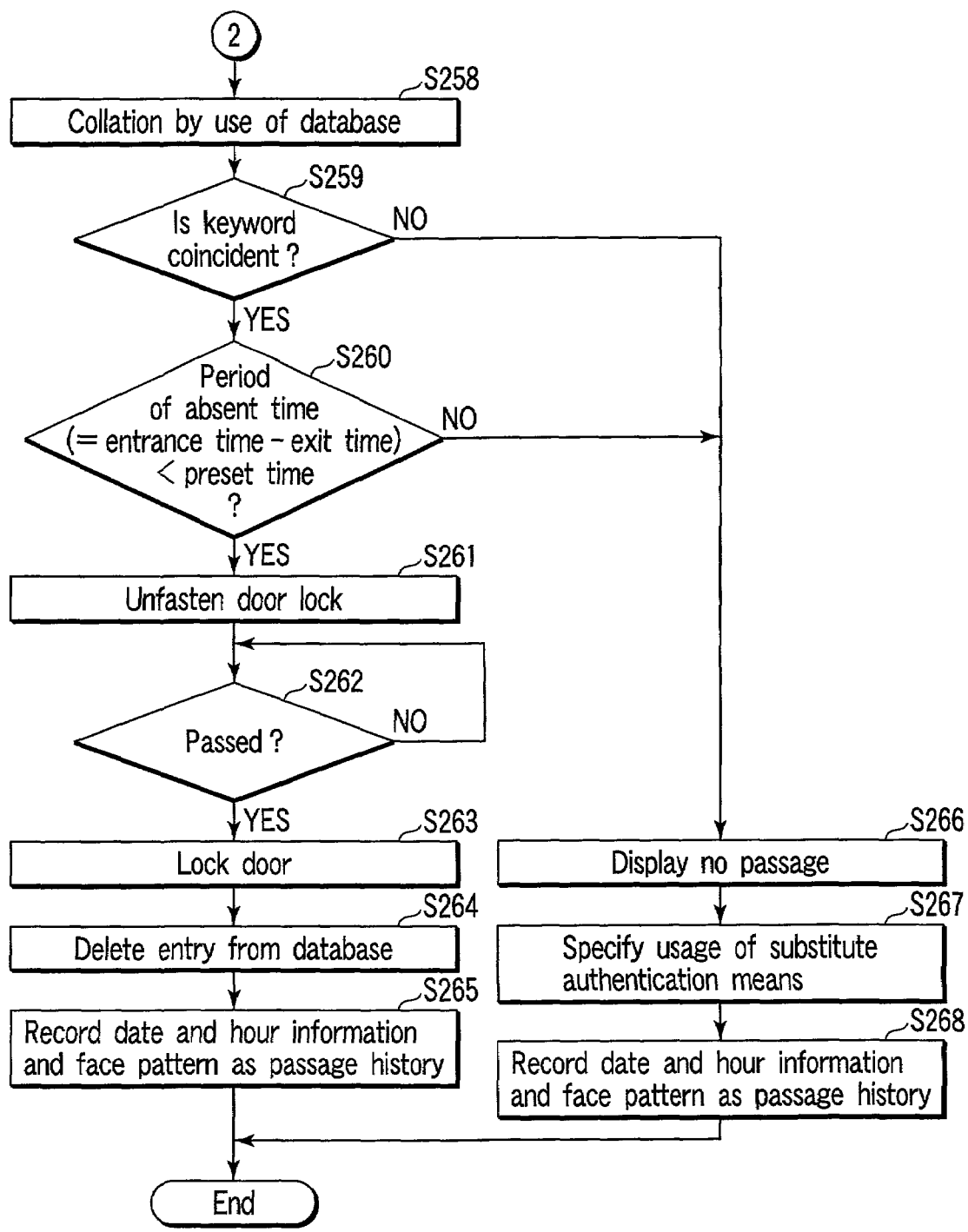
FIG. 47 is a flowchart for illustrating the flow of a process at the time of re-entrance into the security area in the eleventh embodiment.

Since the process from the step S251 to the step S254 shown in FIG. 46 is the same as the process from the step S211 to the step S214 of FIG. 42, the explanation thereof is omitted.

When the face image of the user who tries to re-enter is photographed, the face data registration section 203 requests the user to utter a keyword (step S255). The request of utterance of the keyword to the user is made by displaying to the effect that the keyword is uttered on a display (not shown) for the user, for example. Further, the request of utterance of the keyword to the user may be made by giving voice guidance to the effect that the keyword is uttered by use of a speaker (not shown).

When receiving the utterance request of the keyword, the user utters a keyword to the voice input section 211 disposed inside and near the doorway. When the voice of the keyword by the user is input (step S256), the voice recognition section 212 performs the voice recognition process for the input voice (step S257).

Figure 45:
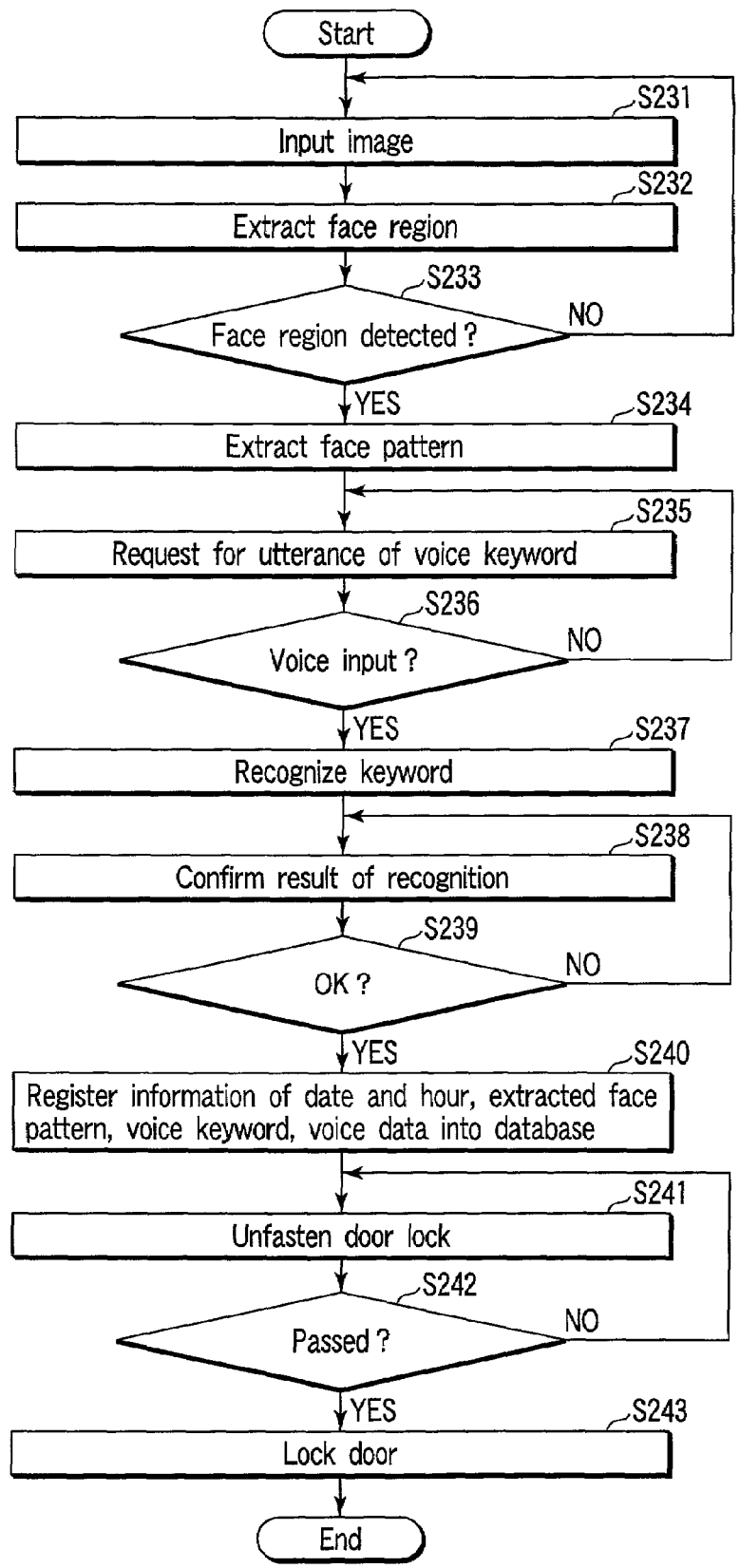
FIG. 45 is a flowchart for illustrating the flow of a process at the time of temporary exit from a security area in the eleventh embodiment.

When the voice recognition section 212 recognizes the keyword by the voice recognition process, the voice recognition section 212 confirms the recognized keyword like the steps S238 and S239 of FIG. 45. If the user does not admit the keyword, the process is returned to the step S255, and if the user admits the keyword, the recognized keyword is transmitted to the determining section 208.

Further, the face image recognition section 207 which extracts the face pattern in the step S254 fetches the keyword registered in relation to the face pattern with the maximum similarity obtained at the time of face recognition from the temporary entrance/exit database 204 and transmits the same to the determining section 208.

The determining section 208 performs the collation process for collating the keyword recognized by the voice recognition section 214 with the keyword fetched from the temporary entrance/exit database 204 based on the recognition result of the face image recognition section 207 (step S258). That is, the determining section 208 determines whether or not the keyword uttered by the user coincides with the keyword corresponding to the face image of the user in the above collation process (step S259).

If the collated keywords are not coincident to each other, the determining section 208 performs the step S266. If the collated keywords are coincident to each other, the determining section 208 reads out date and hour information registered in relation to the face pattern of the maximum similarity obtained at the time of face image recognition. The determining section 208 determines whether the user re-enters within a predetermined period of time based on the readout date and hour information (step S260).

Figure 43:
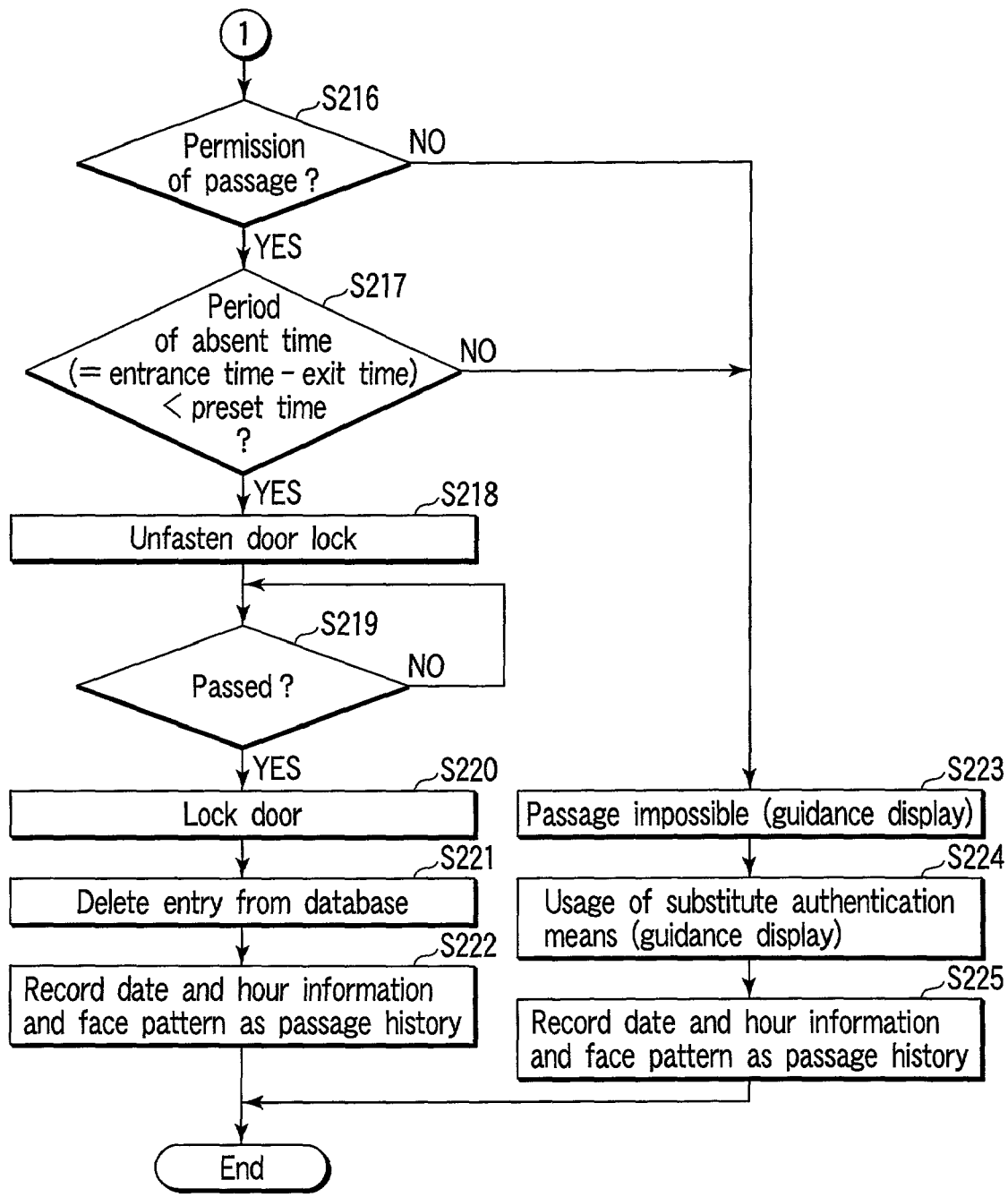
FIG. 43 is a flowchart for illustrating the flow of a process at the time of re-entrance into the security area in the tenth embodiment.

Since the process from the step S261 to the step S268 which will be performed after this is the same as the process from the step S218 to the step S225 of FIG. 43, the explanation thereof is omitted.

In the eleventh embodiment, voice data (keyword) is acquired at substantially the same time that the face image is acquired at the time of re-entrance.

Next, the processing procedures of the authentication process using the keyword and the authentication process using the face image are explained.

As described above, in FIGS. 46 and 47, the authentication process using the keyword and the authentication process using the face image are performed in parallel. That is, in the example of the operation shown in FIGS. 46 and 47, the camera photographs the face image of the user at the time of re-entrance of the user, and at substantially the same time, a request of voice input of the keyword is issued to the user. In the entrance/exit authentication apparatus, authentication of the subject person is made by determining whether or not the keyword set for a person recognized by use of the face image coincides with the keyword input with a voice by the user.

Next, two modifications of the eleventh embodiment are explained.

Figure 48:
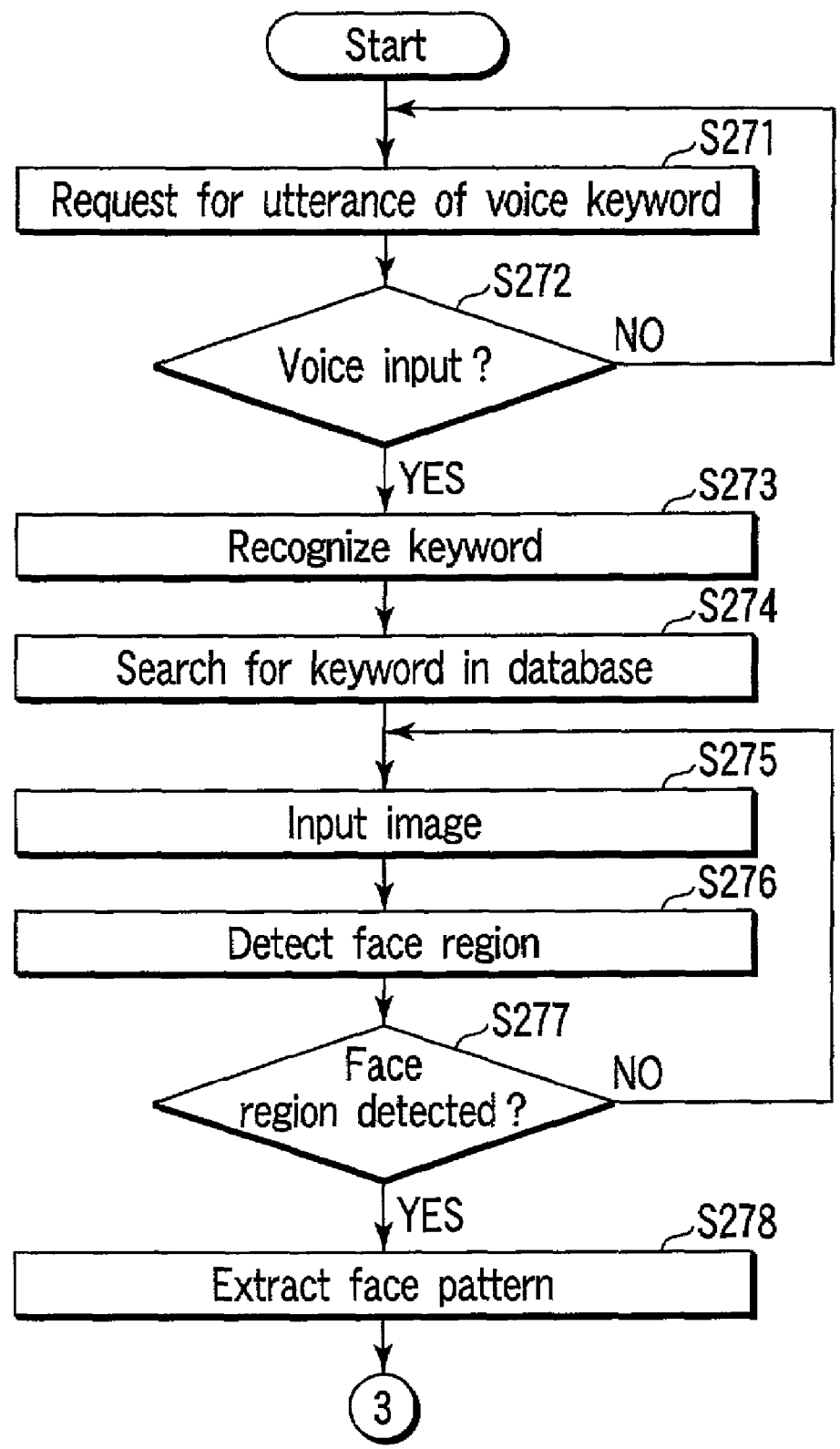
FIG. 48 is a flowchart for illustrating the flow of a process at the time of re-entrance into the security area according to a first modification of the eleventh embodiment.
Figure 49:
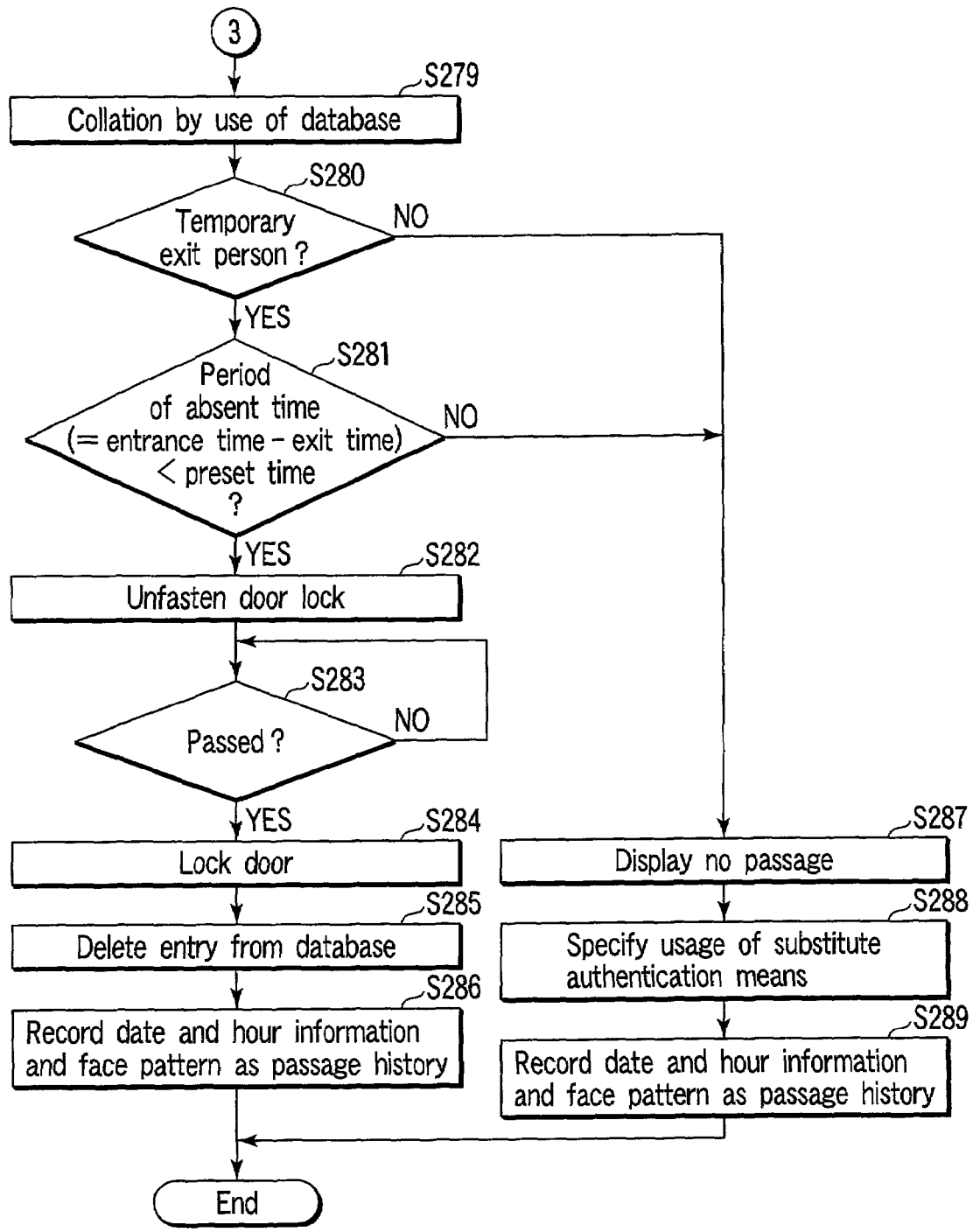
FIG. 49 is a flowchart for illustrating the flow of a process at the time of re-entrance into the security area according to the first modification of the eleventh embodiment.

First, as the first modification of the eleventh embodiment, the authentication process using the keyword is performed and then the authentication process using the face image is performed. FIGS. 48 and 49 are the flowcharts for illustrating the operation of the first modification of the eleventh embodiment.

That is, the determining section 208 requests the user to input a voice of the keyword (step S271) when an approach of a person from the exterior is detected by use of a detection sensor (not shown). If the user inputs a voice (step S272), the keyword input with the voice by the user is recognized by the voice recognition section 214 (step S273). If the keyword is recognized, the determining section 208 specifies a candidate by use of the temporary entrance/exit database 204 based on the recognized keyword (step S274).

If the candidate is specified, the image input section 205 photographs a face image of the user (step S275). After the face image of the user is photographed, the face detecting section 206 for re-entrance detects a face image from the photographed image (step S276). When the face image is detected (step S277), the face detecting section 206 for re-entrance extracts a face pattern from the detected face region (step S278). When the face pattern is extracted, the face image recognition section 207 performs the collation process for collating the extracted face pattern with the face pattern of a person specified by the keyword registered in the temporary entrance/exit database 204 (step S279).

The determining section 208 determines whether or not the person is a user who temporarily exits based on the result of the collation process (step S279). The process from the step S280 to the step S289 which will be performed after this is the same as the process from the step S259 to the step S268 of FIG. 47.

According to the first modification, since the authentication process is performed by use of both of the keyword and the face image, the security can be enhanced. Further, since the face pattern registered in the database can be specified by use of the keyword, the one-to-one face collation process can be performed and the precision of authentication by face collation can be enhanced.

Next, the second modification of the eleventh embodiment is explained.

Figure 50:
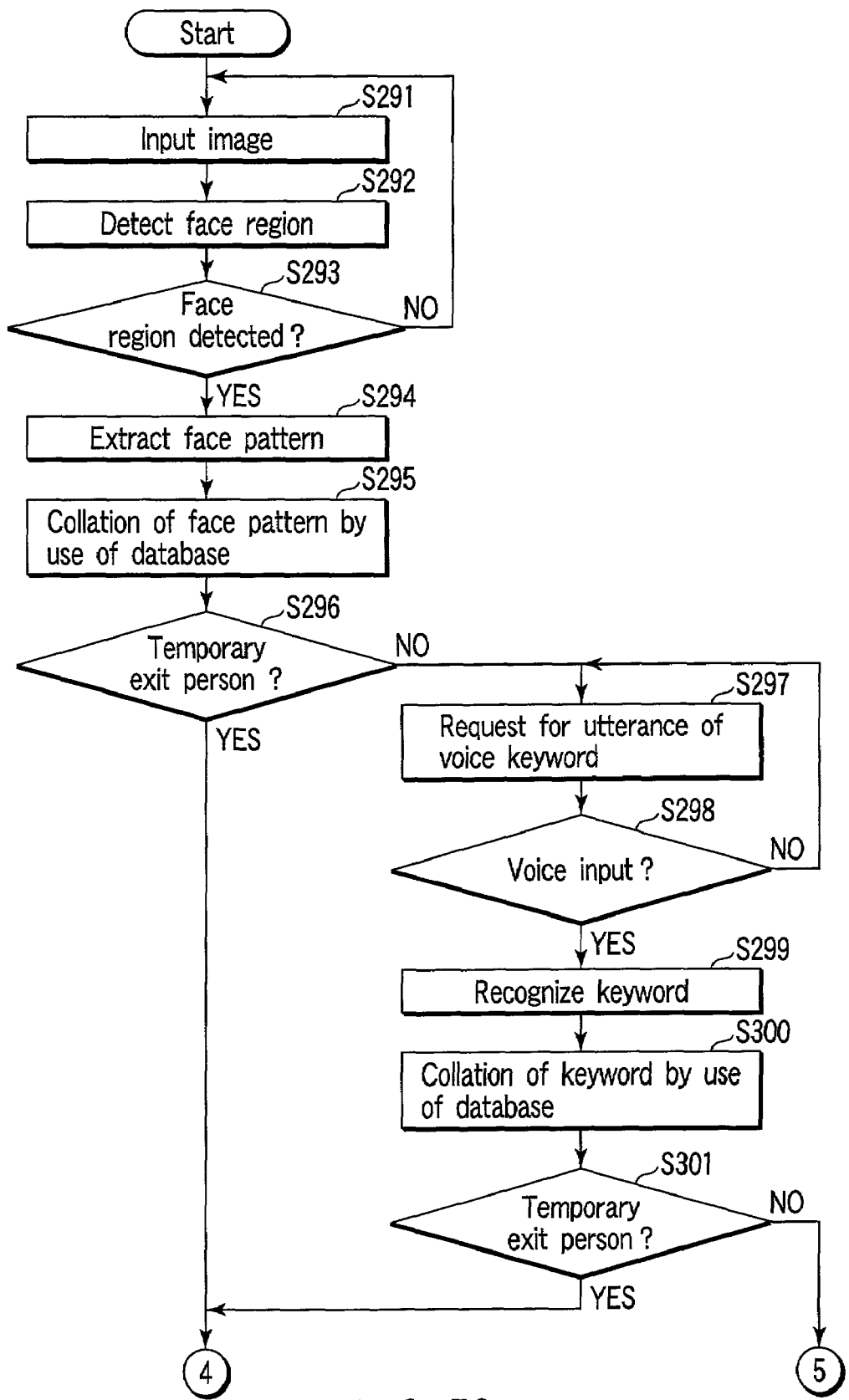
FIG. 50 is a flowchart for illustrating the flow of a process at the time of re-entrance into the security area according to a second modification of the eleventh embodiment.
Figure 51:
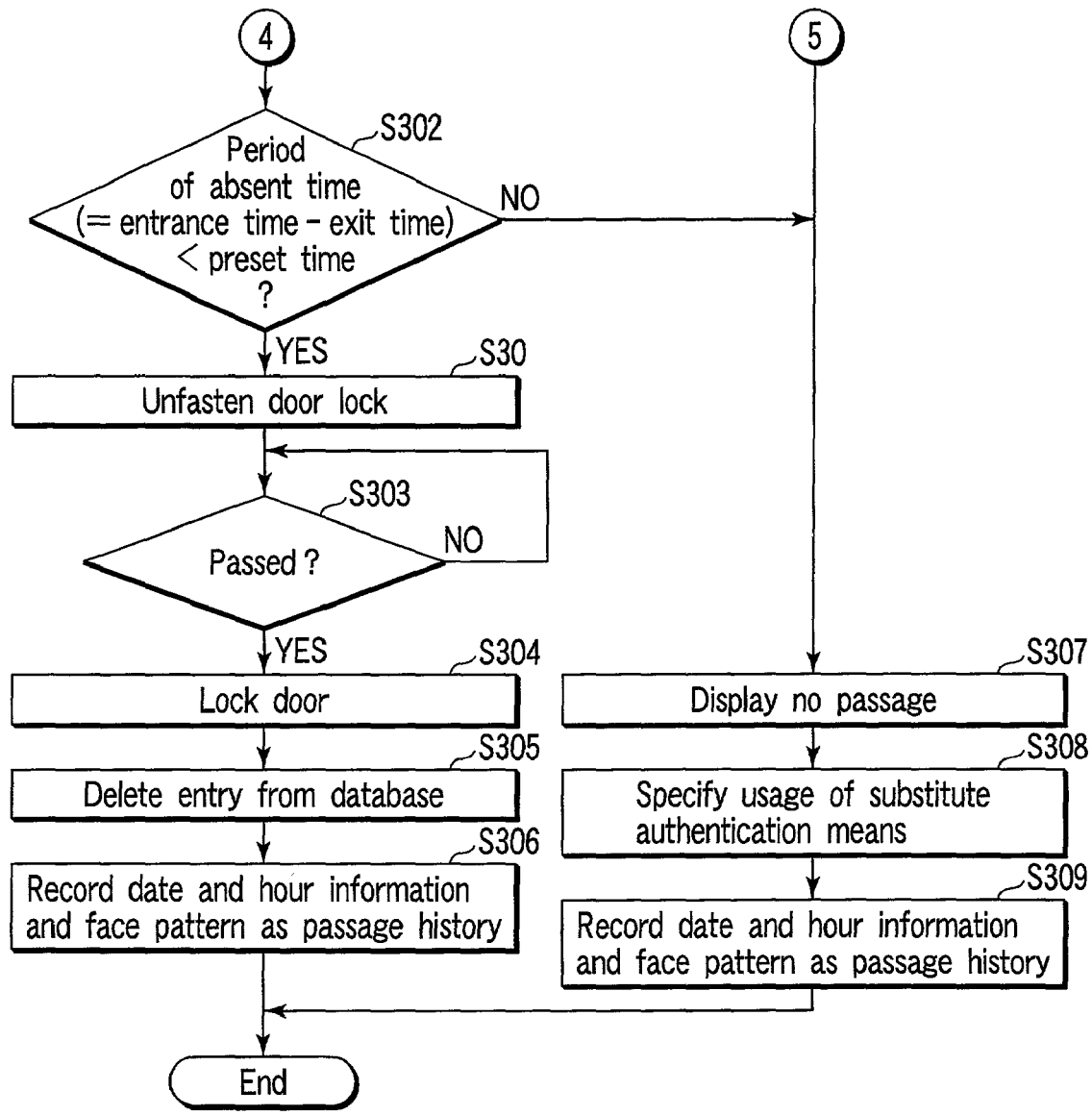
FIG. 51 is a flowchart for illustrating the flow of a process at the time of re-entrance into the security area according to the second modification of the eleventh embodiment.

The second modification of the eleventh embodiment is to perform the authentication process using the keyword only when the user cannot be authenticated by the authentication process using the face image. FIGS. 50 and 51 are the flowcharts for illustrating the second modification.

When an approach of a person from the exterior is detected by use of a detection sensor (not shown), the image input section 205 photographs a face image of the user (step S291). If the face image of the user is photographed, the face detecting section 206 for re-entrance detects a face image from the photographed image (step S292). When the face image is detected (step S293), the face detecting section 206 for re-entrance extracts a face pattern from the detected face region (step S294). When the face pattern is extracted, the face image recognition section 207 performs the collation process for collating the extracted face pattern with all of the face patterns registered in the temporary entrance/exit database 204 (step S295).

If the extracted face pattern is successfully collated with any one of the face patterns registered in the temporary entrance/exit database 204 by the collation process, the determining section 208 determines that the user is the user who temporarily exited (temporary exit person) (step S296) and then the step S302 is performed.

Further, if the extracted face pattern is not successfully collated with any one of the face patterns registered in the temporary entrance/exit database 204, the determining section 208 performs the authentication process using the keyword. As the authentication process using the keyword, the determining section 208 first requests the user to input a keyword with a voice (step S297). If the user inputs a voice (step S298), the keyword input with the voice by the user is recognized by the voice recognition section 214 (step S299). If the keyword is recognized, the determining section 208 performs the collation process between the recognized keyword and all of the temporary exit persons of the keyword registered in the temporary entrance/exit database 204 (step S300).

If the keyword input with the voice by the user is successfully collated with any one of the face patterns registered in the temporary entrance/exit database 204 by the collation process, the determining section 208 determines that the user is the user who temporarily exited (temporary exit person) (step S301) and then the step S302 is performed.

Further, if the keyword input with the voice by the user is not successfully collated with any one of the face patterns registered in the temporary entrance/exit database 204, the determining section 208 performs the step S307 in order to perform the entrance process by use of substitute input means. The process from the step S302 to the step S309 which will be performed after this is the same as the process from the step S260 to the step S268 of FIG. 47.

According to the second modification, re-entrance of the user is permitted when authentication is made by use of one of the keyword and face image. Therefore, even when a face image photographed is changed, the authentication process can be easily performed and the serviceability of the apparatus can be enhanced.

Next, the twelfth embodiment of this invention is explained.

FIG. 52 schematically shows the configuration of an entrance/exit authentication apparatus according to the twelfth embodiment. The entrance/exit authentication apparatus includes an image input section 221 used as image acquiring means, a face detecting section 222 used as face pattern extracting means, a face image recognition section 223 used as face recognition means, a face data registration section 224 used as registration means, an entrance/exit permitted person database 225 used as storage means, a face image recoding section 226 used as image recording means, an operating section 227 used as operation means, a display section 228 used as informing means, and a door control section 229 used as entrance control means.

The above sections are explained in detail below.

The image input section 221 photographs at least a face image of a person outside and near the entrance of a room which is a visiting destination. The image input section 221 is mainly configured by a video camera, for example. As shown in FIG. 2, in the image input section 221, a light and shade image photographed by the video camera is output as digital data (image data) of 512 pixels in the horizontal direction and 512 pixels in the vertical direction, for example.

The face detecting section 222 detects a face region from image data photographed by the image input section 221 and extracts a face pattern. The face detecting section 222 is the same as the face detecting section 222 explained with reference to FIG. 40.

The face image recognition section 223 performs a collation process which collates the face pattern output from the face detecting section 222 with the face pattern of each visitor registered in the entrance/exit permitted person database 225. The face image recognition section 223 performs a face recognition process by selecting the most similar one of the face patterns. The face image recognition section 223 is the same as the face image recognition section 207 explained with reference to FIG. 40.

The face data registration section 224 registers (stores) a face pattern which is a face feature amount output from the face detecting section 222 in relation to date and hour information obtained from a timer 224a contained in the face data registration section 224 into the entrance/exit permitted person database 225.

The entrance/exit permitted person database 225 registers (stores) a face pattern of each visitor who is permitted to enter/exit in relation to information of date and hour at which the face pattern is acquired.

The face image recording section 226 records the face image of the visitor input by the image input section 221 as a digital image. As the face image recording section 226, for example, a storage medium such as a hard disk device is used.

The operating section 227 is provided inside the room of a visiting destination. On the operating section 227, a display section 227a which displays guidance and the like is provided. The operating section 227 is operated by a person existing inside the room. The operating section 227 is configured by a keyboard, display device containing a touch panel and the like.

The display section 228 is disposed outside and near the entrance of the room of the visiting destination. The display section 228 displays guidance of various messages for the visitor.

The door control section 229 controls the fastening/unfastening state of the electric lock 230a of the door 230 when it receives notification of permission or inhibition of entrance into the room from the operating section 227.

Next, the flow of a process according to the twelfth embodiment with the above configuration is explained.

Figure 53:
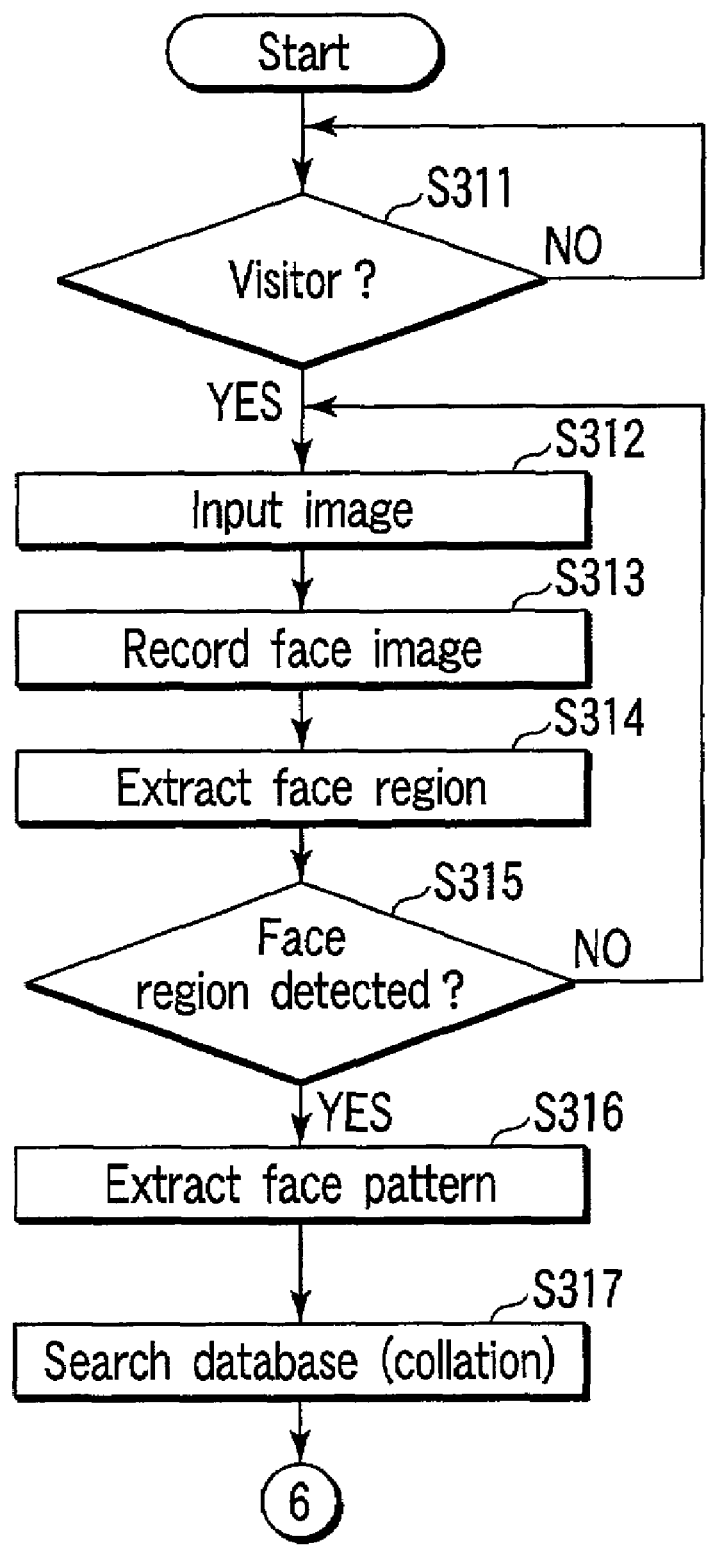
FIG. 53 is a flowchart for illustrating the flow of a process in the twelfth embodiment.
Figure 54:
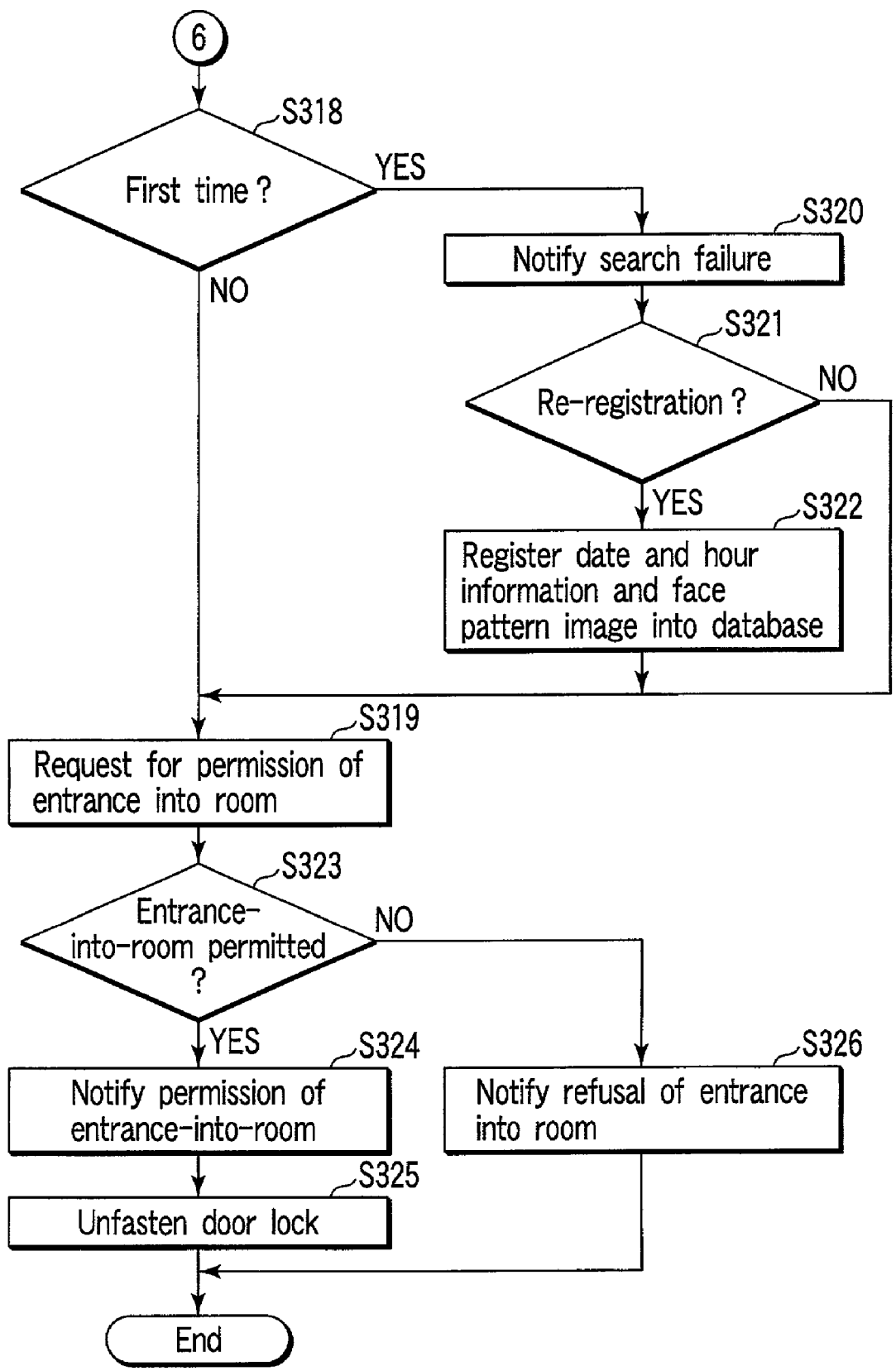
FIG. 54 is a flowchart for illustrating the flow of a process in the twelfth embodiment.

FIGS. 53 and 54 are flowcharts for illustrating the flow of the process according to the twelfth embodiment. In the following explanation, for clear understanding of the explanation, a person who normally uses a room is called a "user" and a person who visits the user (room) is called a "visitor".

When a visitor stands in front of the entrance of a room which is a visiting destination (step S311), the image input section 221 disposed outside and near the entrance photographs a face image of the visitor (step S312). The image input section 221 inputs the photographed face image to the face image recording section 226. The face image recording section 226 records the face image of the visitor input from the image input section 221 as a digital image (step S313).

Further, the face image of the visitor input from the image input section 221 is also supplied to the face detecting section 222. The face detecting section 222 detects a face region from the input image data (step S314). After detecting the face region (step S315), the face detecting section 222 extracts a face pattern from the face region (step S316).

Then, the face image recognition section 223 performs the collation process between the face pattern from the face detecting section 222 and the face pattern of each visitor registered in the entrance/exit permitted person database 225 (step S317). In the collation process, the face image recognition section 223 selects a face pattern which gives the maximum similarity and determines whether or not the maximum similarity exceeds a preset threshold value.

Next, when the face pattern which gives the maximum similarity is detected and the maximum similarity exceeds the preset threshold value, the face image recognition section 223 determines that the visitor is not a visitor who has visited for the first time (the visitor who is once registered has visited again) ("YES" in the step S318). If it is determined in the above determination process that the visitor who is once registered has visited again, an entrance-into-room permission request message is displayed on the indoor display section 228 (step S319).

Further, when the face pattern of similarity which gives the maximum similarity not exceeds the preset threshold value, the face image recognition section 223 determines that the visitor is a visitor who has visited for the first time (the visitor who has never been registered has visited) ("NO" in the step S318). If it is determined in the above determination process that the visitor who has never been registered has visited, a message of notification of a search failure and a message of inquiry about necessity of registration are displayed on the display section 227a of the indoor operating section 227 for the user inside the room (step S320).

If the user in the room specifies the necessity of registration by use of the operating section 227 in response to the inquiry (step S321), the face data registration section 224 registers date and hour information obtained from the timer 224a in relation to the face pattern extracted in the step S316 as information of the user into the entrance/exit permitted person database 225 (step S322) and then the step S319 is performed. Also, if the necessity of registration is refused in the step S321, the step S319 is performed.

Further, if the entrance-into-room permission request message is displayed on the display section 227a of the operating section 227 in the step S322, the user in the room specifies permission or refusal of entrance into the room by use of the operating section 227 (step S323). For example, if the user specifies permission of entrance into the room ("YES" in the step S323), a message of notification of permission of entrance into the room is displayed on the display section 228 disposed outside and near the entrance (step S324). If the entrance-into-room permission notification message is displayed, the door control section 229 unfastens the electric lock 230a of the door 230 (step S325) to set up a state in which the visitor can enter the room.

On the other hand, if the user specifies refusal of entrance into the room ("NO" in the step S323), a message of notification of refusal of entrance into the room is displayed on the display section 228 (step S326). If the entrance-into-room refusal notification message is displayed, the door control section 229 keeps the electric lock 230a of the door 230 fastened to set up a state in which the visitor cannot enter the room.

As described above, according to the twelfth embodiment, it is determined that the visitor is a visitor who has visited for the first time or a visitor who has visited before and only the face image of the visitor who has visited for the first time is registered into the database. Therefore, it becomes unnecessary to register the face image of the visitor who frequently visits for each visit and the face images can be efficiently registered into the database.

Next, the thirteenth embodiment is explained.

FIG. 55 schematically shows the configuration of an entrance/exit authentication apparatus according to the thirteenth embodiment. The entrance/exit authentication apparatus according to the thirteenth embodiment is obtained by adding a password number input section 231 used as keyword input means to the entrance/exit authentication apparatus according to the twelfth embodiment. That is, the thirteenth embodiment is similar in configuration to the twelfth embodiment except the password number input section 231 which inputs a keyword. Therefore, in the following explanation of the thirteenth embodiment, only portions which are different from those of the twelfth embodiment are explained.

An entrance/exit permitted person database 225 registers (stores) face patterns of visitors who obtain permission of entrance/exit in relation to inherent password numbers of the visitors and date and hour information items at which the respective face patterns are obtained.

The password number input section 231 is disposed outside and near the entrance of a room of a visiting destination. The password number input section 231 is used by the visitor to input his own password number as an inherent keyword. The password number input section 231 is configured by a keyboard, for example.

Next, the flow of a process of the apparatus with the above configuration according to the thirteenth embodiment is explained.

Figure 56:
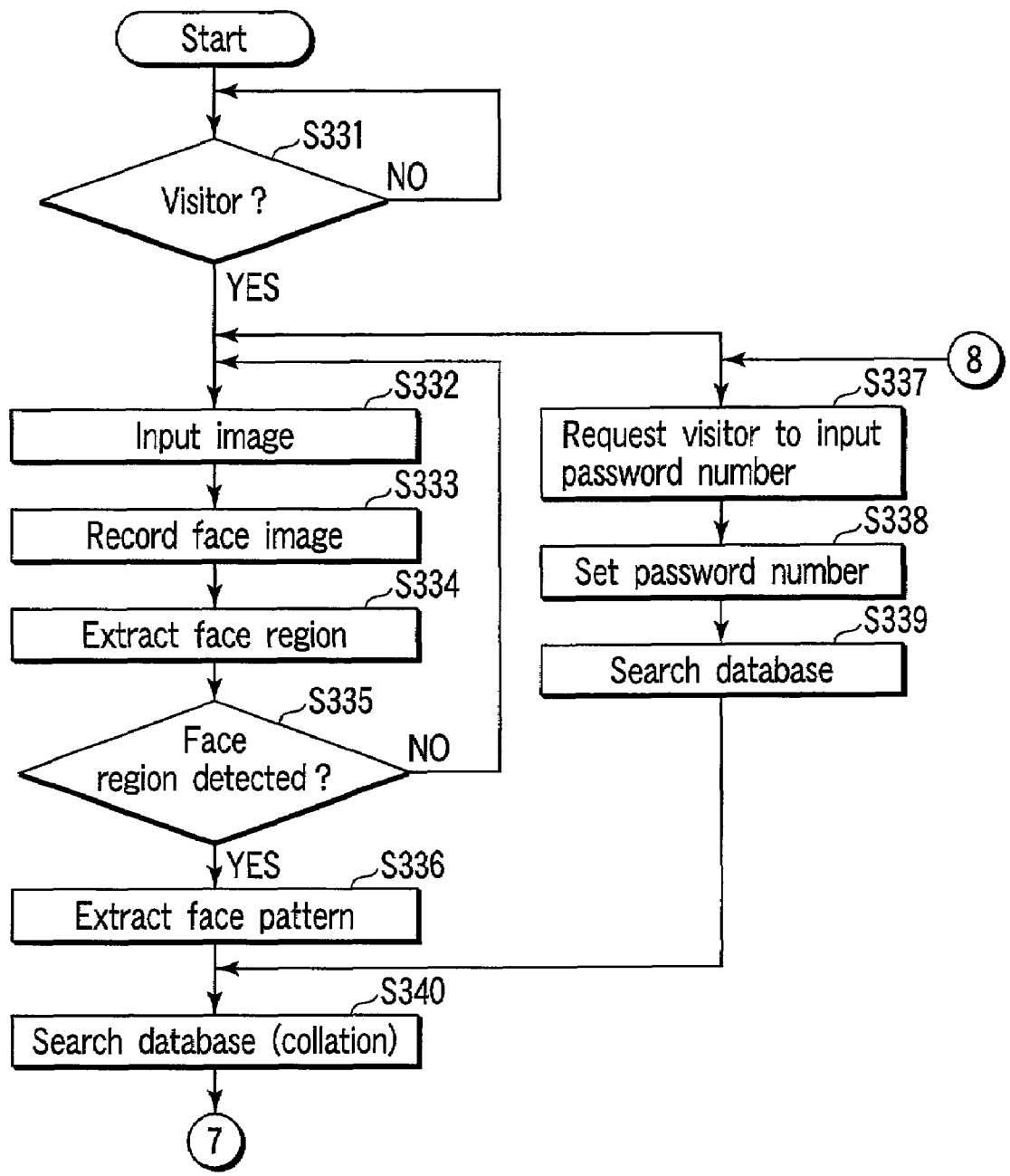
FIG. 56 is a flowchart for illustrating the flow of a process in the thirteenth embodiment.
Figure 57:
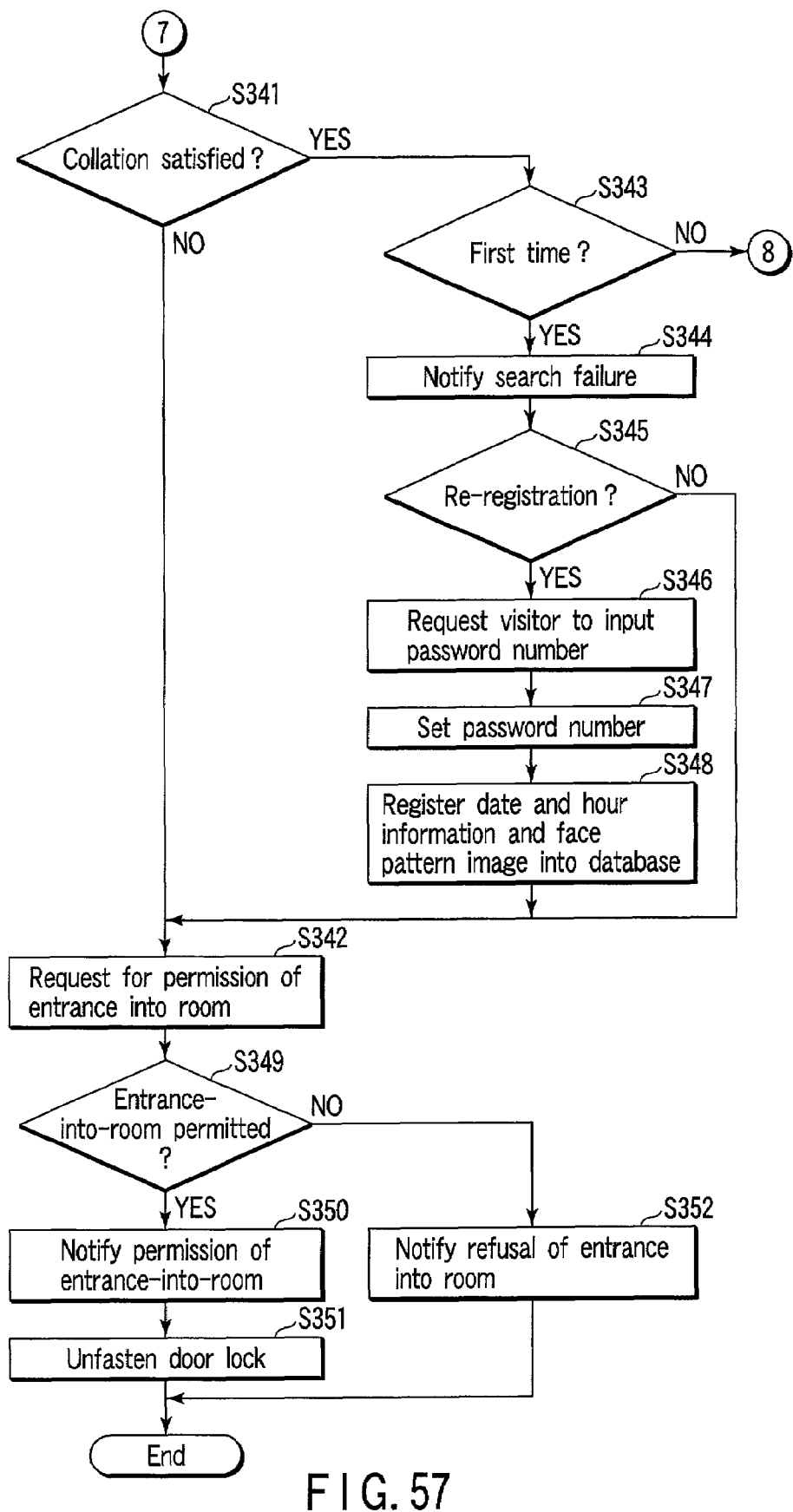
FIG. 57 is a flowchart for illustrating the flow of a process in the thirteenth embodiment.

FIGS. 56 and 57 are flowcharts for illustrating the flow of the process according to the thirteenth embodiment. In the following explanation, for clear understanding of the explanation, a person who normally uses a room is called a "user" and a person who visits the user (room) is called a "visitor".

The process from the step S331 to the step S336 is the same as the process from the step S311 to the step S316 explained with reference to FIG. 53 and the explanation thereof is omitted.

When a visitor appears, the image input section 221 photographs a face image of the visitor and the displays section 228 displays guidance which suggests that the visitor input a password number for the visitor (step S337). If the visitor inputs the password number to the password number input section 211 disposed outside and near the doorway (step S338) in response to the above request, the face image recognition section 223 fetches a face pattern registered in relation to the input password number from the entrance/exit permitted person database 225 (step S339).

Next, the face image recognition section 223 performs the collation process (first collation process) between the face pattern output from the face detecting section 222 and the face pattern fetched from the entrance/exit permitted person database 225 (step S340). The first collation process is to determine whether or not the face pattern extracted by the face detecting section 222 is successfully collated with the face pattern corresponding to the password number.

If it is determined in the first collation process that the similarity between the extracted face pattern and the face pattern corresponding to the password number exceeds a predetermined threshold value (the first collation process is successfully performed), the face image recognition section 223 determines that the visitor is successfully collated with the person corresponding to the password number ("YES" in the step S341). If it is thus determined that the visitor is successfully collated with the person corresponding to the password number, a entrance-into-room permission request message is displayed on the display section 227a of the operating section 227 disposed inside the room (step S342).

If it is determined in the first collation process that the similarity between the extracted face pattern and the face pattern corresponding to the password number does not exceed the predetermined threshold value (the first collation process is not successfully performed), the face image recognition section 223 performs the collation process (second collation process) between the extracted face pattern and all of the face patterns registered in the entrance/exit permitted person database 225. The second collation process is to select the face pattern which gives the maximum similarity by use of the face image recognition section 223 and determine whether or not the maximum similarity exceeds a preset threshold value.

If it is determined in the second collation process that the maximum similarity exceeds the predetermined threshold value (the second collation process is successfully performed), the face image recognition section 223 determines that the visitor is not a visitor who has visited for the first time (the visitor who is once registered has visited again) ("NO" in the step S343).

If it is determined in the above determination process that the visitor is not a visitor who has visited for the first time, the face image recognition section 223 determines that the password number is erroneously input and the step S337 is performed again. That is, if it is determined that the visitor is not a visitor who has visited for the first time, the display section 228 displays guidance which suggests that the visitor input a password number for the visitor (step S337).

If it is determined in the second collation process that the maximum similarity does not exceed the predetermined threshold value (the second collation process is not successfully performed), the face image recognition section 223 determines that the visitor is a visitor who has visited for the first time (the visitor who is not registered at all has visited) ("YES" in the step S343). If it is determined in the above determination process that the visitor is a visitor who has visited for the first time, a message of notification of a failure in searching the visitor and a message of inquiry about necessity of registration are displayed on the display section 227a of the indoor operating section 227 for the user inside the room (step S344).

If the user in the room specifies the necessity of registration by use of the operating section 227 in response to the above inquiry ("YES" in the step S345), the display section 228 displays guidance which requests the visitor to input a password number (step S346). The visitor inputs a password number by use of the password number input section 231 disposed outside and near the doorway in response to the password number input request (step S347). If the password number is input, the face data registration section 224 registers information of the visitor into the entrance/exit permitted person database 225 (step S348).

At this time, information of the visitor registered into the entrance/exit permitted person database 225 contains date and hour information obtained from the timer 224a, the face pattern extracted in the step S336 and the password number input in the step S347. If information of the visitor is registered into the entrance/exit permitted person database 225 (step S348), the process proceeds to the step S342. In a case where registration of the visitor is refused by the user in the room in the step S345, the process proceeds to the step S342.

The process from the step S349 to the step S352 which will be performed after this is the same as the process from the step S323 to the step S326 of FIG. 54 and the explanation thereof is omitted.

As described above, according to the thirteenth embodiment, information of the visitor is registered together with the password number into the database and the one-to-one face collation process is performed for the visitor who has visited before by use of the password number. Further, a visitor who has visited for the first time is requested to input a password number and information of the visitor is registered together with the password number input by the visitor into the database. Thus, information of the visitor can be registered together with the password number into the database without registering the face image of the visitor who often visits for each visit, and the face collation precision and the security can be enhanced.

Next, the fourteenth embodiment is explained.

FIG. 58 schematically shows the configuration of an entrance/exit authentication apparatus according to the fourteenth embodiment. The entrance/exit authentication apparatus according to the fourteenth embodiment is obtained by adding a voice input section 232 and voice recognition section 233 used as keyword input means to the entrance/exit authentication apparatus according to the twelfth embodiment. That is, the fourteenth embodiment is similar in configuration to the thirteenth embodiment except that the voice input section 232 and voice recognition section 233 are used instead of the password number input section 231. Therefore, in the following explanation of the fourteenth embodiment, only portions which are different from those of the thirteenth embodiment are explained.

An entrance/exit permitted person database 225 registers (stores) face patterns of visitors who obtain permission of entrance/exit in relation to voice keywords inherent to the visitors and date and hour information items at which the respective face patterns are obtained.

The voice input section 232 is used by the user to input an inherent keyword with a voice in a position outside and near the entrance of a room of a visiting destination. The voice input section 232 is configured by a microphone, for example. The voice recognition section 233 is used to recognize the keyword input with a voice by use of the voice input section 232.

Figure 59:
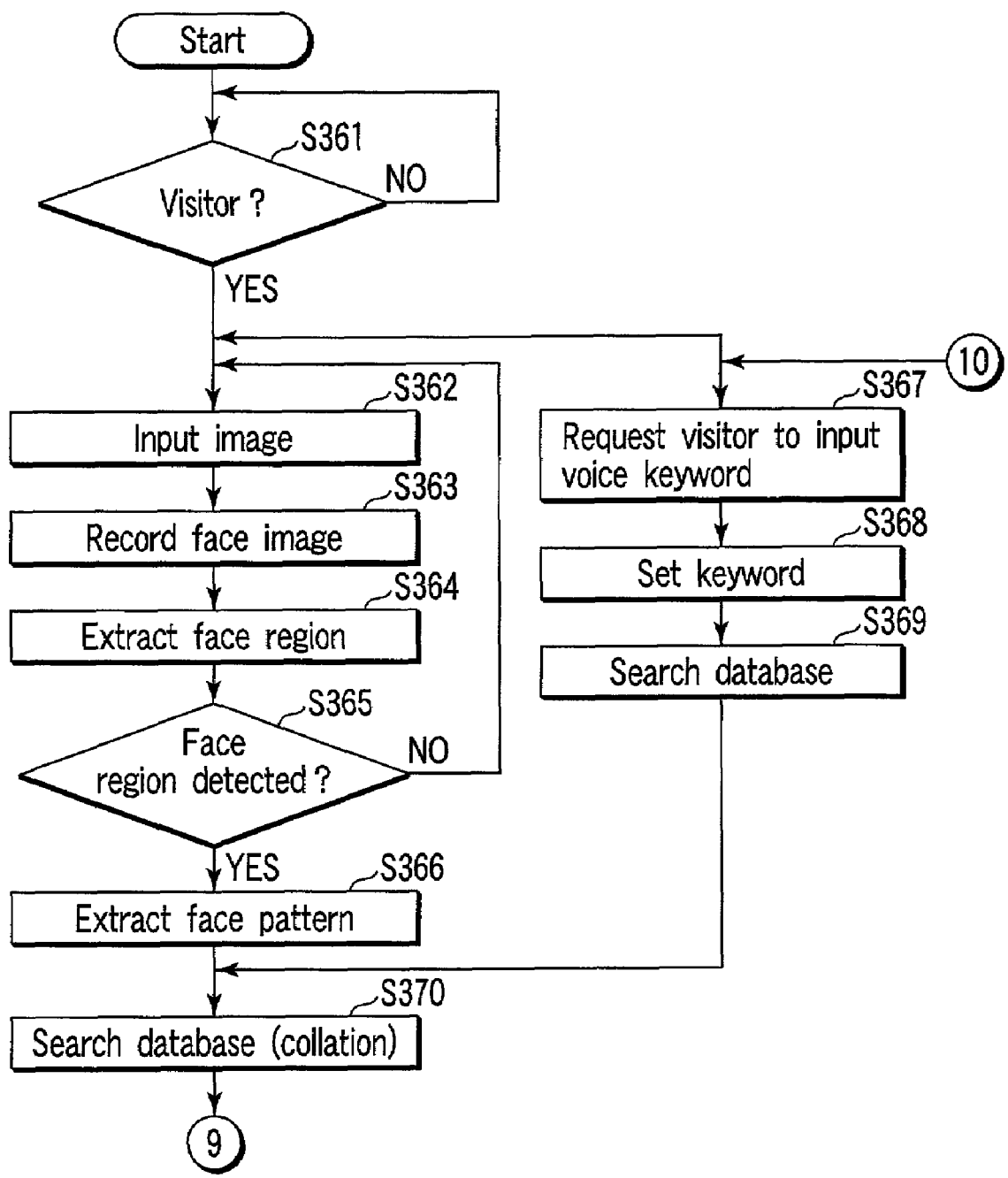
FIG. 59 is a flowchart for illustrating the flow of a process in the fourteenth embodiment.
Figure 60:
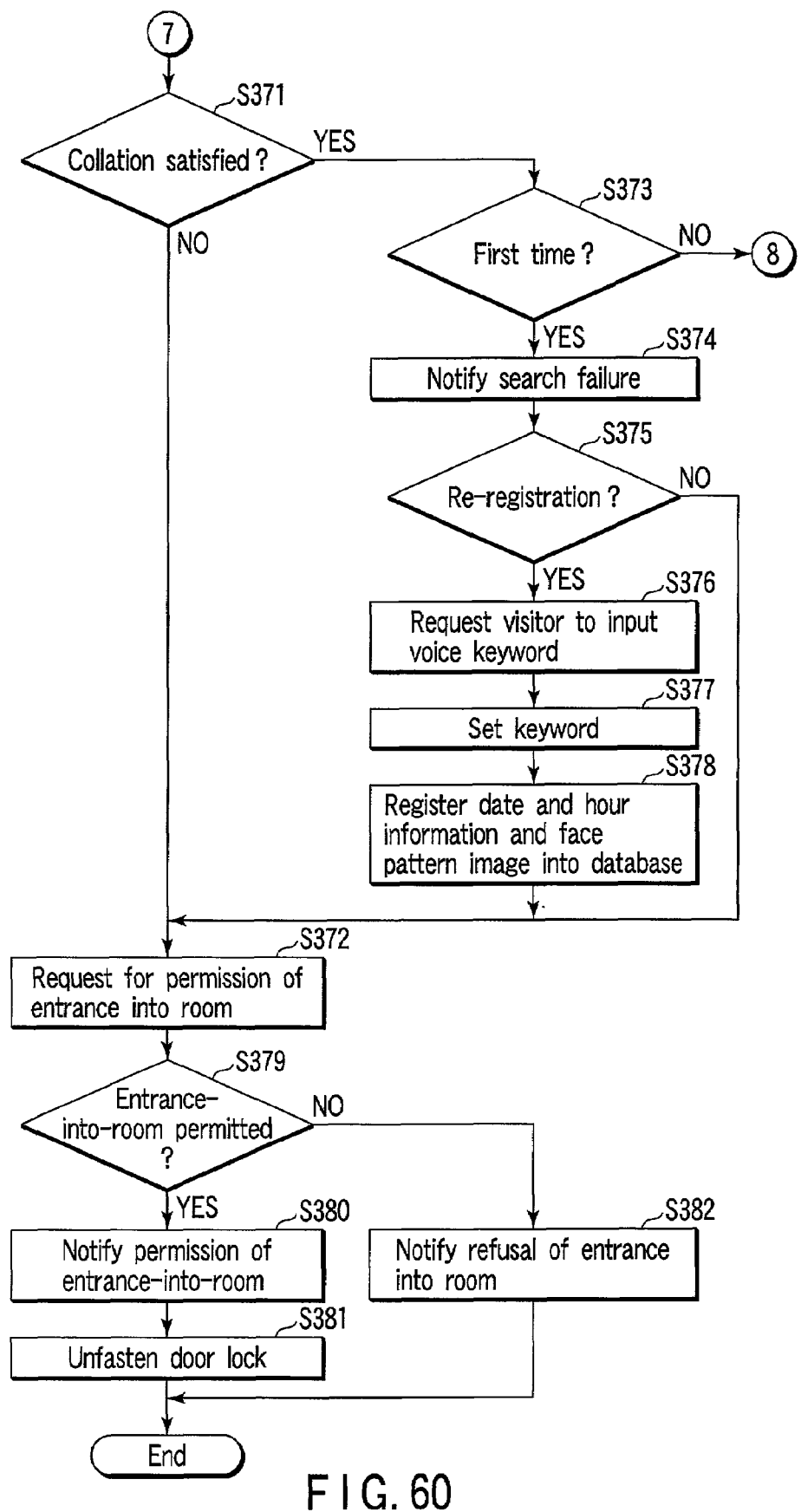
FIG. 60 is a flowchart for illustrating the flow of a process in the fourteenth embodiment.

Next, the flow of a process of the apparatus with the above configuration according to the fourteenth embodiment is explained with reference to the flowcharts shown in FIGS. 59 and 60. In the following explanation, for clear understanding of the explanation, a person who normally uses a room is called a "user" and a person who visits the user (room) is called a "visitor".

The process from the step S361 to the step S366 is the same as the process from the step S311 to the step S316 explained with reference to FIG. 53 and the explanation thereof is omitted.

When a visitor appears, the image input section 221 photographs a face image of the visitor and the display section 228 displays guidance which suggests that the visitor input a keyword with a voice for the visitor (step S367). If the visitor inputs the keyword with the voice to the voice input section 232 disposed outside and near the doorway (step S368) in response to the request, the voice recognition section 233 recognizes the input keyword and supplies the recognition result to the face recognition section 223. The face recognition section 223 fetches a face pattern registered in relation to the keyword from the entrance/exit permitted person database 225 (step S369).

Next, the face image recognition section 223 performs the collation process (first collation process) between the face pattern output from the face detecting section 222 and the face pattern fetched from the entrance/exit permitted person database 225 (step S370). The first collation process is to determine whether or not the face pattern extracted by the face detecting section 222 is successfully collated with the face pattern corresponding to the keyword.

If it is determined in the first collation process that the similarity between the extracted face pattern and the face pattern corresponding to the keyword subjected to the voice recognition process exceeds a predetermined threshold value (the first collation process is successfully performed), the face image recognition section 223 determines that the visitor is successfully collated with the person corresponding to the keyword ("YES" in the step S371). If it is thus determined that the visitor is successfully collated with the person corresponding to the keyword, a entrance-into-room permission request message is displayed on the display section 227a of the operating section 227 disposed inside the room (step S372).

If it is determined in the first collation process that the similarity between the extracted face pattern and the face pattern corresponding to the recognized keyword does not exceed the predetermined threshold value (the first collation process is not successfully performed), the face image recognition section 223 performs the collation process (second collation process) between the extracted face pattern and all of the face patterns registered in the entrance/exit permitted person database 225. The second collation process is to select the face pattern which gives the maximum similarity by use of the face image recognition section 223 and determine whether or not the maximum similarity exceeds a preset threshold value.

If it is determined in the above determination process that the visitor is not a visitor who has visited for the first time, the face image recognition section 223 determines that the keyword is erroneously input and the step S367 is performed again. That is, if it is determined that the visitor is not a visitor who has visited for the first time, the display section 228 displays guidance which suggests that the visitor input a keyword for the visitor (step S367).

If it is determined in the second collation process that the maximum similarity does not exceed the predetermined threshold value (the second collation process is not successfully performed), the face image recognition section 223 determines that the visitor is a visitor who has visited for the first time (the visitor who is not registered at all has visited) ("YES" in the sep S373). If it is determined in the above determination process that the visitor is a visitor who has visited for the first time, a message of notification of a failure in searching the visitor and a message of inquiry about necessity of registration are displayed on the display section 227a of the indoor operating section 227 for the user existing in the room (step S374).

If the user in the room specifies the necessity of registration by use of the operating section 227 in response to the inquiry ("YES" in the step S375), the display section 228 displays guidance which requests the visitor to input a keyword with a voice (step S376). Then, the visitor inputs a keyword with a voice by use of the voice input section 232 disposed outside and near the doorway in response to the keyword input request (step S377). If the keyword is input with the voice, the face data registration section 224 registers information of the visitor in relation to the keyword input with the voice into the entrance/exit permitted person database 225 (step S378).

At this time, information of the visitor registered into the entrance/exit permitted person database 225 contains date and hour information obtained from the timer 224a, the face pattern extracted in the step S366 and the keyword input with the voice in the step S377. If information of the visitor is registered into the entrance/exit permitted person database 225 (step S378), the process proceeds to the step S372. Also, if registration of the visitor by the user in the room is refused in the step S375, the process proceeds to the step S372.

The process from the step S379 to the step S382 which will be performed after this is the same as the process from the step S323 to the step S326 of FIG. 54 and therefore the explanation thereof is omitted.

As described above, according to the fourteenth embodiment, information of the visitor is registered together with the voice keyword into the database and the one-to-one face collation process is performed for the visitor who has visited before by use of the voice keyword. Further, a visitor who has visited for the first time is requested to input a voice keyword and information of the visitor is registered together with the voice keyword input by the visitor into the database. Thus, information of the visitor can be registered together with the voice keyword into the database without registering the face image of the visitor who often visits each time the visitor visits, and the face collation precision and the security can be enhanced.

Next, the fifteenth embodiment is explained.

FIG. 61 schematically shows the configuration of an entrance/exit authentication apparatus according to the fifteenth embodiment. The entrance/exit authentication apparatus according to the fifteenth embodiment is obtained by adding an image input section 234, person extracting section 235 and internal state determining section 236 to the entrance/exit authentication apparatus according to the twelfth embodiment. Portions other than the image input section 234, person extracting section 235 and internal state determining section 236 are similar in configuration to those of the twelfth embodiment. Therefore, in the following explanation of the fifteenth embodiment, only portions which are different from those of the twelfth embodiment are explained.

The image input section 234 photographs an image of a room which is a visiting destination and inputs the photographed image. The image input section 234 is mainly configured by a video camera, for example. As shown in FIG. 2, for example, the image input section 234 outputs a light and shade image photographed by use of the video camera as digital data (image data) configured by 512 pixels in the horizontal direction and 512 pixels in the vertical direction.

The person extracting section 235 detects and extracts a person image from image data supplied from the image input section 234. The internal state determining section 236 determines whether or not a user exists in the room based on the output of the person extracting section 235.

Figure 62:
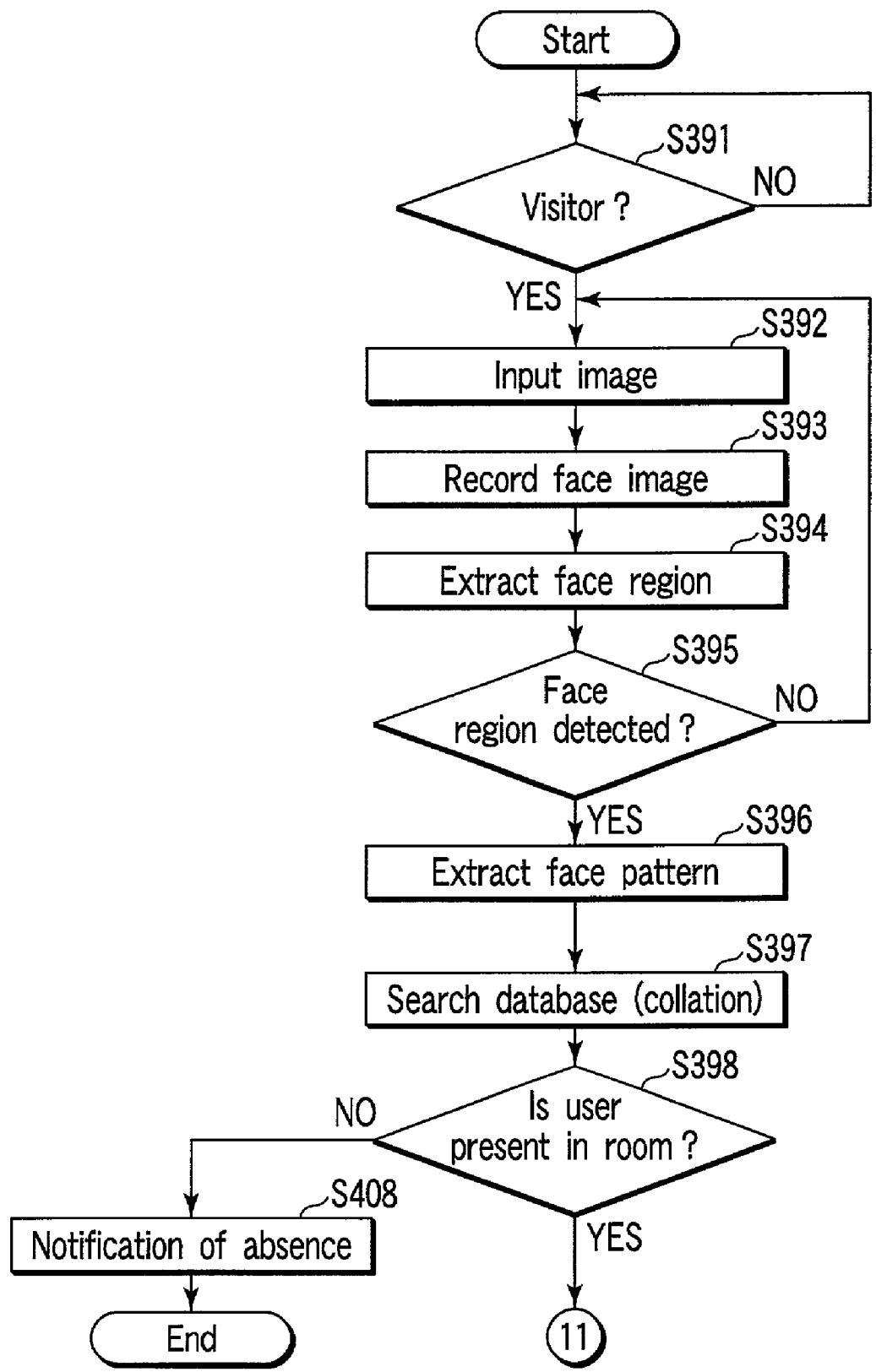
FIG. 62 is a flowchart for illustrating the flow of a process in the fifteenth embodiment.
Figure 63:
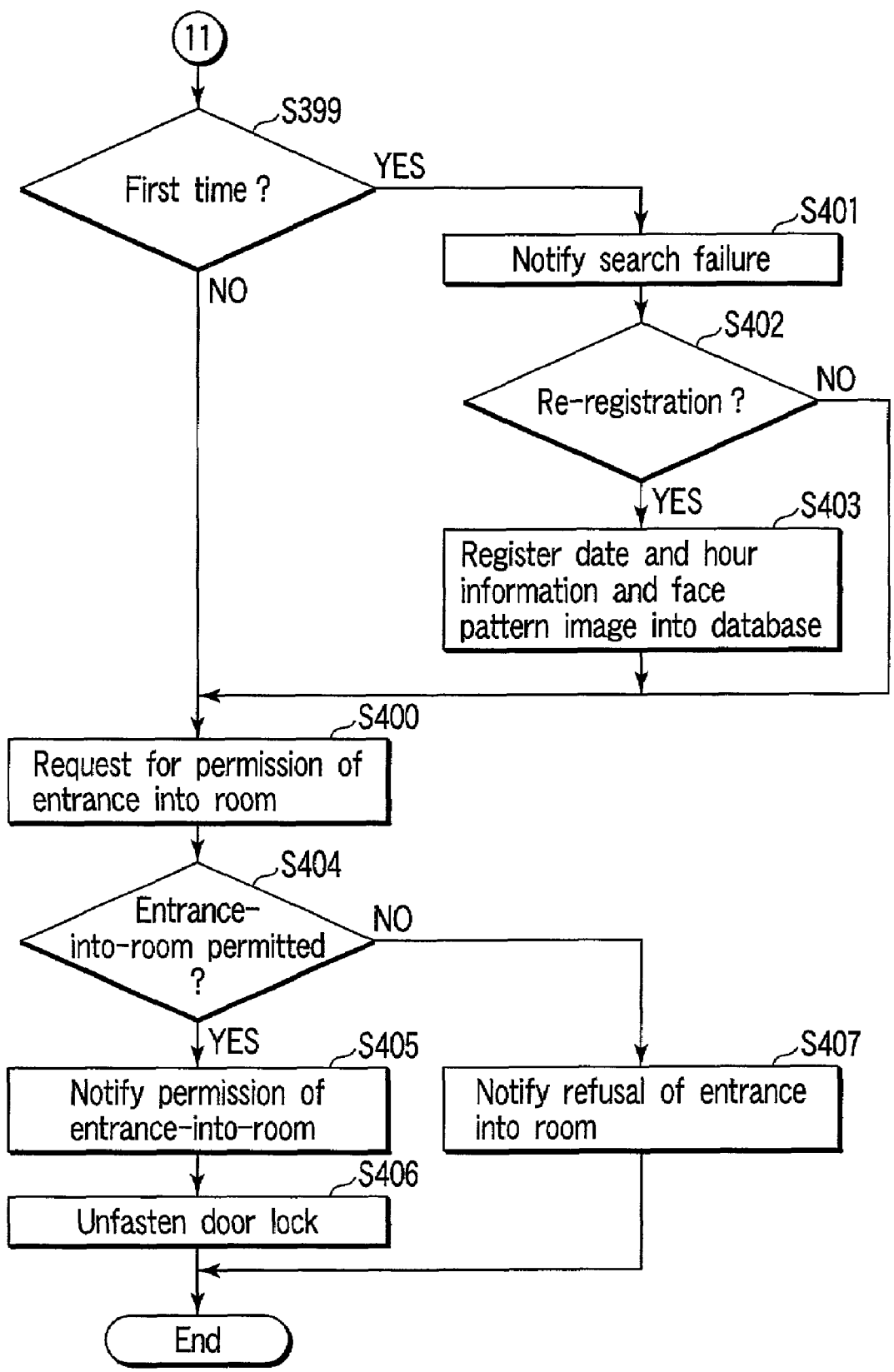
FIG. 63 is a flowchart for illustrating the flow of a process in the fifteenth embodiment.

Next, the flow of a process of the apparatus with the above configuration according to the fifteenth embodiment is explained. FIGS. 62 and 63 are flowcharts for illustrating the flow of the process according to the fifteenth embodiment. In the following explanation, for clear understanding of the explanation, a person who normally uses a room is called a "user" and a person who visits the user (room) is called a "visitor".

Since the process from the step S391 to the step S397 is the same as the process from the step S311 to the step S317 of FIG. 53, the explanation thereof is omitted.

When the collation process in the step S397 is terminated, the internal state determining section 236 determines whether or not a user exists in the room of the visiting destination (step S398). If it is determined as the result of determination that the user exists in the room, the face recognition section 223 determines whether or not the similarity (maximum similarity) of a face pattern which gives the largest similarity exceeds a preset threshold value in the above collation process (step S399). If it is determined in the above determination process that the maximum similarity exceeds the preset threshold value, the face recognition section 223 determines that the visitor is not a visitor who has visited for the first time (the visitor who was once registered has visited again) ("NO" in the step S399). If it is determined in the above determination process that the visitor is not a visitor who has visited for the first time, the display section 227a of the indoor operating section 227 displays an entrance-into-room permission request message (step S400).

On the other hand, if it is determined in the step S399 that the maximum similarity does not exceed the preset threshold value, the face recognition section 223 determines that the visitor is a visitor who has visited for the first time (the visitor who has not been registered at all has visited) ("YES" in the step S399). If it is determined in the above determination process that the visitor is a visitor who has visited for the first time, the display section 227a of the indoor operating section 227 displays a message of notification of a search failure and a message of inquiry about necessity of registration for the user in the room (step S401).

If the user in the room specifies the necessity of registration by use of the operating section 227 in response to the above inquiry (step S402), the face data registration section 224 registers information of the visitor into the entrance/exit permitted person database 225 (step S403). At this time, information of the visitor registered into the entrance/exit permitted person database 225 contains date and hour information obtained from the timer 224a, face pattern extracted in the step S396 and the like. After information of the visitor is registered into the entrance/exit permitted person database 225, the process proceeds to the step S400. Also, if the necessity of registration is refused in the step S402, the process proceeds to the step S400.

The process from the step S404 to the step S407 which will be performed after this is the same as the process from the step S323 to the step S326 of FIG. 54 and therefore the explanation thereof is omitted.

If it is detected in the step S398 that the user does not exist in the room (or the user wants to pretend to be absent), a message of notification of absence and a message indicating that the visitor cannot enter the room are displayed on the display section 228 disposed outside and near the entrance (step S408). In a case where the user does not exist in the room, it is possible to store the face pattern of the visitor in the entrance/exit permitted person database 225 and permit history information of the visitor obtained during absence of the user to be observed later.

According to the fifteenth embodiment, the state of the presence of the user in the room is detected, and when the user does not exist in the room, information indicating that the user is absent is given to the visitor. Further, if the user does not exist in the room, whether the visitor is a visitor who has visited for the first time or a visitor who has visited before is determined and only the face image of the visitor who has visited for the first time is registered into the database. Thus, in a case where the user does not exist in the room, entrance of the visitor into the room can be made impossible and information indicating that the user is absent can be given to the visitor. If the user exists in the room, it is not necessary to register the face image of the visitor who often visits each time the visitor visits and the face image of the visitor can be efficiently recorded in the database.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An entrance management apparatus which manages entrance through a first gate and entrance through a second gate provided inside the first gate, comprising:
   a first living body information input section which acquires living body information of a visitor at the first gate,
   a feature amount extracting section which extracts a feature amount of the living body information of the visitor based on the living body information acquired by said first living body information input section,
   a registration section which registers the feature amount of the living body information extracted by said feature amount extracting section in relation to entrance permission time information which defines time during which the visitor whose living body information is acquired by said first living body information input section is permitted to enter through the second gate,
   a second living body information input section which acquires living body information of the visitor at the second gate,
   a collating section which extracts a feature amount of the living body information of the visitor based on the living body information acquired by said second living body information input section and collates the extracted feature amount with the feature amount registered in said registration section, and
   an entrance control section which controls the entrance of the visitor whose living body information is acquired by said second living body information input section through the second gate based on the result of collation by said collating section and the entrance permission time information registered in said registration section and corresponding to the result of collation.

2. An entrance management apparatus which manages entrance through a first gate and entrance through a second gate provided inside the first gate, comprising:
   a first image input section which acquires a face image of a visitor at the first gate,
   a feature amount extracting section which extracts a feature amount of a face of the visitor based on the face image acquired by said first image input section,
   a registration section which registers the feature amount of the face extracted by said feature amount extracting section in relation to entrance permission time information which defines time during which the visitor whose face image is acquired by said first image input section is permitted to enter through the second gate,
   a second image input section which acquires a face image of the visitor at the second gate,
   a collating section which extracts a feature amount of the face of the visitor based on the face image acquired by said second image input section and collates the extracted feature amount with the feature amount registered in said registration section, and
   an entrance control section which controls the entrance of the visitor whose face image is acquired by said second image input section through the second gate based on the result of collation by said collating section and the entrance permission time information registered in said registration section and corresponding to the result of collation.

3. The entrance management apparatus according to claim 2, wherein said registration section creates the entrance permission time information while a time point at which the face image is acquired by said first image input section or a time point at which the face feature amount is extracted by said face feature amount extracting section is used as a reference.

4. The entrance management apparatus according to claim 2, which further comprises a destination input section by use of which a destination is input at the first gate by a visitor whose face image is acquired by said first image input section and in which said registration section registers the face feature amount extracted by said feature amount extracting section in relation to entrance permission time information which defines time during which the visitor whose face image is acquired by said first image input section is permitted to enter through the second gate and destination information indicating the destination input by said destination input section, and said entrance control section controls entrance by the visitor whose face image is acquired by said second image input section through the second gate based on the result of collation by said collating section and the entrance permission time information and destination information registered in said registration section which correspond to the result of collation.

5. The entrance management apparatus according to claim 2, further comprising an image recording section which records the face images acquired by said first and second image input sections and an image output section which outputs the face image recorded in said image recording section as a visible image as required.

6. The entrance management apparatus according to claim 5, which further comprises a destination input section by use of which a destination is input at the first gate by a visitor whose face image is acquired by said first image input section and in which said registration section registers the face feature amount extracted by said feature amount extracting section in relation to entrance permission time information which defines time during which the visitor whose face image is acquired by said first image input section is permitted to enter through the second gate and destination information indicating the destination input by said destination input section, and said entrance control section controls entrance by the visitor whose face image is acquired by said second image input section through the second gate based on the result of collation by said collating section and the entrance permission time information and destination information registered in said registration section which correspond to the result of collation.

7. An entrance management method which manages entrance through a first gate and entrance through a second gate provided inside the first gate, comprising:

acquiring living body information of a visitor at the first gate, extracting a feature amount of the living body information of the visitor based on the living body information acquired at the first gate, registering the extracted feature amount of the living body information in relation to entrance permission time information which defines time during which the visitor is permitted to enter through the second gate into a registration section, acquiring living body information of the visitor at the second gate, extracting a feature amount of the living body information of the visitor based on the living body information acquired at the second gate and collating the extracted feature amount with the feature amount registered in the registration section, and controlling the entrance of the visitor whose living body information is acquired at the second gate through the second gate based on the result of collation and the entrance permission time information registered in the registration section and corresponding to the result of collation.

8. An entrance management method which manages entrance through a first gate and entrance through a second gate provided inside the first gate, comprising:

acquiring a face image of a visitor at the first gate, extracting a face feature amount of the visitor based on the face image acquired at the first gate, registering the extracted face feature amount in relation to entrance permission time information which defines time during which the visitor is permitted to enter through the second gate in a registration section, acquiring a face image of the visitor at the second gate, extracting a face feature amount of the visitor based on the face image acquired at the second gate and collating the extracted feature amount with the feature amount registered in the registration section, and controlling the entrance of the visitor whose face image is acquired at the second gate through the second gate based on the result of collation and the entrance permission time information registered in the registration section and corresponding to the result of collation.

9. The entrance management method according to claim 8, which further comprises inputting a destination at the first gate by the visitor whose face image is acquired and in which registering into the registration section includes registering the face feature amount of the visitor in relation to the entrance permission time information which defines time during which the visitor at the first gate is permitted to enter through the second gate and destination information input by the visitor at the first gate, and controlling entrance through the second gate includes controlling entrance of the visitor whose face image is acquired at the second gate through the second gate based on the result of collation and the entrance permission time information and destination information registered in the registration section and corresponding to the result of collation.

10. The entrance management method according to claim 8, further comprising recoding the face images acquired at the first and second gates into an image recording section, and outputting the face image recorded in the image recording section as a visible image as required.

* * * * *